United States Patent
Moorthi et al.

(10) Patent No.: US 9,898,393 B2
(45) Date of Patent: Feb. 20, 2018

(54) SYSTEM FOR DISTRIBUTED SOFTWARE QUALITY IMPROVEMENT

(71) Applicant: Solano Labs, Inc., San Francisco, CA (US)

(72) Inventors: Jay Moorthi, San Francisco, CA (US); Christopher A. Thorpe, Lincoln, MA (US); William Josephson, Greenwich, CT (US)

(73) Assignee: Solano Labs, Inc., San Francisco, CA (US)

( * ) Notice: Subject to any disclaimer, the term of this patent is extended or adjusted under 35 U.S.C. 154(b) by 0 days.

(21) Appl. No.: 13/682,811

(22) Filed: Nov. 21, 2012

(65) Prior Publication Data

US 2013/0152047 A1 Jun. 13, 2013

Related U.S. Application Data

(60) Provisional application No. 61/562,687, filed on Nov. 22, 2011.

(51) Int. Cl.
*G06F 11/08* (2006.01)
*G06F 11/36* (2006.01)
*G06F 9/44* (2018.01)

(52) U.S. Cl.
CPC .............. *G06F 11/368* (2013.01); *G06F 8/71* (2013.01); *G06F 11/3664* (2013.01); *G06F 11/3688* (2013.01)

(58) Field of Classification Search
CPC ................ G06F 7/78; G06F 8/00–8/78; G06F 9/44–9/455; G06F 11/36
(Continued)

(56) References Cited

U.S. PATENT DOCUMENTS 7,020,797 B2 3/2006 Patil
7,870,044 B2 1/2011 Robertson
(Continued)

OTHER PUBLICATIONS

Holmes et al., Identifying program, test, and environmental changes that affect behaviour, 2011, pp. 371-380.*
(Continued)

*Primary Examiner* — H S Sough
*Assistant Examiner* — Zhan Chen
(74) *Attorney, Agent, or Firm* — Wolf, Greenfield & Sacks, P.C.

(57) ABSTRACT

Provided is a system for building and validating an application (including e.g., various software versions and revisions, programming languages, code segments, among other examples) without any scripting required by a system user. In one embodiment, an SDLC system is configured to construct a build and test environment, by automatically analyzing a submitted project. The build environment is configured to assemble existing user code, for example, to generate an application to test. Code building can include any one or more of code compilation, assembly, and code interpretation. The system can include a user interface provided to clients, users, and/or customer environments to facilitate user interaction and control of build and test validation. The system can accept user specification of configurations that controls the way the system runs the user's tests. The system can also provide flexible billing models for different customers.

45 Claims, 13 Drawing Sheets

(58) Field of Classification Search
USPC .................................................. 717/100–178
See application file for complete search history.

(56) References Cited

U.S. PATENT DOCUMENTS

| | | | |
|---|---|---|---|
| 8,037,453 B1 | 10/2011 | Zawadzki | |
| 8,122,440 B1* | 2/2012 | Lentini | G06F 8/433 717/140 |
| 8,166,458 B2 | 4/2012 | Li et al. | |
| 8,607,203 B1* | 12/2013 | Mehra | G06F 11/3664 717/124 |
| 2002/0019844 A1 | 2/2002 | Kurowski | |
| 2003/0098879 A1 | 5/2003 | Mathews | |
| 2003/0131088 A1* | 7/2003 | Morrissey | G06F 11/3684 709/223 |
| 2003/0188036 A1* | 10/2003 | Chen | G06F 9/4856 719/310 |
| 2004/0255291 A1* | 12/2004 | Sierer et al. | 717/174 |
| 2005/0222885 A1* | 10/2005 | Chen | G06F 9/50 703/13 |
| 2007/0174069 A1 | 7/2007 | Moore et al. | |
| 2007/0180451 A1 | 8/2007 | Ryan | |
| 2007/0198970 A1* | 8/2007 | Horii | G06F 11/3688 717/124 |
| 2007/0283351 A1 | 12/2007 | Degenaro | |
| 2008/0120521 A1* | 5/2008 | Poisson | G06F 11/2294 714/26 |
| 2008/0172660 A1* | 7/2008 | Arning | G06F 8/33 717/144 |
| 2008/0282230 A1* | 11/2008 | Belvin | G06F 11/3692 717/125 |
| 2009/0007074 A1 | 1/2009 | Campion et al. | |
| 2009/0300423 A1* | 12/2009 | Ferris | G06F 11/36 714/38.1 |
| 2010/0005455 A1* | 1/2010 | Gyure et al. | 717/128 |
| 2010/0076856 A1 | 3/2010 | Mullins | |
| 2010/0125473 A1 | 5/2010 | Tung | |
| 2010/0146514 A1 | 6/2010 | Alexander et al. | |
| 2010/0199263 A1* | 8/2010 | Clee | G06F 8/71 717/125 |
| 2010/0218176 A1 | 8/2010 | Spanner et al. | |
| 2010/0250642 A1 | 9/2010 | Yellin | |
| 2010/0281095 A1 | 11/2010 | Wehner | |
| 2011/0010691 A1 | 1/2011 | Lu et al. | |
| 2011/0016214 A1 | 1/2011 | Jackson | |
| 2011/0029946 A1* | 2/2011 | Joukov et al. | 717/100 |
| 2011/0055807 A1 | 3/2011 | Mahajan et al. | |
| 2011/0093744 A1 | 4/2011 | Martinov | |
| 2011/0145793 A1 | 6/2011 | Alexander et al. | |
| 2011/0209124 A1* | 8/2011 | Kaur | 717/126 |
| 2012/0131309 A1* | 5/2012 | Johnson | G06F 9/30 712/41 |
| 2012/0131591 A1 | 5/2012 | Moorthi et al. | |

OTHER PUBLICATIONS

Burg et al., Automating System Tests Using Declarative Virtual Machines, 2010, pp. 181-190.*
A Combinatorial Exchange for Complex Grid Services; 2010; pp. 221-237—Abstract Only—complete reference available upon request.
Inter-Cloud Utility-Oriented Federation of Cloud Computing Environments; 2010; R. Buyya.
A Market Exchange for Trading Utility Computing Services; Mar. 11, 2011; Saurabh Kumar Garg-Christian Vecchiola-Rajkumar Buyya.
Meta Scheduling for Market-Oriented Grid and Utility Computing; Jun. 2010; Saurabh Kumar Garg.
Strategy-Proof Dynamic Resource Pricing of Multiple Resource Types on Federated Clouds; Marian Mihailescu and Yong Meng Teo; Dept of Compuer Science; Nat'l University of Singapore; Computing 1, 13 Computing Drive, Singapore 117417; 2010; pp. 337-350.
Towards Autonomic Workload Provisioning for Enterprise Grids and Clouds; 2009.
PCT/US2012/066195—ISR—dated—Feb. 5, 2013.
Supplemental European Search Report and Written Opinion dated Aug. 20, 2015 in corresponding EP Application No. EP12850842.1, 7 pages.

* cited by examiner

SYSTEM FOR DISTRIBUTED SOFTWARE QUALITY IMPROVEMENT

RELATED APPLICATIONS

This application claims priority under 35 U.S.C. § 119(e) to U.S. Provisional Application Ser. No. 61/562,687 entitled "SYSTEM FOR DISTRIBUTED SOFTWARE QUALITY IMPROVEMENT," filed on Nov. 22, 2011, which is incorporated herein by reference in its entirety.

BACKGROUND

The software industry has traditionally deployed automation to increase developer productivity, to improve the quality of released software, and to accelerate innovation. One such area of automation has focused on the Software Development Life Cycle (SDLC)—targeting the build, test, and release process, for improvement via automation. More generally, development in this area has focused on encouraging "best practice" software engineering. Many of these best practices originated as manual processes, and software developers soon automated them: nightly compiles, periodic performance testing, the use of "staging" environments that mimic or clone production deploy targets, unit, functional, and integration testing, and end-user testing.

The prevalence of software and the increasing pace at which software needs to change has put increasing pressure on conventional build and release processes and systems. The last generation of innovation in such systems occurred in the late 1990s and early 2000s, in the form of Continuous Integration and systems to support it. For example, a number of closed and open source tools (CruiseControl, Hudson, Bamboo, Anthill, TeamCity) were developed to help software developers implement Continuous Integration. In the abstract, a continuous integration (CI) server is associated with a Software Configuration Management (SCM) system that records source code versions for an application as they change, and further records changes in associated metadata.

The CI server is notified (actively or passively) when the SCM records a change, retrieves the latest source code and executes a user-provided script, capturing the scripts output and storing artifacts or file objects that may have been created when the script executed. In many cases, the user manually configures a script to set up the dependencies needed to build and execute the application, builds the application, if necessary, and runs some number of application tests. The trigger, execution, and capture are collectively referred to as a "build," even if the execution does not specifically involve compiling software. If the script fails to complete successfully, as determined by the script itself, the build is said to fail.

SUMMARY

It is realized that the growth of system virtualization, dynamic system provisioning, and public compute resources (i.e., cloud computing) inspires a next generation system that automates and accelerates the SDLC (including, for example, CI operations), definition of a test suite designed to execute test cases against existing, new, and modified code in order to validate applications, code builds, or portions of code. Stated broadly, aspects of a system are described that allow large software build and test processes to be carried out quickly, reliably, and with minimal setup overhead using distributed cloud compute resources. In various aspects, provided are systems and method for supporting the SDLC that are easier to use, simpler to setup, and deliver results faster, with the ability to scale to larger and larger groups of users.

According to one aspect, provided is an SDLC system for building and validating an application (including e.g., various software versions and revisions, programming languages, code segments, among other examples) without any scripting required by a system user. In one embodiment, an SDLC system is configured to construct a build and test environment, by automatically analyzing a submitted project. The build environment is configured to assemble existing user code, for example, to generate an application to test. Code building can include any one or more of code compilation, assembly, and code interpretation. A build can include the entirety of the assembled code for an application. A build can also include portions of the code that execute functionality within the application to be tested.

The SDLC system can be configured to examine, for example, names, extensions, and contents of user-supplied code to automatically establish build and test environment parameters. In one example, the SDLC system is configured to identify common filename patterns in user-supplied code, which can include, for example, patterns identified in directory layouts, specific file extensions (which can implicate specific functionality required and validation tests to employ), matching of contents of dependency lists (e.g., content of standard dependency lists are available for various open source libraries, various development languages/project compilers specifically identify project dependencies), among other options, to assembly build and test environment requirements.

In some embodiments, the SDLC system includes components configured to provide automatic help suggestions that automatically identify one or more of common build problems, dependency and test setup problems, execution issues, and provide suggested resolutions that can be approved by the user, or can be implemented without user intervention. Further embodiments can include additional analysis components configured to automatically determine what elements of a build or test suite can be run serially versus elements that can be executed in parallel. The determination processes can also be implemented to automatically optimize build and test operations. In some embodiments, the system allows the user to override automatic determinations, setting various elements to execute serially and/or in parallel according to user specification.

Further implementations of an SDLC system can include components configured to isolate elements of an executing test suite. Other components can be configured to automatically provide for distributed execution over networked virtual machines. The SDLC system can also include reporting components configured to communicate test results in real or near real time. According to one embodiment, the SDLC system can be configured to support CI protocols. For example, the SDLC system can receive code changes from a client. The code changes may define an event that triggers build and execution tasks for a test suite associated with the code change. Execution of test suite can occur as a test session configured to return results to the user submitting the code changes. The results can include a pass/fail determination that can allow or prevent the user from incorporating their code changes into a source code repository.

According to one aspect, a system for continuous integration of source code revisions is provided. The system comprises at least one processor operatively connected to a memory, the processor when executing is configured to register a test suite for distributed execution, wherein the test suite defines source code and at least one test to be executed for an application, wherein registering includes identifying a code repository for the source code associated with the application to be tested, determine, automatically, configuration requirements for the test suite based on analysis of the code repository, wherein determining configuration requirements includes determining execution dependencies for the test suite and the application to be tested, generate instructions for executing a plurality of execution instances, wherein at least some of the plurality of execution instances are configured to define an execution environment based on the configuration requirements, execute at least a portion of the source code, and execute at least one test, communicate, the instructions for executing the plurality of execution instances to at least one compute resource, and receive results from execution of the plurality of execution instances.

According to one embodiment, the processor is configured to provision the at least one compute resource from a plurality of cloud compute providers. According to one embodiment, the processor is configured to determine a cost for a plurality of compute resources available at the plurality of cloud compute providers, and select the at least one compute resource responsive to a price constraint. According to one embodiment, the processor is configured to select the at least one compute resource responsive to completion criteria. According to one embodiment, the processor is configured to determine a cost for a plurality of compute resources, determine a volume of compute resources based on completion criteria; and wherein the provisioning of the at least one compute resource includes provisioning the volume of compute resources require to meet the completion criteria against a price constraint.

According to one embodiment, the processor is configured to analyze, automatically, the test suite to determine the compute tasks necessary to define the execution environment, execute the at least the portion of the source code, and execute the at least one test. According to one embodiment, the processor is configured to determine requirements for serial execution for the compute tasks; and wherein generating the instructions for executing the plurality of execution instances includes grouping the plurality of execution instances responsive to the requirements for serial execution. According to one embodiment, the processor is configured to determine capability for parallel execution for the compute tasks, and wherein generating the instructions for executing the plurality of execution instances is responsive to the determined capability for parallel execution.

According to one embodiment, the processor is configured to determine the capability for parallel execution for the compute tasks within any grouping based on serial of the plurality of execution instances. According to one embodiment, the processor is configured to generate a coarse schedule for the execution of the plurality of execution instances responsive to the determination of execution dependencies. According to one embodiment, the processor is configured to establish completion criteria for at least one of the plurality of execution instances. According to one embodiment, the processor is configured to generate an order for the execution of the plurality of execution instances responsive to the completion criteria.

According to one embodiment, the communicating the plurality of execution instances, includes generating, automatically, a distribution of the plurality of execution instances between a plurality of compute resources. According to one embodiment, the plurality of compute resources includes a plurality of networked virtual machines. According to one embodiment, the coarse schedule defines at least a plurality of compute tasks having dependencies that require serial execution. According to one embodiment, the processor is configured to generate a fine schedule within the plurality of tasks requiring serial execution. According to one embodiment, communicating the plurality of execution instances, includes generating, automatically, a distribution of the plurality of execution instances between a plurality of compute resources according to the fine schedule.

According to one embodiment, the processor is configured to isolate execution of at least some of the execution instances. According to one embodiment, the processor is configured to limit access to the at least some of the execution instances based on access privileges defined for the test suite. According to one embodiment, the processor is configured to isolate execution by performing at least one of: generating isolated virtual machines, generating a plurality of execution containers for the plurality of execution instances, and implementing processes isolation. According to one embodiment, the processor is configured to identify configuration files within the code repository to determine the configuration requirements. According to one embodiment, the processor is configured to identify patterns within at least one of the code repository and source code to determine the configuration requirements.

According to one aspect a computer implemented method for continuous integration of source code revisions is provided. The method comprises registering, by a computer system, a test suite for distributed execution, wherein the test suite defines source code and at least one test to be executed for an application, wherein registering includes identifying a code repository for the source code associated with the application to be tested, determining, automatically, by the computer system, configuration requirements for the test suite based on analysis of the code repository, wherein determining configuration requirements includes determining execution dependencies for the test suite and the application to be tested, generating, by the computer system, instructions for executing a plurality of execution instances, wherein at least some of the plurality of execution instances are configured to: define an execution environment based on the configuration requirements, execute at least a portion of the source code, and execute at least one test, communicating, by the computer system, the instructions for executing the plurality of execution instances to at least one compute resource, and receiving, by the computer system, results from execution of the plurality of execution instances.

According to one embodiment, the method further comprises an act of provisioning the at least one compute resource from a plurality of cloud compute providers. According to one embodiment, the method further comprises determining a cost for a plurality of compute resources available at the plurality of cloud compute providers, and selecting the at least one compute resource responsive to a price constraint. According to one embodiment, the method further comprises selecting the at least one compute resource responsive to a completion criteria. According to one embodiment, the method further comprises determining a cost for a plurality of compute resources, determining a volume of compute resources based on a completion criteria; and wherein the act of provisioning of the at least one compute resource includes provisioning the volume of compute resources require to meet the completion criteria against a price constraint.

According to one embodiment, the method further comprises analyzing, automatically, the test suite to determine the compute tasks necessary to define the execution environment, execute the at least the portion of the source code, and execute the at least one test. According to one embodiment, the method further comprises determining requirements for serial execution for the compute tasks; and wherein the act of generating the instructions for executing the plurality of execution instances includes grouping the plurality of execution instances responsive to the requirements for serial execution. According to one embodiment, the method further comprises determining a capability for parallel execution for the compute tasks, and wherein the act of generating the instructions for executing the plurality of execution instances is responsive to the determined capability for parallel execution. According to one embodiment, the method further comprises determining the capability for parallel execution for the compute tasks within any grouping based on serial of the plurality of execution instances.

According to one embodiment, the method further comprises generating a coarse schedule for the execution of the plurality of execution instances responsive to the determination of execution dependencies. According to one embodiment, the method further comprises establishing completion criteria for at least one of the plurality of execution instances. According to one embodiment, the method further comprises generating the order for the execution of the plurality of execution instances responsive to the completion criteria. According to one embodiment, the method further comprises communicating the plurality of execution instances, includes generating, automatically, a distribution of the plurality of execution instances between a plurality of compute resources. According to one embodiment, the plurality of compute resources includes a plurality of networked virtual machines.

According to one embodiment, the coarse schedule defines at least a plurality of compute tasks having dependencies that require serial execution. According to one embodiment, the method further comprises generating a fine schedule within the plurality of tasks requiring serial execution. According to one embodiment, the act of communicating the plurality of execution instances, includes generating, automatically, a distribution of the plurality of execution instances between a plurality of compute resources according to the fine schedule. According to one embodiment, the method further comprises isolating execution of at least some of the execution instances.

According to one embodiment, the method further comprises limiting access to the at least some of the execution instances based on access privileges defined for the test suite. According to one embodiment, the method further comprises isolating execution by performing at least one of: generating isolated virtual machines, generating a plurality of execution containers for the plurality of execution instances, and implementing processes isolation. According to one embodiment, the method further comprises identifying configuration files within the code repository to determine the configuration requirements. According to one embodiment, the method further comprises identifying patterns within at least one of the code repository and source code to determine the configuration requirements. According to one embodiment, the at least one test includes a test configured to pass upon execution.

Still other aspects, embodiments, and advantages of these exemplary aspects and embodiments, are discussed in detail below. Any embodiment disclosed herein may be combined with any other embodiment in any manner consistent with at least one of the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE FIGURES

Various aspects of at least one embodiment are discussed below with reference to the accompanying figures, which are not intended to be drawn to scale. Where technical features in the figures, detailed description or any claim are followed by reference signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
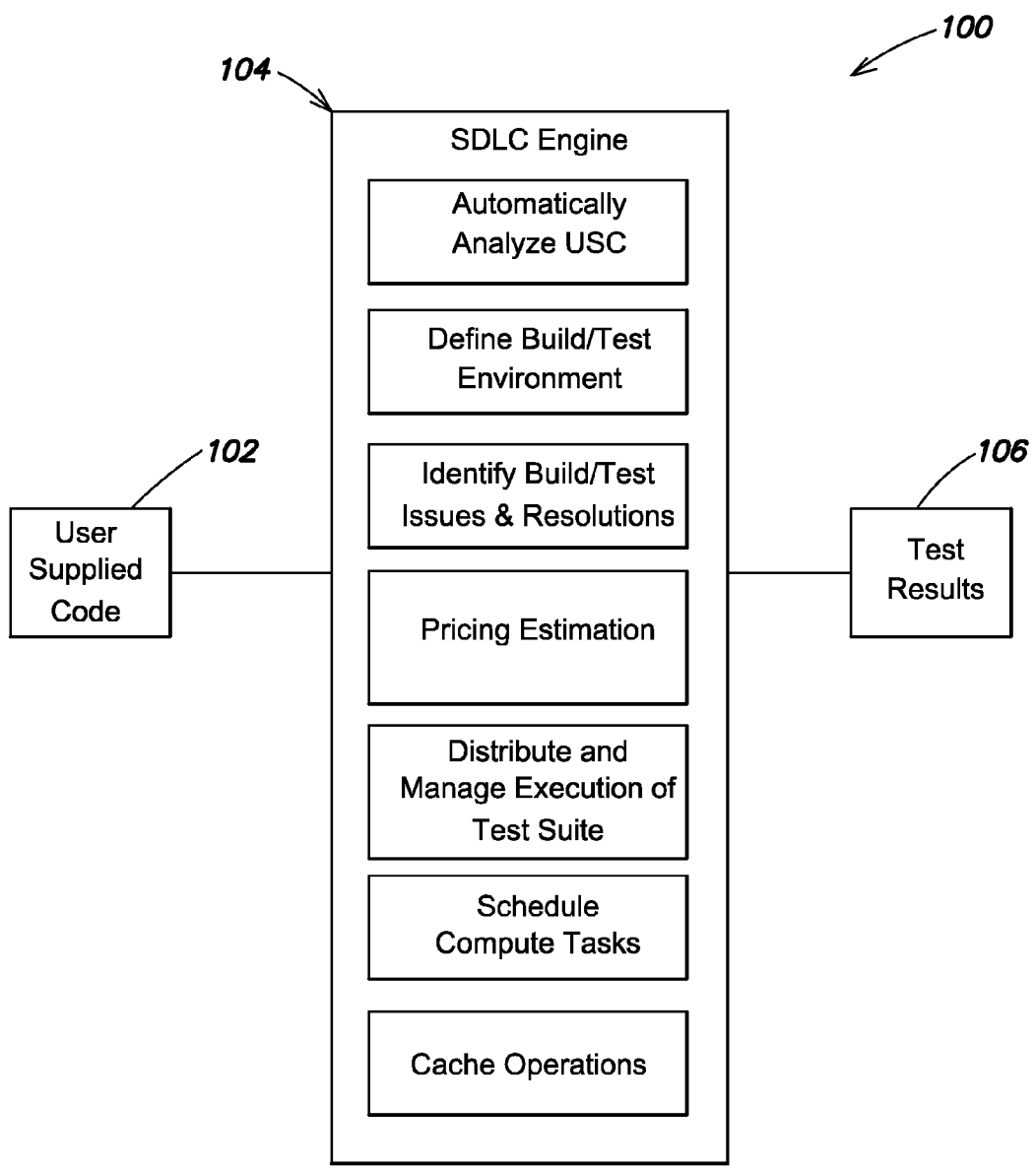
FIG. 1 is a block diagram of an SDLC system for automatically constructing a build and test environment using a software development lifecycle (SDLC) engine.

As described above, traditional methods of managing SDLC require end-users to generate build scripts, and manually configure and/or generate validation testing for the software builds. It is realized that needs exist for fully automated approaches for software build, development, and application validation without requiring user scripting. Such systems can be configured to automatically construct and execute software builds and any validation processes. Further SDLC systems are needed that provide for automatic distribution of executable components across available compute resources, including approaches for isolating execution of various test suite components and or build elements to insure safe execution of user code and/or validation tests. The SDLC system can be configured to partition any test suite including build and test execution tasks into execution instances. Each execution instance represents a portion of the compute work and associated code required in completing validation of the suite. Various SDLC systems can be configured to adapt completion of the execution instances to minimize computational costs and execution time, and can be further configured to maximize the parallelism of the distribution of the execution instances.

Various aspects of an SDLC system are discussed that allow fast, cost-efficient testing of software using distributed compute resources. The system is configured, for example, to support Test Driven Development (TDD) and Behavior Driven Development (BDD) for web applications using structured automated test frameworks that can be identified and generated based on common test and code patterns. Existing, new, and or updated code can be automatically built and tested for validation on an SDLC system. Testing can be executed based on test suites. A test suite is configured to include at least a portion of code and any dependencies necessary to run the portion of code. The test suite can include any number of test cases used to validate that the portion of code executes as expected. Typically, a customer submits code for testing by executing a registration process to define at least one test suite. The test suite include the code to be tested, any associated tests. From the code and tests the SDLC system can define a plurality of execution tasks for building an validation the code. The execution tasks can be partitioned into execution instances. In one example, the SDLC system builds virtual machines ("VM") to process each execution instance on a compute environment. In another example, the SDLC system assigns execution instances to existing VMs on the compute environment.

In some aspects, the SDLC system can be configured to emphasize ease of use, speed, correctness, and cost-effective use of cloud compute resources. In further aspects, security and isolation of users and/or processes can be emphasized. The system can also include components that execute in a variety of environments, including but not limited to the customer's development environment, a web service environment, a compute environment hosted by a cloud service provider, and a storage service, which can also be operated in a cloud environment or other network accessible location.

According to one embodiment, a system 100 (FIG. 1) is provided that includes a software development lifecycle (SDLC) engine 104 that receives user-supplied code 102, for example, through a web portal. As an example, the user-supplied code may include code developed for an application, various code segments having multiple versions, file-name organized code, code modules, code organized into an application project (including, e.g., code generated using conventional software version systems), code metadata, code descriptions, etc. The user-supplied code can also include virtual images of applications (e.g., virtual machines establishing an execution environment and the code to execute in the environment), and in some examples, can include tests to perform on code or portions of code to validate proper execution.

Shown in FIG. 1 is an example block diagram for an SDLC system implementing an SDLC engine 104. In some embodiments, elements of the system 100 can be provided using a computing system such as the computer system 1300 or 1302 described with reference to FIG. 13. In other embodiments, elements of the system 100 can be implemented using cloud based computing resources provisioned by cloud compute providers. In yet other embodiments, system 100 can be implemented across cloud based resources, local, and networked computer systems to provide functions associated with code building, source version control, and automated validity testing, for example, defined as a test suite.

According to various embodiments, the SDLC engine 104 can be configured to analyze, automatically, user-supplied code (USC) to generate a test suite for validating application builds from the USC. The automated analysis can include analysis of file names and/or file structure within the USC. In some examples, the SDLC engine is configured to identify common file name patterns, to define build parameters and/or environment parameters that apply to the USC in order to generate the test suite. The SDLC engine can also be configured to evaluate USC to identify file extensions, and in further examples, to more specifically identify files containing code specific build information, dependency information, standard dependency listings, open source references, source code project files, source code project information, etc. In some examples, known software development systems use known file extensions for files that contain configuration data and/or dependency information. In one example, the SDLC engine identifies a file containing configuration and/or dependency data and prepares build tasks based on that configuration and/or dependency data. The build task can be further separated into execution instances of the build work, in order to increase parallelism of execution of the build tasks.

Based on identified patterns, the SDLC engine can identify potential build issues, test issues, validation approaches, and can generate solutions for resolving the same. In addition to evaluation of USC, the SDLC engine can evaluate test cases associated with the USC to automatically establish a test environment and initiate, for example, cloud based execution of the available test methodologies. In some examples, the SDLC engine can also be configured to implement known tests based on identified patterns in the USC.

In some embodiments, the SDLC engine 104 can also be configured to automatically attempt a code build based on identified dependency information. The result of the build can be used to identify further issues. For example, if the build is successful, testing can begin. If errors are detected, the system can generate solutions or identify issues that cannot be resolved through system available resolution. In further embodiments, the SDLC engine 104 is configured to track executed builds, track identified errors, track error resolutions, and apply the tracked information into further automated resolution of issues.

In some embodiments, the SDLC system and/or engine is configured to instantiate test environments and pre-load overhead intensive applications so that various test suites can be executed within the preloaded environments. In some implementations, having preloaded environments enables the SDLC to execute testing automatically without the normal overhead associated with various memory intensive set-up applications. In one example, interpreted languages can require instantiation of a programming language interpreter in order to execute tests included in a test suite. For example, java based applications require instantiation of at least a java machine to execute user developed applications and perform any tests on the application. By providing the necessary dependency (e.g., the java machine) in a pre-loaded environment, the system can improve processing speed and efficiency.

As discussed, in some embodiments, the SDLC system, and for example, the SDLC engine 104 is configured to identify patterns in USC and/or associated test projects. The analysis of the code and test suites can be applied to distribute execution of build processes and/or test cases, to already instantiated environments. The SDLC engine 104 can also be configured to determine whether current resources are sufficient to enable execution of build and test operations, while meeting any deadline for their execution. The SDLC engine can request and confirm new cloud resources from a plurality of cloud compute providers to balance any deadline for execution against any price constraints.

In further embodiments, the SDLC engine can include components for automatically managing and distributing execution of test suites built for the USC and/or user-supplied applications. Further embodiments of the SDLC engine 104 can be configured for managing any scheduling of test execution, including reservation of cloud compute resource, pricing of cloud compute resources, and balancing customer deadlines for execution against pricing of the cloud compute resources. In one embodiment, the pricing components executed by the SDLC engine can include a pre-purchase cost estimator and post-purchase planning and projection tools. The SDLC engine can also enable specification of deadlines for execution and calculate costs accordingly.

Scheduling by the SDLC engine can include dynamic resource allocation and automatic scaling of build and testing operations. In some embodiments, the SDLC engine can also be configured to reserved or dedicate compute resource allocation and include fair-share scheduling of resources. In further embodiments, the SDLC engine is configured to implement "coarse" resource scheduling for major tasks, which can include, for example, build operations (e.g., get latest code, install dependencies, compile if necessary), environment definition, creation and scheduling, execution of a test suite, and subsequent action based on preceding results. Further scheduling can occur within each broad set of operations. In some implementations, fine tune scheduling is possible, for example, within operations to get the latest code. The resources required can be better defined and scheduled once a set of broad tasks are defined. In some embodiments, additional analysis is executed within any task, to further identify opportunities for parallelization and distribution of execution.

The SDLC engine can also be configured to achieve greater parallelism within each of the broader tasks. For example, in assembling code and or files for subsequent testing, the SDLC engine can analyze the files being captured to separate out the assembly, loading, and processing of the files into a binary image based on different execution classes, test case grouping, etc. The separated files, code, and groups can then be processed in parallel to increase speed of execution, all without user action. In other examples, the SDLC engine can examine the code to execute and the test cases defined in the test suite to identify test executions sharing common dependencies (e.g., analytic database is required for a group of test cases) and separate those from test executions without that dependency. The result, is the SDLC engine 104 identifies additional opportunities for parallel execution. The analysis by the SDLC engine can include analysis of historical information on prior builds and testing. In one embodiment, the SDLC engine is configured to apply heuristic learning to improve its analysis, based at least in part on prior executions.

Further embodiments can include caching of results of operations by the SDLC engine to feed back into the analysis process. In some implementations, the SDLC engine can also be configured to cache operations and/or results generated during test execution(s), and provide cached operations and/or results to parallel or subsequent test executions. In one example, the SDLC engine 104 can manage caching of large files produced by USC and/or test suite execution. The SDLC engine can be configured to direct caching operations between local storage and network storage locations, which can include cloud storage and resource requests to cloud storage providers. Further, the SDLC engine can cache results of any executed operation, whether executed as part of a build, a portion of test suite, among other examples.

According to some aspects, the SDLC engine 104 can also include components configured to interface with source control management systems (SCM), and can be further configured to start application builds and execute testing prior to updating code versions with any SCM. In further embodiments, the SDLC engine can be configured to manage construction of standalone test environments through cloud compute providers, and direct application builds for test through one or more cloud providers that incorporate any dependencies identified during the analysis of the USC, execution of testing on applications on cloud providers, etc. In some embodiments, a user of the system can specify code dependencies directly and/or identify specific portions of code to validate, and any associated tests. The SDLC engine can be configured to accept user specification, and interaction with an SCM to retrieve the specified code and any associated test cases.

In some embodiments, the SDLC engine 104 can be configured to manage distribution of parts of a test suite across a plurality of networked virtual machines. The SDLC engine can also be configured to direct instantiation and release of a plurality of network virtual machines, such that the virtual machines are available immediately upon a request for a code build and associated testing.

In other aspects, the SDLC engine 104 can also be configured to mediate interaction with customers, specific users of customers, and implement isolation procedures to insure access control over code builds, executing test suites, resulting output, and notifications regarding the same. The SDLC engine 104 can integrate with existing SCM systems within a customer environment to provide notification about code builds, any errors, validation results, and to facilitate convention SCM operations (e.g., deploy, build, check-in, etc.). In one example, the SDLC engine 104 can store validation notifications using a low-latency key-value store. Low-latency key-value stores can be implemented to dispatch real-time updates to subscribed clients. Additionally, the SDLC engine can store information regarding build and test results 106, deploys, and third-party data in a data warehouse. The historical information can be used to refine automated analysis by the SDLC engine (including, e.g., analysis of USC, test suite implementation, and can further be used to optimize parallelization of execution tasks). The historical information can also be communicated to subscribers.

Figure 2:
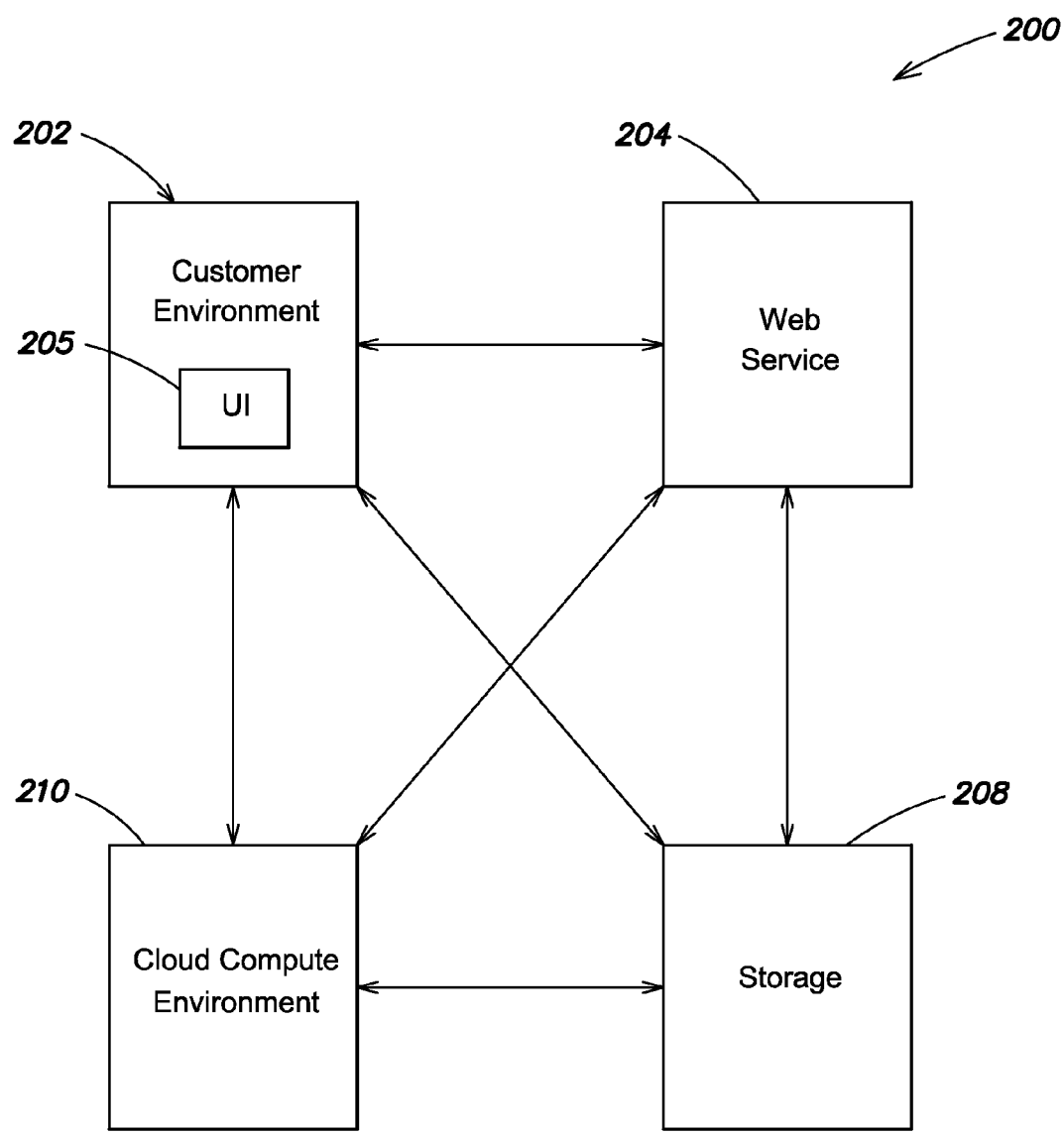
FIG. 2 is a block diagram of an example architecture for an SDLC system, according to one embodiment.

Shown in FIG. 2 is a block diagram of system components of one embodiment of an SDLC system 200. System 200 includes a customer environment 202, which hosts a customer's code repository. The code repository 202 can include source code, configuration files for organizing the customer's source code repository, test cases, and may include the customer's application being submitted for testing. In one embodiment, the repository interacts with a web service 204 through a user interface 205 that integrates with the customer's environment 202. The web service 204 manages definition of one or more test suites based on an application or portion of an application that the customer wishes to test. In some embodiments, the web service 204 automatically identifies code dependencies within the customer's code repository during a registration process. The web service 204 can be configured to analyze the code repository automatically, to establish a test suite having at least one validation test to be executed as part of the test suite. The registration process can be initiated by the customer using the user interface 205, which can be configured to allow the customer to specify any portion of code to be included in the test suite.

Once a test suite is registered, the web service 204 manages interaction with a cloud compute environment 210 to execute any defined tests in the test suite. In some implementations, the web service 204 can be executed on any systems accessible through a communication network. In other implementations, the computing resources for the web service 204 can themselves be provisioned and executed on resources provided by a cloud compute provider. The web service 204 is configured to manage the interaction with the cloud compute environment 210, by defining the execution tasks necessary to build the application to be tested, the execution tasks necessary to execute the test cases identified in the test suite, and managing requests to the cloud compute environment to execute those tasks.

In some embodiments, managing the interaction can include scheduling of execution of tasks with one or more cloud providers, providing an execution order for tasks, directing execution results to shared storage resources (e.g., 208), re-scheduling tasks responsive to completion or failure of prior tasks, monitoring results of completed tasks, monitoring executing tasks, etc. In some embodiments, managing and scheduling of execution tasks can include generating a plurality of execution instances that can be executed in parallel.

The web service 204 can also be configured to parallelize execution of a test suite at multiple levels. For example, certain phases of validation may be required to execute in series: capture latest code; install dependencies; compile as necessary; run test suite; and respond to output generated. These compute operations phases can be analyzed to determine parallel execution opportunities within each phase. Any execution tasks within each phase can then be allocated with greater precision to balance execution time against cost of requested compute resources.

The cloud compute environment 210 provides the computing resources to execute processes for generating and testing an application and/portion of an application for validation. The cloud compute environment 210 can also be configured to execute build operations, and execute associated tests to validate the build. In some embodiments, the web service 204 and the cloud compute environment 210 can be connected to a networked storage system 208. The network storage system 208 can provide a repository for build operations, to receive results of executed tests, and store analysis of USC, test cases, dependencies, etc. In some embodiments, the cloud compute environment can be defined across a plurality of cloud compute providers, each of the plurality of cloud compute providers making available a compute resource for executing compute tasks.

In some examples, controller processes can be constructed as part of build operations or environment definition to insure the execution across compute providers occurs, for example, consistently, with required dependencies, in order, and/or securely. In other examples, the cloud compute environment can include compute resources from the customer environment. The controller processes can be constructed by the system to manage execution of operations on customer based computer system in the same manner discussed with respect to managing execution of cloud compute provider resources. In some embodiments, operations discussed with respect to balancing price of compute resources may be excluded. However, in other embodiments, the system is configured to track the amount of compute resources/cycles executed by any customer environment system to insure fair and accurate pricing. Further, a customer environment may also provide compute resources with a pricing schedule to enable consistent analysis across an executed test suite regardless of the compute resources employed.

Figure 3:
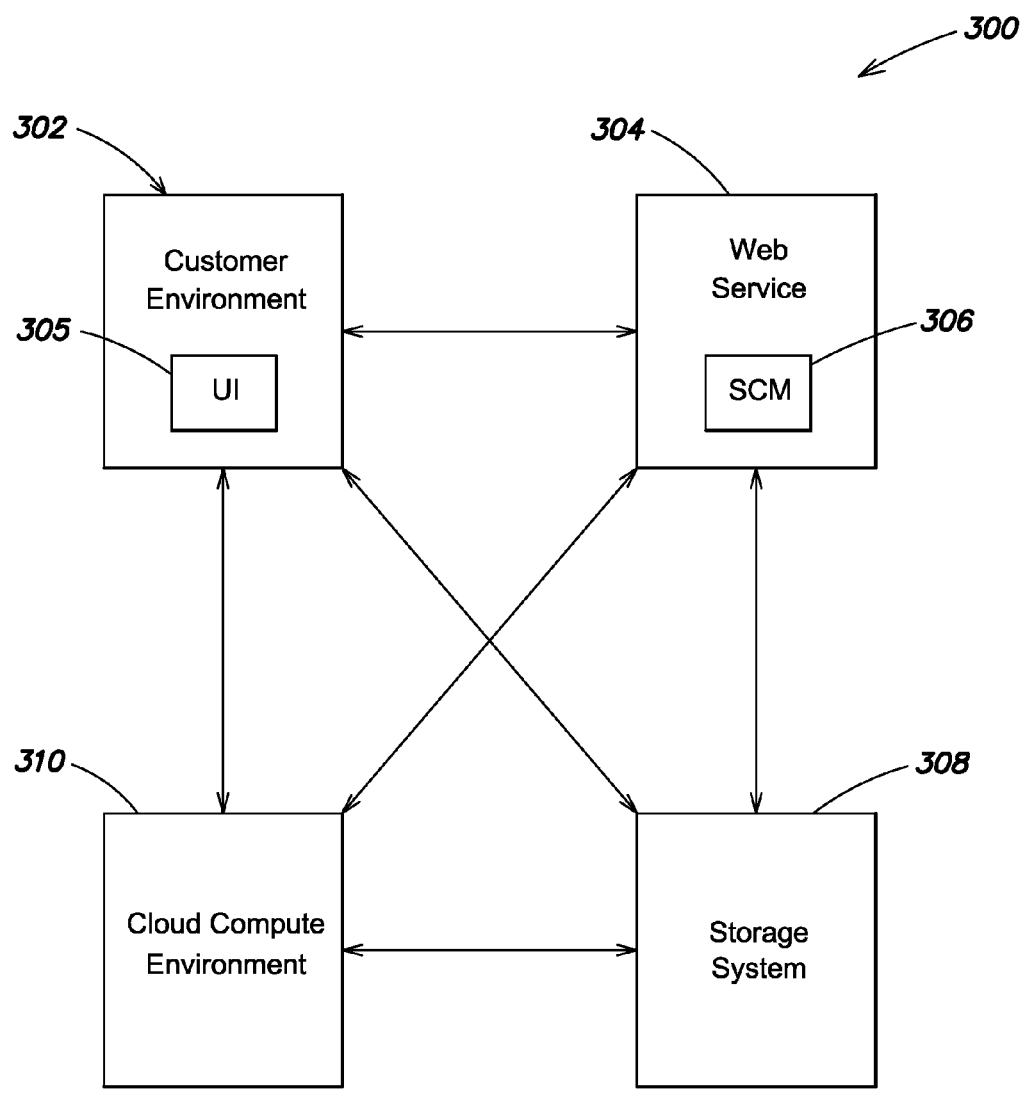
FIG. 3 is a block diagram of an example architecture for an SDLC system, according to one embodiment.

FIG. 3 illustrates an example architecture for an SDLC system 300. System 300 can be configured to provide the features and functions discussed above, including, for example, with respect to system 200. In particular, system 300 includes description of components and features that are responsible for specific operations within the SDLC system 300, although in other embodiments, the specific operations can be implemented with other components and may be distributed differently between the components described.

Similar to system 200, system 300 includes a customer environment 302, and a code repository, a web service 304 for managing automated build and test environment construction and application validation. System 300 also includes a cloud compute environment 310 and networked storage space 308. According to one embodiment, the customer environment 302 includes customer's repository, a user interface tool 305, and the customer's application under test. The user interface tool can include a command line interface ("CLI"), which can be downloaded by the customer (e.g., from the an SDLC web service 304) that provides functions to manage automatic build and test procedures through cloud compute providers. The repository can be configured to store the customer's test cases, any source code, and any dependencies for the source code, which can be required for test execution. In some embodiments, the customer's environment 302 can also include a source code management and version systems ("SCM"). The source code management and version management systems can provide conventional management tools for tracking source code, source code revisions, code dependencies, and manage associated test cases. Some convention tools can include, for example, The Concurrent Versions System (CVS), Subversion, GIT, Google Code, etc.

In one example, the customer environment is configured to include GIT (a publicly available source code management and versioning tool) to manage test cases and source code. The installed user interface 305 (e.g., a CLI) can be responsible for coordinating execution of the tests and retrieval of the test results through the web service 304. The application designated for test or the "application under test" can include the customer's application or any executable portion thereof. The application under test can include web-based applications, among other options. The customer's application may be hosted on hardware operated by the customer at the customer site or the application may be hosted in the cloud (e.g., cloud compute environment 310). In one example, the customer may interact with the user interface to deploy tests to the web service 304 or to allow the cloud compute environment 310 to run tests against the customer application.

According to one embodiment, the user interface 305 can be configured to push the customer's tests and any necessary source code to support them from the customer's environment 302 to the web service 304. In one example, the web service 304 can be configured to include a hosted version of the SCM system configured at the client environment 302. In some embodiments, the client environment 302 is not configured with any SCM system. In some examples, the customer environment 302 need only to be configured to provide the most up to date version of any code, dependencies, and associated tests. The user interface 305 can provide the most up to date versions to the web service 304. The web service 304 can then automatically generate build and test environments to validate the up to date versions.

As discussed, for a customer environment using GIT, the web service 304 can be configured to include a hosted GIT server system 306. The user interface 305 can be configured to communicate description of the tests to run through the web service 304, which can be made available through an SCM system. The user interface 305 can also be configured to initiate testing via the web service 304 and to poll for results generated by completion of the tests. In some embodiments, the system 300 includes a network accessible storage system 308 configured to receive test results. The storage system 308 can also be configured to cache operations executed during an application build, automated analysis, test case execution, execution of test tasks, to reduce subsequent computational burden. In some embodiments, dependency analysis of USC and/or test cases can identify dependencies based on required access to a database. Further, analysis can identify that access alone is all that is required, enabling the web service to partition the associated execution tasks for parallel execution. Caching of the database itself can then be used to reduce operational burden.

In some embodiments, the user interface 305 can also be configured to collect results posted to the storage system 308. In some implementations, the customer can be responsible for examining the test results reported, and optionally, downloading more detailed test results. Detailed test results can include, for example, large data objects that may require significant bandwidth. One example includes a video object generated from a video capture of a test suite execution.

The user interface 305 can also be configured to manually destroy such results when they are no longer needed. In particular, providing clean-up operations on the customer environment 302, enables the customer to reduce associated storage costs. In one example, the customer can trigger garbage collection via the user interface 305. In other embodiments, the customer can invoke different processes to identify and delete stored data.

Figure 4:
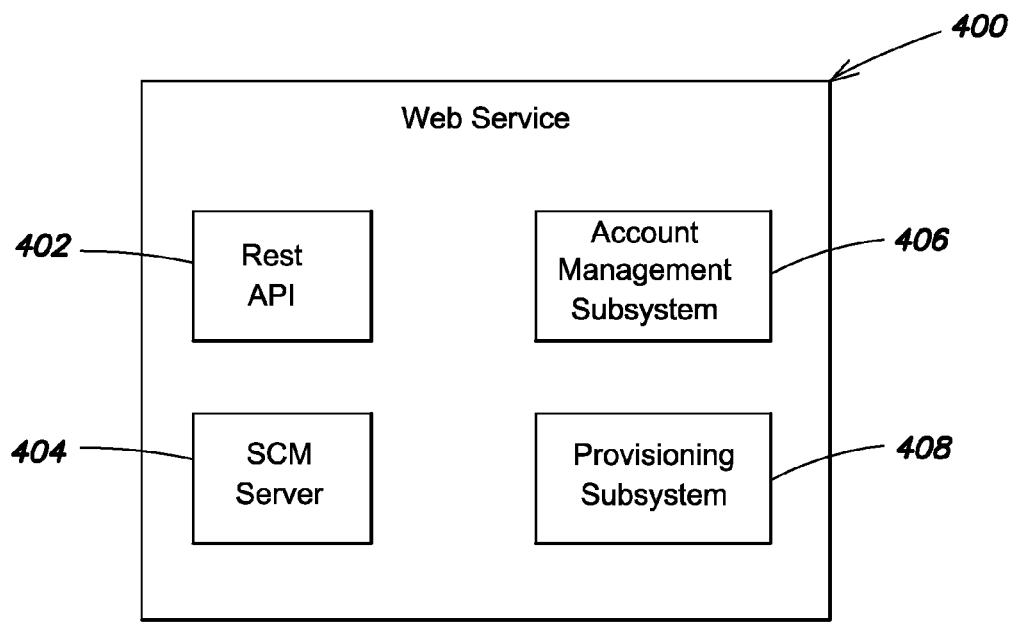
FIG. 4 is a block diagram of an example architecture for a web service, according to one embodiment.
Figure 5:
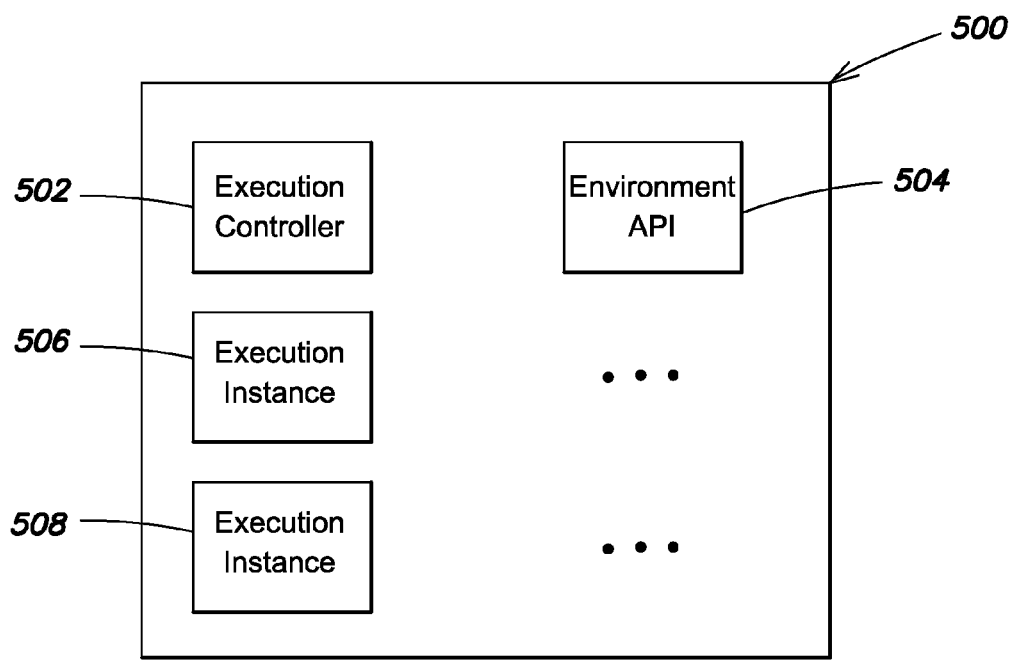
FIG. 5 is a block diagram of an example architecture for a cloud compute environment, according to one embodiment.
Figure 6:
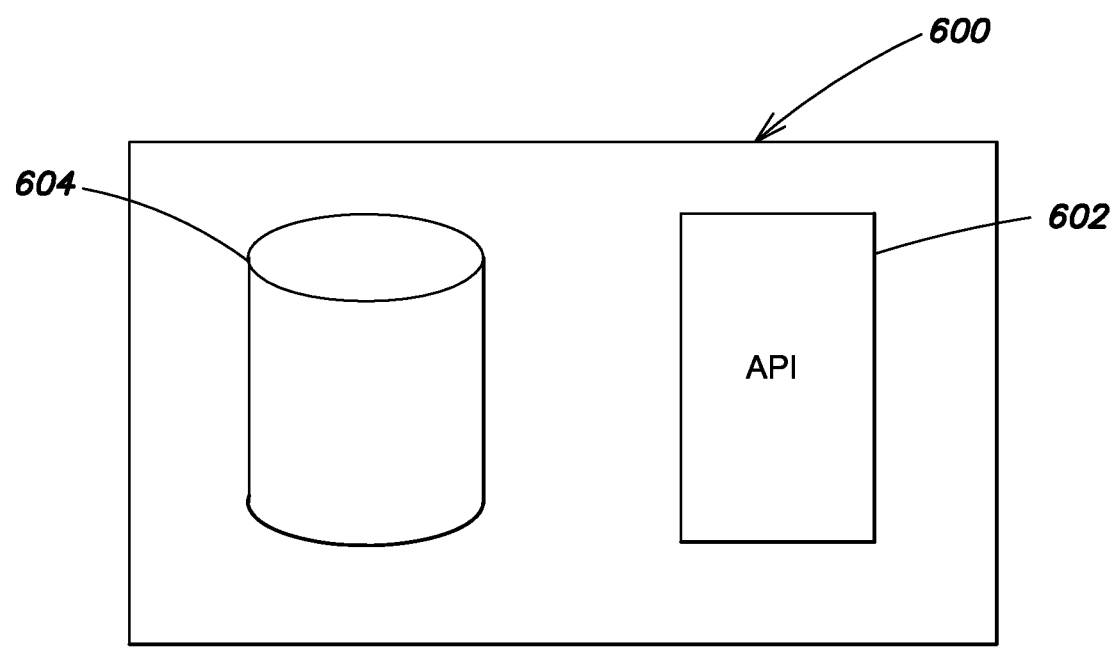
FIG. 6 is a block diagram of an example architecture for a shared storage system, according to one embodiment.

FIGS. 4-6 illustrate system component of an SDLC system (e.g., 200 and 300). FIGS. 4-6 illustrate additional components that can be implemented according to some embodiments as a web service (e.g., 304), a cloud compute environment (e.g., 310), and cloud storage system (e.g., 308). According to some embodiments, the additional components described with respect to FIGS. 4-6 can be implemented to execute and manage the specific functions as described. In other SDLC system embodiments the same functions can be executed and managed by other system elements and/or executed and managed more generally without specification of specific components.

FIG. 4 illustrates an example web service 400 that can be implemented as part of an SDLC system. Web service 400 can be configured with one or more separate components that manage, for example, registration of test suites, user interaction with the test suites, and the results generated by their execution. In one embodiment, web service 400 includes a REST architecture API 402 configured to accept commands from a customer environment. In other embodiments, different API architectures can be implemented to provide an interface between a customer environment and the web service. Details discussed with respect to the REST API can also be implemented in differently architected APIs.

According to one embodiment, the REST API 402 can be configured to allow a user interface (e.g., CLI) at a client to control the automated build, test and validation system. The REST API 402 can be configured to register a test suite, by requiring the client to specify a code repository, identify test cases, and provide access to any dependency information the client has available. In some implementations, the REST API 402 can be configured to interact with an SCM system to capture source code information. The REST API 402 can also be configured to interact with a hosted SCM system (e.g., 404). In some embodiments, registration through the REST API can include uploading source, test cases, dependency information, etc. to a hosted SCM 404.

In one example, the hosted SCM 404 is a GIT server. The SCM 404 can be configured to provide isolated and efficient storage of customer test and source code repositories. In some embodiments, the SCM 404 is optional for a web service 400. In some examples, the use of a hosted SCM 404, e.g., GIT enables for efficient distribution of code updates. In one example, a customer can push code updates to a hosted SCM, which causes the web service 400 to update execution tasks for a test suite. In another example, pushed code updates trigger the web service to automatically execute an associated test suite.

In some embodiments, web service 400 can also include an account management subsystem 406. The account management subsystem 406 can be implemented as a web presence or web portal accessible securely over a communication network, e.g., the Internet. The account management subsystem 406 can be configured to manage and/or create customer accounts. Further embodiments of the account management subsystem 406 are configured to provide access control processes and monitor and control billing for build and test validation. In some implementations, the account management subsystem 406 controls at least one security measure by providing API keys (e.g., ssh keys), which can be used to configure secure communication sessions, and further to isolate execution of test suites. The account management system 406 can also be configured to provide web-based access to test results and/or test session through a web interface. In some embodiments, the same information can be made available via interaction with the REST API 402.

Web service 400 can also include a provisioning subsystem 408. In some embodiments, the provisioning subsystem 408 can be configured to perform automated analysis of code repositories, test cases, and dependency information to automatically define the build and test environment needed to execute a registered test suite. The provisioning subsystem 408 can also be configured to manage cloud compute resources and the allocation of tasks to a cloud compute environment (e.g., 210 and 310). Further, the provisioning subsystem can also be configured to manage updates made to test suites, including updates to code, test cases, dependencies, among other examples.

According to one embodiment, the provisional subsystem 408 can include its own subsystems (not shown) including any one or more of a price collection component and associated database; a placement allocator for allocating execution tasks; an execution instance provisioner; an execution session manager; and a test execution engine. The provisioning subsystem 408 can be configured to manage price collection for cloud resources. The provision subsystem can include functions for dynamically determining price and capturing performance analytics for execution tasks deployed to a plurality of cloud resources and/or cloud service providers. In some embodiments, a pricing component of the provisioning subsystem 408 can be assigned to the task of collection pricing data, resource availability, and storing that information in a pricing database. The data collected can be used to inform the resource placement and allocation algorithms executed by the provisioning subsystems, a placement allocator component, and/or an execution instance provisioner component.

Various embodiments are configured to optimize placement and/or distribution of build and test execution tasks, as discussed in greater detail herein. These embodiments can be integrated with and/or implemented on the cloud compute distribution systems and methods discussed in co-pending U.S. Pat. App. Pub. No. US 2012-0131591, filed on Aug. 24, 2010, which application is incorporated herein by reference in its entity. In some embodiments, the provisioning subsystem 408 can be configured to execute the functions discussed with respect to distributing cloud compute tasks in U.S. Pat. App. Pub. No. US 2012-0131591, in addition to the functions discussed herein.

In one embodiment, a placement allocator component executed by the provisioning subsystem 408 can be responsible for generating a test suite description, and in conjunction with the data in the pricing database, construct a suitable schedule for deployment. Suitable in this context, requires the placement allocator to meet any pricing constraints specified by the customer, while also meeting any customer deadlines for completing execution. The placement allocator can be configured to optimize (minimize) the cost of running a test suite, optimize (minimize) the elapsed time to execute a test suite, or various combinations of both options.

In one embodiment, an instance provisioning component executed by the provisioning subsystem 408 interacts directly with various cloud service providers to provision (request) resources as dictated by the placement allocator component. The provisioning subsystem 408 can be configured to invoke a session manager to track the resources allocated for a particular session. The session manager can be configured to coordinate the synchronization of the build and test execution tasks. The build and test execution tasks can be organized as logical units defined on the system as a "repo." Each repo includes, for example, the block of code necessary to execute the operations to be tested, and the history (e.g., changes, revisions, versioning, etc.) associated with that block of code. The session manager can also be executed to prepare dependencies, including, for example, installation of system packages and software libraries necessary for a repo, among other potential dependencies. In one example, the session manager can construct virtual machines with the required dependencies that will be distributed amongst cloud compute provides. In other examples, the session manage can be configured to copy dependency data into cloud storage before tests are run. In further examples, the session manager can access, for example, cached dependency data to facilitate test execution.

The provisioning subsystem 408 can also coordinate the collection of test results, including for example, test results posted back to cloud storage (e.g., storage system 310). As discussed, the provisioning subsystem 408 can be configured to do so by executing the session manager component. Further, the session manager can be executed to manage releasing resources once an execution session has completed, or optionally, to manage caching execution elements (e.g., outputs, compiled code, data, dependency analysis, etc.) of the session temporarily in anticipation of further test runs.

According to one embodiment, the provisional subsystem 408 can execute a test execution engine configured to interact with a cloud compute environment. The test execution engine can be configured to interact with execution instance controllers within the cloud environment. According to one embodiment, an execution instance controller can be configured to initiate execution of a test within the cloud compute environment. In one example, the execution instance controller is dubbed the "emcee" based on its management role. The execution instance controller and the functions it can be configured to execute are also referred to herein under more specific non-limiting examples as the "test worker controller."

In one example, the emcee can be configured to direct execution of the execution instances, report on status, and enable fine tune scheduling/balancing of test execution during an execution session. In another embodiment, the emcee manages virtual machines executing test operations labeled "worker machines." In some examples, the worker machines can be configured to initiate requests to the application under test while running. Once the test completes (i.e., the execution instances are run or fail) the emcee can notify a web service (e.g., 204 and 304) and/or communicate outputs (e.g., data, pass/fail, etc.) to a shared storage system (e.g., 208 and 308). The provisioning subsystem 408 can also be configured to recycle or terminate any execution instances running in the cloud compute environment. In some embodiments, the provisioning subsystem 408 can call the test execution engine in order to recycle or terminate the execution instances. In some embodiments, the provisioning subsystem 408 can be configured to maintain the execution instances on a cloud compute provider, once a test session has completed. In particular, cloud compute resources are provisioned as a resource quantity for a period of time. So long as a provisioned period of time has not expired, the provisioning subsystem can be configured to maintain the provisioned resources until a next billing period of time is reached.

FIG. 5 illustrates an example block diagram of a compute environment 500, which, in one example, can be made available through one or more cloud compute providers. According to one embodiment, the compute environment includes an execution controller 502 configured to manage execution of a plurality of execution tasks. The execution tasks can be received from a web service (e.g., 204, 304, and 400), which when executed perform build and validation testing according to a defined test suite. The overall execution of the build and validation can provided as a logical unit or container, and the web service can control access to the executed operations and/or output generate according to access control for the container. A test session can include all the tasks defined by the execution tasks within each logical unit or container.

According tp another embodiment, the compute environment includes an application program interface ("API") 504 which manages external communication and/or requests on the compute environment 500. For example, the web service may communicate with the API 504 to request pricing and availability information on compute resources, schedule resources, specify constraints for execution, retrieve configuration information specified for execution tasks, etc. In one embodiment, the web service can interact with execution instances 506 and 508 on the compute environment through the API 504 which interacts with the execution controller 502 of the compute environment.

In one embodiment, the customer's test cases are run as execution instances 506 and 508. The execution instances can execute by virtual machines hosted on the cloud compute provider. The execution instance can also include generation of virtual machines to execute associated tasks. Some cloud providers offer different types of virtual machines, including different options for VM operating systems. The provisioning and test execution components of a web service can be configured to interact with one or more cloud providers to determine what types of VMs can execute, and what types of tests can be executed on those VMs. For example, some Windows VM instances are configured to only run tests that require Windows software; some Linux VM instances are configured to run tests that do not require Windows software; and other VMs can provide other operating systems and implement tests cases to run on them.

In one embodiment, the execution controller 502 provides an endpoint for the web service to control specific VM instances, and to issue commands to be executed from within the VM instance. Some non-limiting example functions implemented by the execution controller 502 are discussed with respect to an "emcee" which can be implemented as a virtual machine or a virtual server on the computer environment, among other options. In one embodiment, the emcee can be configured to initiate test execution and monitor running tests, for example, responsive to requests from a web service (e.g., 204 and 304). In one embodiment, when a test completes in a VM, the results of the test, usage statistics, and any output are posted to a shared storage system (e.g., 208 and 308) for subsequent retrieval by the customer. The execution controller 502 (including e.g., an emcee server) is also configured to send the web service gross resource usage statistics such as: test name and network, I/O, memory, and CPU usage. The gross resource usage information can be anonymized prior to communication to the web service. These resource usage statistics can be collected and analyzed by the web service to improve resource allocation and placement for subsequent testing, and in some example, to inform automated analysis/issue resolution performed by the web service on USC.

FIG. 6 illustrates an example architecture for a shared storage system 600. The shared storage system can include a data repository 604 and an API 602 configured to manage requests on and communicate data from the data repository 604. In some environments, the shared storage system 600 can be provisioned from one or more cloud compute providers. In other embodiments, the shared storage system 600 can be accessible to other system components over a communication network (e.g., the Internet).

According to one embodiment, the shared storage system 600 can be configured to store constructed test environments, store compiled code, aggregated code, organized code (e.g., any source repo) to avoid copying entire code blocks (e.g., repos) and/or to avoid building the test environment each time a test suite is run. In one example, the storage system stores software package and library dependencies for a test suite. Capturing dependencies from memory can substantially reduce instance startup time and computational burden in various embodiments. In one example, execution instances started in a cloud compute environment can be configured to mount software packages and libraries from the shared storage system 600.

The shared storage system 600 can also be configured to accept source code changes made during test execution, and push the changes to execution instances running in, for example, the compute environment 210 or 310. In some implementations, source changes can be communicated from an SCM system and pushed out from the shared storage system 600 to execution instances running tests.

As discussed, the shared storage system 600 can be implemented through cloud compute providers or can be made available over a communication network to other components of an SDLC system. The network available storage for an SDLC system is configured to provide a convenient place to store results for future reference. Further, network available storage enables the SDLC system to configure and run VM instances autonomously in a compute environment, while providing for the VMs to be shut down or recycled when tests complete. Autonomous execution of the test VMs enables the SDLC system to execute with greater efficiency and can, in some implementations, eliminate the need for a VM that collects the results of other outputs reducing the computational burden required to validate a test suite.

Additionally, shared storage provides for access to large results that may be too expensive to deliver to a customer over other system components. As some embodiments are implemented with cloud resources and priced according to the volume of resources consumed, delivery of large results can have significant cost impact. Storing large result can improve system efficiency and reduce the cost impact of communicating the result. In one example, users on the customer environment can be responsible for directing delivery of such large data, and can facilitate doing so with the least expensive compute resources. This can include, for example, a generated video file from a test suite execution, which can be copied to shared storage for eventual retrieval.

Figure 7:
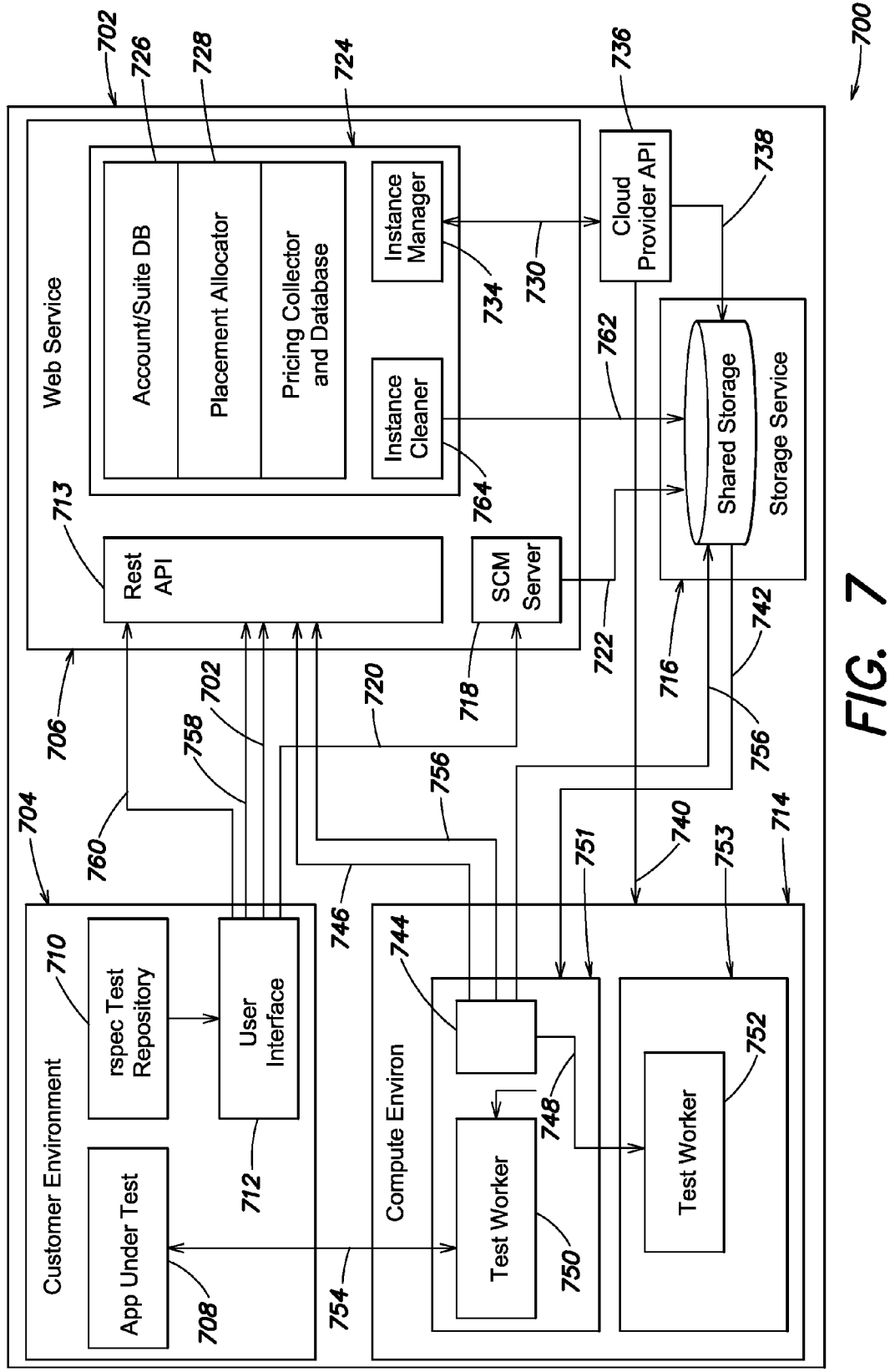
FIG. 7 is an example process flow and system diagram showing interaction of system components during operation, according to one embodiment.

FIG. 7 illustrates a process flow 700, showing interaction between components of an example SDLC system during build, validation, and test execution. Flow 700 illustrates functions and operations of the SDLC system 702, specific environment features, and implementation of specific components to handle functions executed during the process flow. In other embodiments, the functions implemented by the specific components can be executed more generally by the system components on which they reside. Further, the specific environment details are provided by way of non-limiting illustration to further understanding. The specific components illustrated in 700 are non-limiting examples of components for performing system functions.

Process flow 700 begins at 702, with registration of a test suite from a customer environment 704 to a web service 706. The test suite defines the source code the customer wishes to test and any test cases to be executed to validate the source code. The source code can be provided in a number of programming languages, dependent only on the customer's development selections. The source code is associated with an application to be tested, i.e. the "application under test" 708. At 702, the customer can interact with a user interface 712, which is configured to provide access to the web service 706. In some embodiments, the customer environment 704 includes an SCM system, which manages a source code and test case repository 710.

Web service 706 can include an API 713 configured to manage the interaction with the customer environment 704, and direct requests for system operations to compute environments 714, which can also include requests on a storage service 716 for accessing data, executables, and intermediate operations for testing and validating USC. At 720, USC is communicated to the web service 706 using user interface 712 and API 713. As discussed, the customer environment can include an SCM manager and user interface 712 can be configured to capture current versions of source code, version information, history, etc., from the SCM manager of the customer environment 704 and register the code with a hosted SCM manager 718. Additionally, any tests and/or test cases are also communicated to the web service 706 during registration. The code to be tested and any associated test cases are registered with the web service 706 as a test suite.

As discussed, the web service 706 can be configured to automatically analyze the registered code to identify any build issues that may results from implementing the USC. The web service 706 can also be configure to automatically identify known problems in build, test, and validation operations associated with identified patterns in the USC, and further to implement solutions to resolve those issues. If any identified issues cannot be resolved, the customer is notified by the web service 706, for example, through the API 713 communicating to the user interface 712. In some embodiments, the web service 706 is configured to notify the user responsive to implementing solutions, providing the user the opportunity to discard any changes made by the system to resolve problems, and/or present their own resolutions.

Assuming that any build, test, and/or validation issues are resolved or non-existent, the hosted SCM server 718 can be configured to communicate any source along with associated configuration data at 722 to be tested to a shared storage system 716. Additionally, at 722 the web service can prepare any environment requirements specified by the configuration files. In one example, the application under test 708 is developed using Ruby and implemented via the Ruby on Rails Framework ("Rails"). Under the Rails framework, the code blocks to be tested can be specified by "repo" for each block of code and associated revision history, and the preparation of the environment can include definition of .rvm files, which define the Ruby environment parameters required to run the repo, and can include the specification of dependencies required to run the repo. In other environments, different source code packaging architectures can define the source code block, associated history, and any dependencies required to execute the source.

A provisioning subsystem 724 can be configured to manage the partitioning of any test suite registered with the web service 706 into a plurality of execution tasks. Various components within the provisioning subsystem 724 can be configured to handle specific operations, however, in some embodiments, the provisioning subsystem itself can perform the operations discussed with respect to the specific components.

In one embodiment, an account management component 726 provides definition of access controls to the registered test suites, and can also provide grouping of test suites in access containers to provide access across groups of test suites. A placement allocator component 728 can be configured to partition any build, test, and/or validation tasks into the plurality of execution instances as part of an operation to provision resources at 730. The placement allocator can also be configured to define a distribution of the plurality of execution tasks. In one example, the placement allocator 728 is configured to maximize parallelism of the execution of the plurality of execution tasks, while meeting any pricing constraints and any deadline constraints defined by user. For example, the placement allocator can capture pricing and availability information for compute resources from a price collector component 732 and its associated database.

In some embodiments, the placement allocator 728 can also request the resources necessary to execute the plurality of execution tasks at 730. In other embodiments, the partitioning of the test suite into execution tasks and any determined distributions can be communicated to an instance manager 734 configured to reserve compute resources from, for example, a cloud compute provider at 730 through an API for the cloud provider 736. The instance manager 734 can also be configured to allocate storage resources with the storage service 716 for the execution of the plurality of execution instances, and can further allocate storage resources for caching of operations and outputs generated during execution of a test suite and its plurality of execution instances (e.g., 738). Allocation of storage can occur through the execution of a test suite, and can also occur anytime caching of data may be warranted.

The system, and in one example, the provisioning subsystem 724 can be configured to continuously analyze the execution of the test suite to determine if further resources are required. In one embodiment, further resources may be required to meet a customer specified deadline, and in another additional storage resources can be allocated for caching of large output files.

The plurality of execution instances can be generated as virtual machines for execution on a compute environment 714, for example, by the instance manage 734. The plurality of execution instances can also be assigned to existing virtual machines on the compute environment 714. Scheduling and distribution can include polling of existing virtual machines (VMs) and assignment to already running VMs, and can further include starting new VM resources as necessary. For example, provisioning at 730 can include starting and stopping execution instances at 740 on a compute environment 714.

In one embodiment, provisioning of resources at 730 is followed by mounting of the code block to be tested along with the necessary environment (including, for example, any dependencies) to execute the code block at 742. In one example, the code and any dependencies are mounted on virtual machines (e.g., 751 and 753) executing on the compute environment 714. In another embodiment, the code block and environment can be communicated directly to the compute provider and virtual machines can be started to run the code, incorporate dependencies, and execute tests. Mounting a code block and environment can provide significant computational savings, especially, where the code and/or environment is subsequently loaded in further tests, or referenced in other tests. In some further examples, executions performed on the compute environment 714 can generate compiled code, large files, and/or intermediate outputs which can be cached to the storage service 716 for subsequent use by other executions.

The compute environment can be configured to include an execution controller 744, which is configured to manage the detail of the execution of communicated code and environment information, for example, at 730 and 740-742. In some embodiments, the actual tests to be executed on the code can be retrieved at 746 as part of execution of the plurality of execution instances at 748. At 748, any tests specified for a test suite are executed. The execution can be distributed across the plurality of execution instances, and/or virtual machines associated with the plurality of execution instances. The execution controller 744 can be configured to manage assignment of execution tasks to the provisioned resources as part of test execution at 748.

Each of the plurality of executions instances, can be run as a plurality of virtual machines as part of test execution at 748. In some embodiments, the actual execution of the tests can be handled by different components executed on the compute environment 714. The start up and execution of testing can occur in stages as discussed in greater detail below. In one embodiment, stage 1 includes establishing the execution environment, which can persist through execution of the next stage and multiple executions of the second stage. In the second stage, worker instances execute specific tests using the defined environment from the first stage.

According to one embodiment, test cases are executed by test workers (e.g., 750 and 752) run on virtual machines (e.g., 751 and 753) under control of the execution controller 744. In one example, the execution controller is configured as discussed herein with respect to the emcee, and can, for example, control stages of test execution and management.

In one example, the virtual machines responsible for executing the test can include a server system that coordinates a set of parent processes to start and listen for control commands, which are forwarded to an appropriate one of the parent processes, by matching execution requirements to the instantiated parent process. If no parent can process a test successfully, the server system can fall back to instantiating a non-preloaded execution mode for running the test.

In some embodiments, the parent processes are configured to start and pre-load a configurable set of common software modules. Dependency analysis performed by the web service (e.g., 706), as well as historical run information can be used by the system to select the configurable set of common software modules. In one embodiment, the parent can be configured to install a different set of configurable software for different types of tests. For example, the parent process may load the rails ruby module for tests that interface with a rails application. In another example, a parent process can be configured to load a java web application framework for java tests. Once the parent has started, the parent is configured to wait for control commands. Responsive to a control command to start a test program, the parent process forks a copy of itself as a "worker" (e.g., using the unix fork( ) system call). The forked test worker has all the settings (including for example, environment and dependency requirements) from the parent, and is set to run a test program within the preloaded context.

During execution the virtual machines 751 and 753 and/or the test workers 750 and 752 can make requests on an application under test. In one example, the virtual machines 751 and 753 and/or the test workers 750 and 752 can communicate with the application under test 708 executing within the customer environment 704 at 754 to validate functionality of the application under test. The results of the testing are distributed at 756. Step 756 can include communication of the test results to both the API 713 of the web service 706 and the storage service 716. Alternatively, communication of test results can occur to one, the other, or both.

In some embodiments, the user interface 712 can be configured to poll the web service 706 for results of the tests at 758. At 760, testing result can be returned. Once results have been returned the web service 706 and more specifically the provisioning subsystem can be configured to capture test statistics, cleanup any storage resources on the storage system 716, and release compute resources on the compute environment 714 at 762. In one example, an instance cleaner component 764 of the provisioning subsystem 724 can be configured to manage clean up of storage resources, compute resources, and to capture usage/test statistic for any executed test suite.

Figure 8:
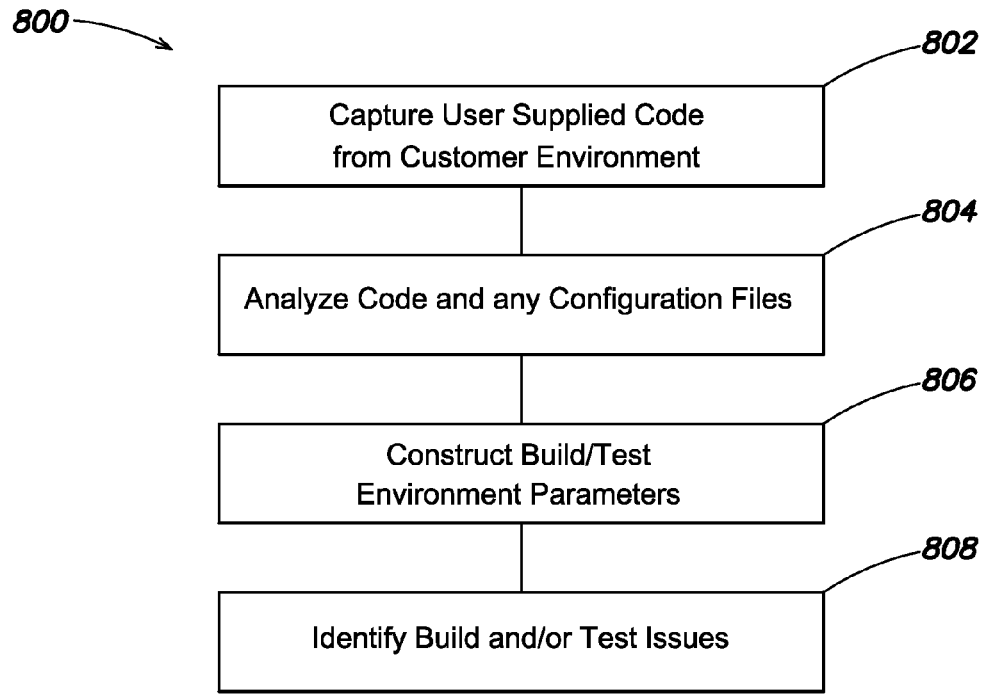
FIG. 8 is an example process for registering a test suite, according to one embodiment.

As discussed, process flow 700 illustrates one example of interactions between components of an example SDLC system during build, validation, and test execution. Various components of an SDLC system can executed different processes and may perform the described operations in different order. FIG. 8 illustrates an example process 800 for registering a test suite, that can be executed by, for example an SDLC engine, further an SDLC system can execute process 800 as part of an overall process for build and test execution.

Process 800 begins at 802, with capture of user-supplied code from a customer environment. Capture at 802 can take place as part of a registration process, as discussed herein. In one example, a user connects to a web service to registered code from their environment. At 804, the code and any configuration files within the code are analyzed, to automatically construct build/test environment parameters necessary to execute testing on the user-supplied code at 806. In some embodiments, the user-supplied code is associated with test cases. The test cases can be run to validate any changes, updates, and/or revisions to a code base. The code base can be associated with an application, and various test cases can be configured to validate functionality provided by the application. Existing test cases can also be captured with user-supplied code (e.g., at 802 as part of capture of the user-supplied code) and analyzed (e.g., at 804). The analysis of the user-supplied code, configuration files, and any test cases can also be used to construct environment parameters necessary for build and test of the user-supplied code (e.g., at 806). In some embodiments, the user can explicitly define configuration files for specifying test cases, and user-supplied code to include in a specific test suite. Analysis at 804 can proceed on any defined configuration files. In some examples, the user can identify such configuration files, if for example, the configuration files do not have known extensions. As discussed with respect to system examples, code analysis can include searching for specific file extensions to identify configuration files (including for example, make files, package files, rake files, gem files, etc.)

Further, the analysis of the user-supplied code can be used to identify build and/or test issues at 808. In one example, the process 800 can identify missing dependencies as part of 808. In another example, improper code versions or improper dependency versions can be identified at 808. Optionally, process 800 can include steps to resolve identified issues. For example, for missing dependencies, the associated code can be used for a build without the missing dependency. If the build is successful, the missing dependency information is likely an artifact of prior code revisions. In one embodiment, the user or client who registered the code at 802 can be notified of the issue and the resolution. A similar approach can be taken in response to an improper version reference, for example, by testing builds against the improper version to determine if the build is successful, regardless of the identified dependency issue.

In various embodiments discussed herein, various analysis methodologies and functions for user-supplied code are discussed with respect to specific examples and embodiments. Any of the code, dependency, and/or test cases analysis methodologies (and any combination thereof) can be executed more generally at 804 as part of the analysis of user-supplied code performed by an SDLC system, and SDLC engine, and/or components thereof.

Figure 9:
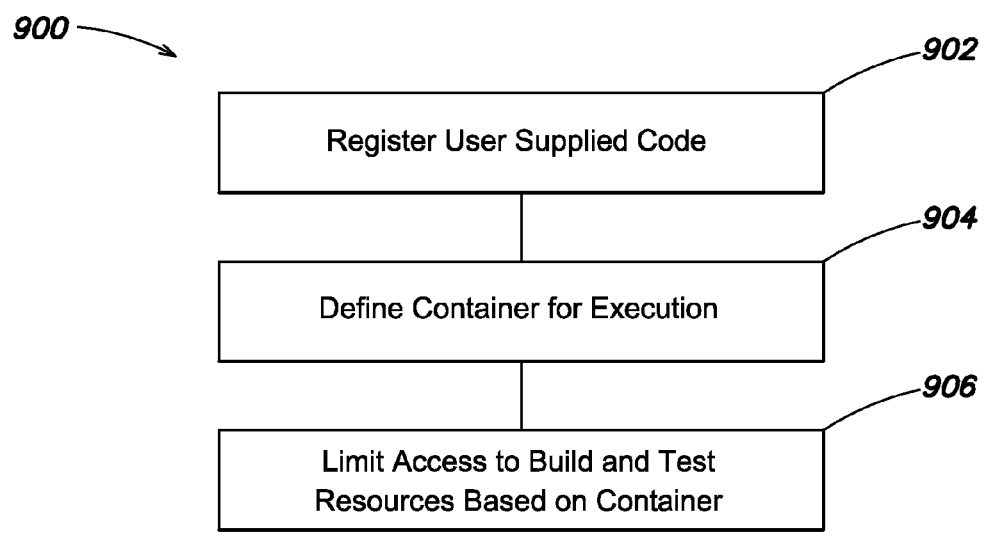
FIG. 9 is an example process for isolating execution of testing and/or validation of user-supplied code, according to one embodiment.

In some further embodiments, the SDLC system and/or SDLC engine can be configured to execute other processes. Shown in FIG. 9 is an example process 900 for isolating execution of testing and/or validation of user-supplied code. According to one embodiment, process 900 can be executed to isolate execution of test suite from other testing processes. Process 900 can also be executed to limit access to running tests, builds, test output, and any analysis information.

According to one embodiment, process 900 begins at 902 with a client (e.g., user) registering USC for testing and/or validation. At 904, a container can be defined for the registered test suite. The container can be a process wrapper configured to limit access to executing processes. Access can be limited to specific users and/or authorized accounts within the definition of the container. In some settings, encryption keys can be used to isolate execution within a container. For example, only authorized users and/or accounts are issued the encryption keys that permit access to the container and any process, execution, and/or data defined therein. In other examples, inter-process communication can be secured using encryptions keys and access to the secured communications can be limited as part of the definition of the container at 904. Various conventional containment and/or access control methodologies can be implemented as part of 904, and used at 906 to limit access to test operations, build operations, generated data and any output. For example, UNIX process control and/or access control systems can be used to define containers for test suites.

In some embodiments, containers can be defined on the system to permit access between multiple test suites, permitting operations of one test suite to be accessible and/or useable by operations executing in another test suite. In one example, the virtual machines that execute specific test functions of the different test suites can be implemented within the same container.

In some implementations, the client registering a test suite for execution can specify a security plan, and access control measures to be implemented for their test suites. The access control can be changed by users having administrative privileges associated with defining the security plan and/or access control measures.

In further embodiments, isolation techniques can be implemented at any level of execution. In one example, the smallest logical unit of execution (i.e., a single block of code) can have its own access control measures. In another example, each process executed during build, test, and/or validation can also be isolated. Further isolation options and functions are discussed herein, which options and functions can be executed as part of process 900 (including e.g., at 904). For example, process 900 can be executed by an SDLC system to provide for user and identity control. User and identity control enables the SDLC system to provide secure multi-tenant operation and team collaboration between users. Further container implementations generated from execution of process 900 can include physical and/or logical partitioning of compute resources to insure isolation.

Figure 10:
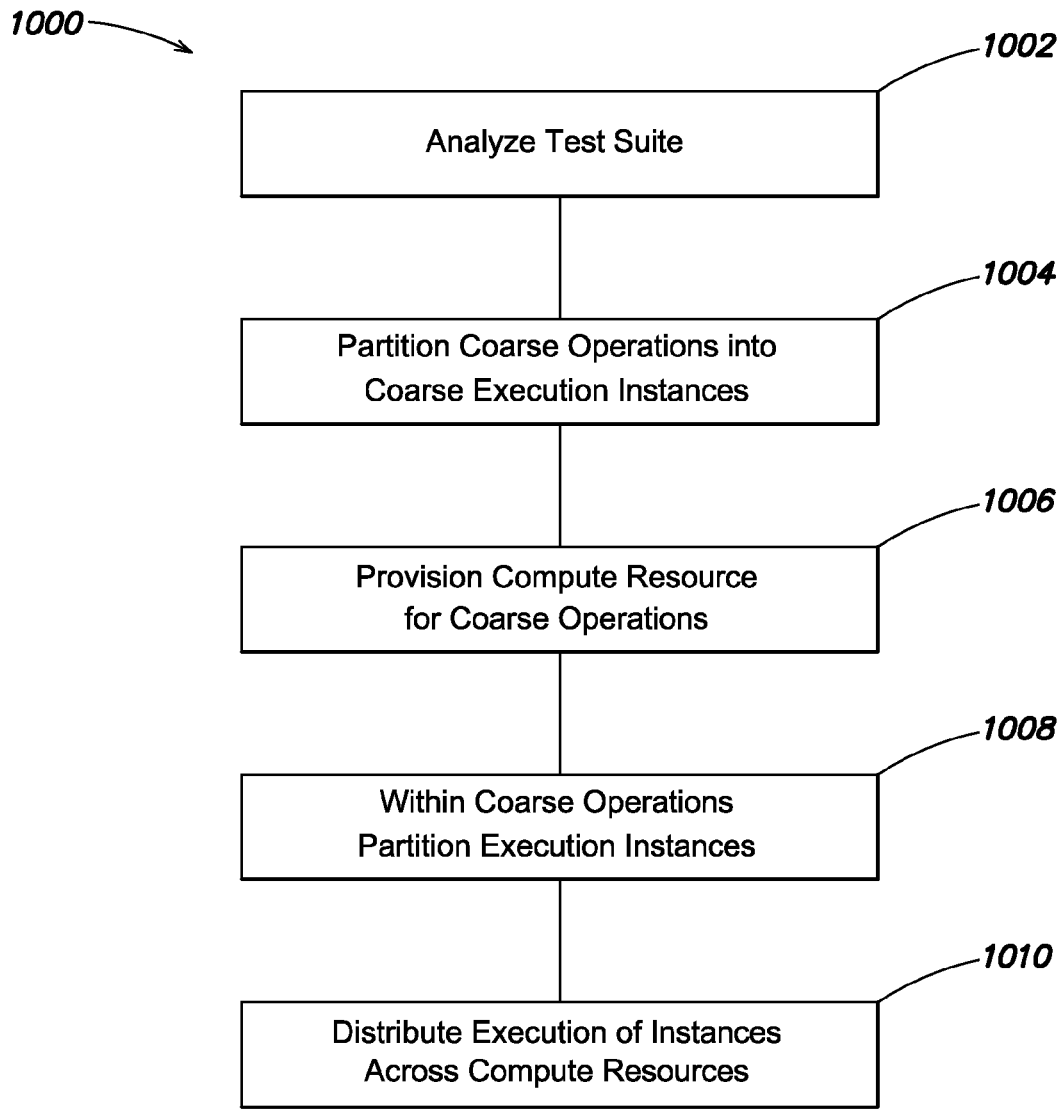
FIG. 10 is an example process for provisioning compute resource to a test suite, according to one embodiment.

FIG. 10 illustrates another example process 1000 for provisioning compute resource to a test suite. In various embodiments, process 1000 can be executed by an SDLC system, and SDLC engine, and/or components of either. Process 1000 begins at 1002 with analysis of a test suite. Based on analysis of the test suite, which can include, for example, dependency analysis, any operations necessary for performing builds, testing and validation are identified at 1004. According to some embodiments, coarse operations are first identified and partitioned at 1004 according to the coarse operations that need to be executed. Any compute resources needed to execute the coarse operation can be requested, reserved, assigned to already available compute resources at 1006.

According to one example, coarse operations can be identified based on task that cannot be executed in parallel. In other words, coarse operations can be identified as part of 1004 based on tasks that need to be executed serially. For example, build, test, and/or validation operations may require (1) accessing the latest code for execution on a compute resource; (2) installation of the dependencies required for execution of the latest code; (3) compilation of the latest code into executable format; (4) running of tests within a test suite; and (5) taking appropriate action responsive to output and/or result of the prior steps. In some embodiments, each of these groups of operations must be completed before the next group of operations can be complete. Thus, the example illustrates coarse groupings of operations to be performed. In one example, the grouping of operations are coarse, because further refinement of execution is possible within each group. For example, the operations associated with accessing the latest code can be further partitioned in a plurality of execution tasks at 1008. The distribution of the plurality of execution tasks can be balanced across any available compute resources, which allows for maximization of parallel execution. In another example, mounting of execution dependency can be distributed across a plurality of execution instances (e.g., virtual machines). In one implementation, a plurality of virtual machine can adopt a specific dependency required by portions of the tests to be executed. Dependency analysis from 1002 can provide information regarding dependencies of specific tests. The tests can then be grouped for parallel execution based on, for example, having different dependencies. In other embodiments, analysis at 1002 can include analysis of execution history for a test suite or specific tests within a test suite. In one example, historical execution information can identify execution instances that do not share any resources, and do not contend for resources during execution. Such executions instances can also be partitioned on that basis as part of 1008, partition into further execution instances.

Once operations are further partitioned within a coarse group the further partition tasked can be assigned with greater precision, at 1010. For example, the coarse provisioning at 1006 can request a group of virtual machines that are configured to accept the execution instances to perform any associate operations (e.g., build, test, analyze, report, etc.). The provisioned virtual machines can then be assigned the partitioned plurality of execution instances from 1008, to maximize the parallel execution of those instances. Further, the execution of those instances can be balanced such that the specific operations are complete execution nearly the same period of time.

As discussed, analysis of a test suite at 1002 can include a-priori identification of operations for build and/or testing of code to partition. A-priori segmentation of both coarse and fine tuned tasks (e.g., at 1004 and 1008) can be augmented by historical tracking of prior executions and further analysis of dependencies during actual executions.

Figure 11:
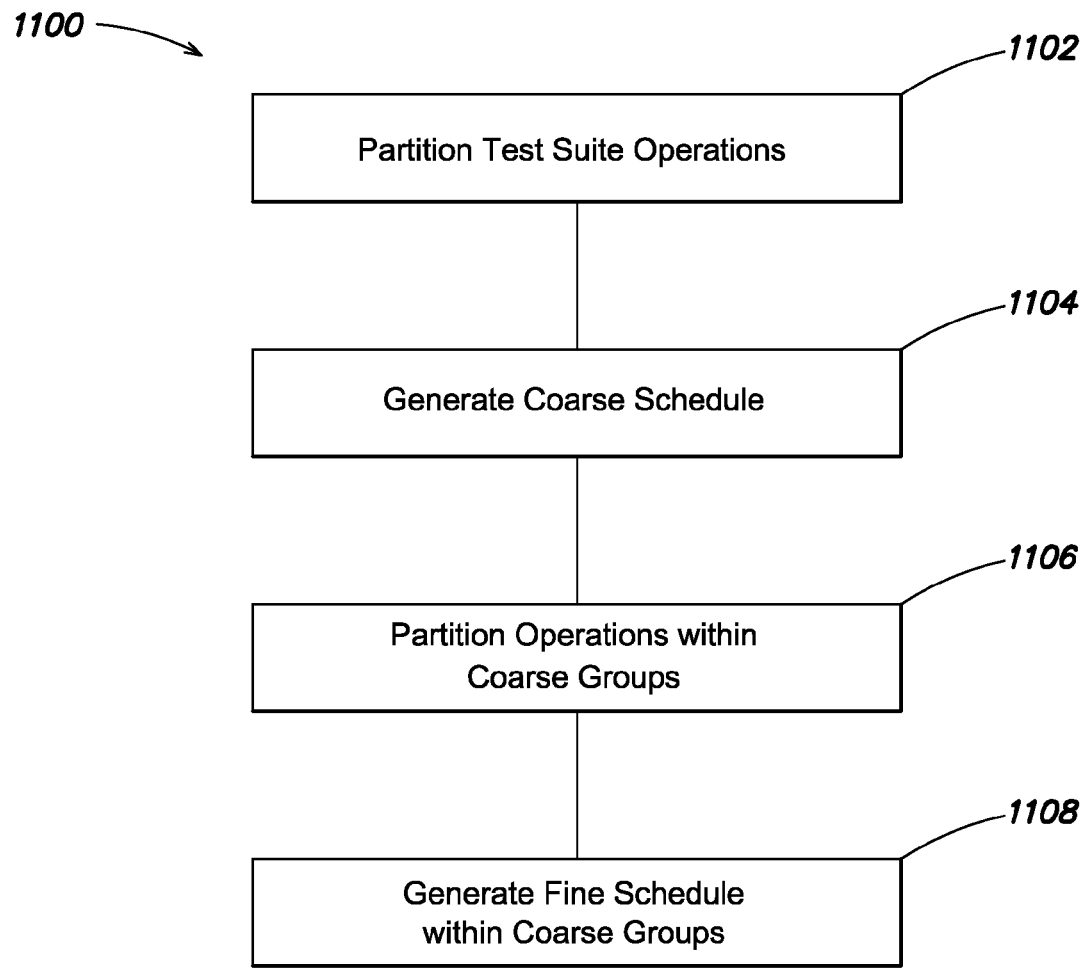
FIG. 11 is an example process for scheduling the execution of tasks, according to one embodiment.

In some embodiments, historical tracking and analysis can also inform other operations, and can be implemented in other processes. For example, scheduling operations can be implemented together with the partitioning of tasks. FIG. 11 illustrates an example process 1100 for scheduling the execution of tasks. At 1102, operations associate with build and test execution for a test suite are partitioned based operations that can be executed in parallel. Partitioning can occur as discussed herein (including, e.g., during execution of 1000), and may occur based, at least in part, on dependency analysis of the test suite. Based on a coarse grouping of operations, a coarse execution schedule can be generated at 1104.

According to some embodiments, generation of the coarse schedule can include determination of a schedule that meets any execution deadline specific by a user, while balancing the deadline against any specified price constraint. Generally, requesting additional compute resources enables completion of a test suite execution in a shorter period of time, for example, relative to any execution using fewer compute resources. Naturally, the larger the number of resources requested, the larger the cost for completing the execution of the test suite. Thus, the generation of the coarse schedule at 1104 can include balancing cost and deadline considerations. Within coarse groupings and any coarse scheduling from 1102-1104, further refinements can be executed.

According to one embodiment, execution task can be further partitioned at 1106, based, at least in part on, dependency analysis of a test suite. In other examples, analysis of a test suite can identify specific patterns within user-supplied code that indicate the potential to separate portions of execution. Further, identification of patterns within tests to be executed can also be used by the system to identify partitionable tasks. Responsive to defining a finer partition on the tasks to be executed (e.g., 1106), process 1100 continues with generating a fine scheduled for the tasks at 1008. For example, a provisioning subsystem can execute process 1100 to generate a fine tuned schedule for one or more coarse groups of execution tasks. The further scheduling of operations within operational groups enable more precise balancing of execution tasks across available resources. In one example, the schedule generated at 1108 can favors existing compute resources (i.e., already running) and can include, steps of determining, if the already running resources are sufficient for any deadline and price. Additional determination at 1108 can include calculating overhead for requesting and starting additional computer resources, as well as balancing execution across existing and newly started compute resources.

In some embodiments, process 1100 and process 1000 can be closely linked, and even executed together to partition and schedule tasks. In some examples, the common operations discussed would not be executed twice but provide synchronization. Further embodiment discussed herein, describe additional details, functions, and specific implementation examples regarding partitioning and scheduling compute task. The details and functions discussed can, in some embodiments, be implemented more generally as part of respective processes 1000 and 1100.

Figure 12:
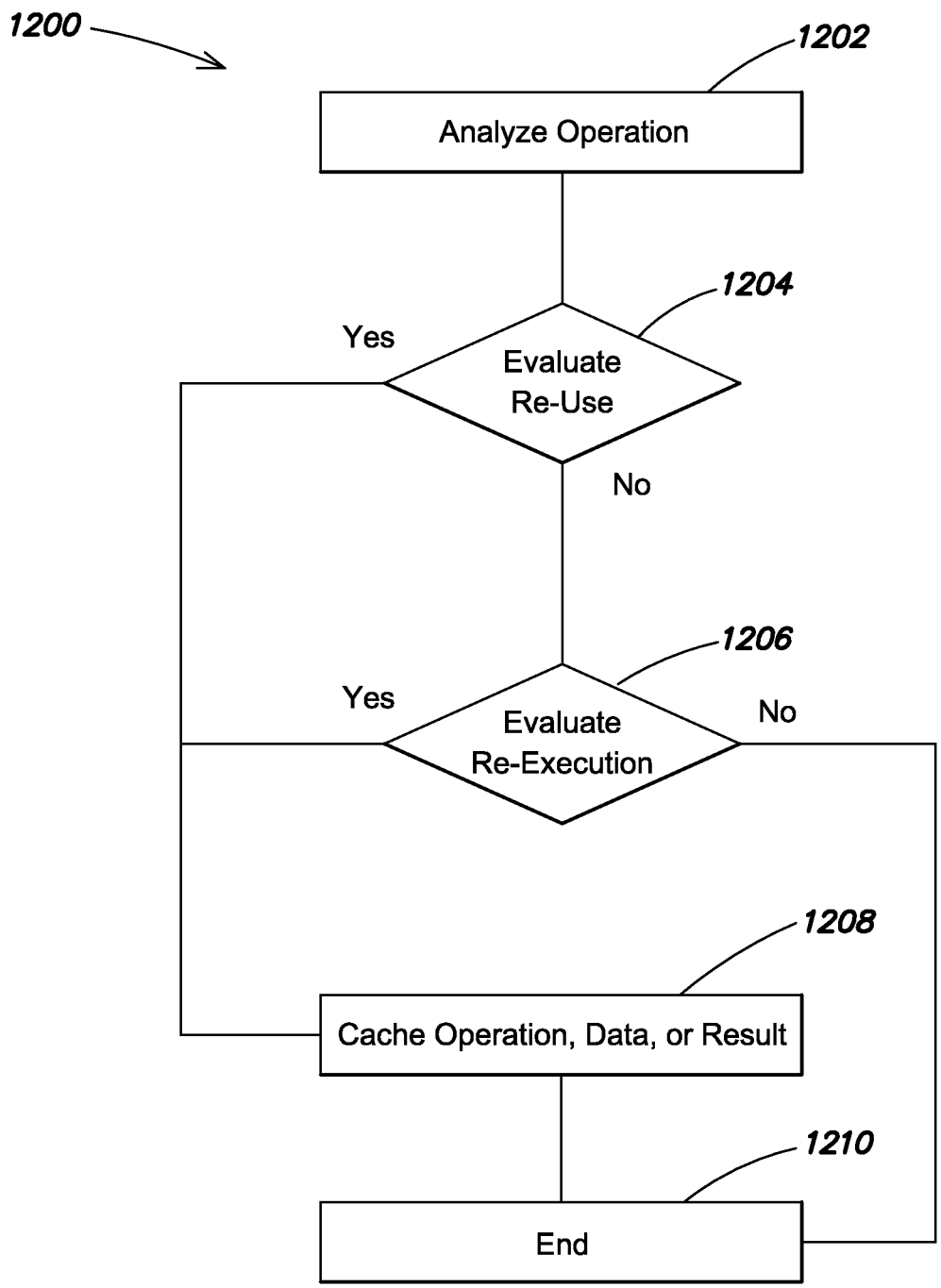
FIG. 12 is an example process for caching of execution tasks during test and validation of user-supplied code, according to one embodiment.

FIG. 12 illustrates another example process 1200 that can be executed by an SDLC system, an SDLC engine, and/or specific system components. Process 1200 provides for caching of execution tasks during test and validation of user-supplied code. Process 1200 begins at 1202 with analysis of an execution operation within a test suite. Analysis of the execution operation can include dependency analysis discussed herein, and can identify certain dependencies required by number of execution tasks. In one example, a set of tests may require access to a specific database in order to execute. Thus, analysis of re-use of the database at 1204 indicates that the database can be re-used 1204 (YES). Analysis for re-use can be configured to require a threshold level of re-use prior to caching such data at 1208. For re-use that does not meet the required threshold at 1204 (NO) process 1200 can continue with evaluation of the task for re-execution at 1206. For example, operations can be repeated (oftentimes frequently) during execution of a test suite. The repetitive nature of testing provides opportunities to reduce computational requirements, for example, by allowing data, operations, and/or results from operations leading up the repeated tasked to be cached and accessed from memory, rather than perform any executions/set up to generate that data, operation, and/or result. As discussed with respect to 1204, evaluations for re-execution can require a threshold level of re-use.

In one embodiment, analysis for re-execution can include determinations of the overhead required to cache an operation and/or data, the overhead required to store and retrieve the cached data compared to compute resources required to generate the operation, environment, and/or data over the number of executions expected. In some embodiments, analysis at 1204 and 1206 can be determined a-priori, that is, based on expectation of execution of a test suite. In further embodiments, a-priori analysis can be augmented based on historical tracking data. Steps 1204 and 1206 can reference analytic data on prior test suite execution to further inform the analysis. In some examples, historical tracking data can identify conflicts, shared resources, and contention between executing tasks not readily apparent from a-priori analysis. From analysis of tracking data, potential re-use and re-execution opportunities can be evaluated at 1204 and 1206.

In some embodiments, process 1200 can be executed for every executable task in a test suite, and further, can be executed for every logical unit of execution (e.g., repo) within a test suite. In other embodiments, groups of execution tasks can be reviewed together, identifying operations, data, and/or results that would be computationally beneficial to cache. In some implementations, process 1200 can be continuously executed and/or running during a test session. Process 1200 can identify, dynamically, options for caching operations, data, and/or results. Further embodiments discussed herein, describe additional details, functions, and specific implementation examples regarding caching of data, environment, operations, results, etc. The details and functions discussed can, in some embodiments, be implemented more generally as part of processes 1200 including, for example, as part of execution of 1204 and 1206.

Example Computer Systems

The various processes and/or functions discussed herein can be implemented as part of one or more computer systems. Various aspects and functions described herein, in accord with aspects of the present invention, may be implemented as hardware, software, or a combination of hardware and software on one or more computer systems. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server, multi-tier, or cloud based system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the implementation is not limited to any particular distributed architecture, network, or communication protocol. Furthermore, aspects in accord with the present invention may be implemented as specially-programmed hardware and/or software.

Figure 13:
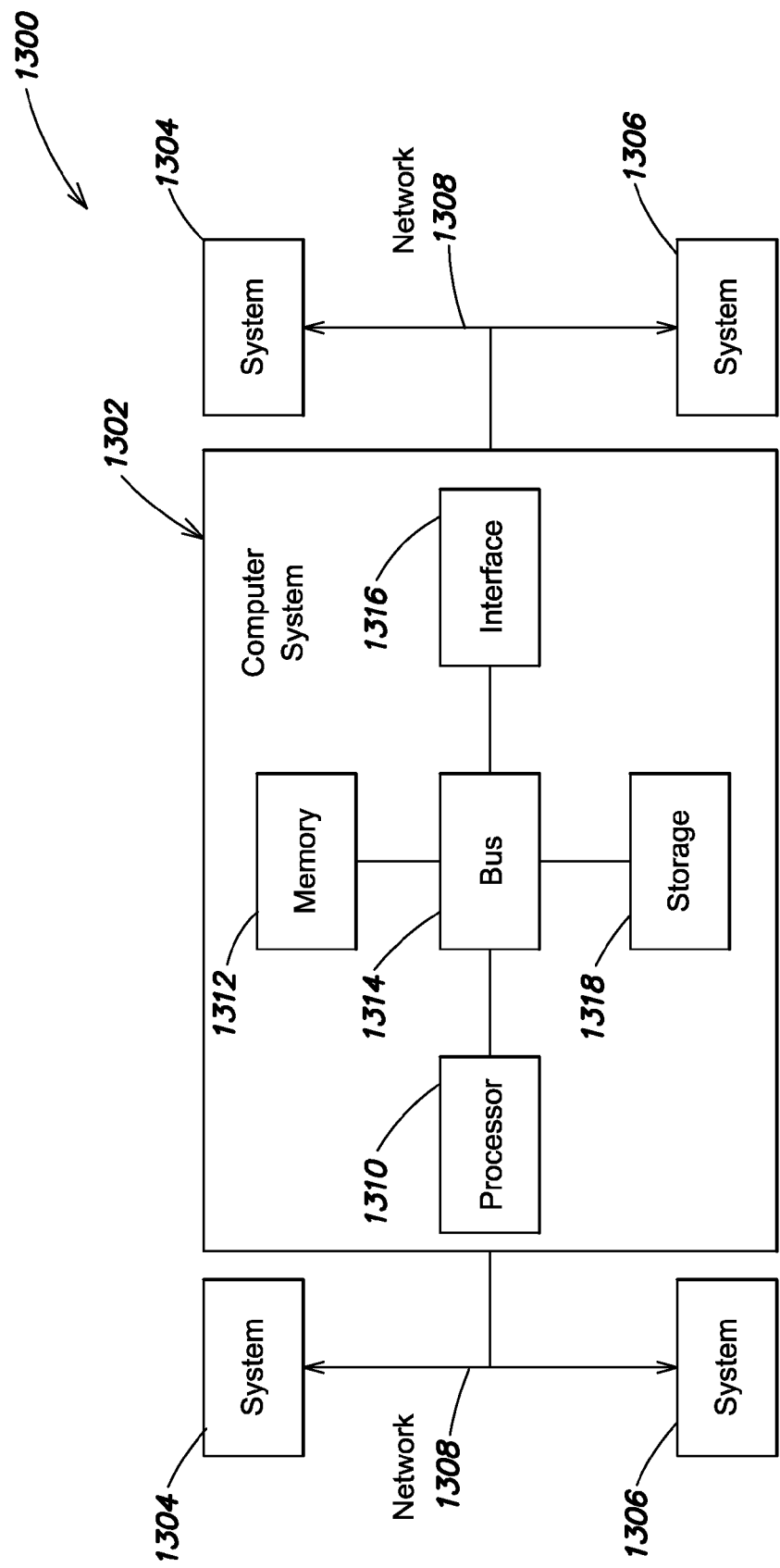
FIG. 13 is an example block diagram of a computer system on which various embodiments of the invention may be practiced.

FIG. 13 shows a block diagram of a distributed computer system 1300, in which various aspects and functions in accord with the present invention may be practiced. The distributed computer system 1300 may include one or more computer systems. For example, as illustrated, the distributed computer system 1300 includes three computer systems 1302, 1304 and 1306. As shown, the computer systems 1302, 1304 and 1306 are interconnected by, and may exchange data through, a communication network 1308. The network 1308 may include any communication network through which computer systems may exchange data. To exchange data via the network 1308, the computer systems 1302, 1304, and 1306 and the network 1308 may use various methods, protocols and standards including, among others, token ring, Ethernet, Wireless Ethernet, Bluetooth, TCP/IP, UDP, HTTP, FTP, SNMP, SMS, MMS, SS7, JSON, XML, REST, SOAP, CORBA HOP, RMI, DCOM and Web Services.

Computer systems 1302, 1304 and 1306 may include mobile devices such as cellular telephones. The communication network may further employ one or more mobile access technologies including 2nd (2G), 3rd (3G), 4th (4G or LTE) generation radio access for cellular systems, WLAN, Wireless Router (WR) mesh, and other communication technologies. Access technologies such as 2G, 3G, 4G and LTE and future access networks may enable wide area coverage for mobile devices. For example, the network may enable a radio connection through a radio network access such as Global System for Mobil communication (GSM), General Packet Radio Services (GPRS), Enhanced Data GSM Environment (EDGE), Wideband Code Division Multiple Access (WCDMA), among other communication standards. Network may include any wireless communication mechanism by which information may travel between the devices 1304 and other computing devices in the network.

To ensure data transfer is secure, the computer systems 1302, 1304 and 1306 may transmit data via the network 1308 using a variety of security measures including TSL, SSL or VPN, among other security techniques. While the distributed computer system 1300 illustrates three networked computer systems, the distributed computer system 1300 may include any number of computer systems, networked using any medium and communication protocol.

Various aspects and functions in accord with the present invention may be implemented as specialized hardware or software executing in one or more computer systems including the computer system 1302 shown in FIG. 13. As depicted, the computer system 1302 includes a processor 1310, a memory 1312, a bus 1314, an interface 1316 and a storage system 1318. The processor 1310, which may include one or more microprocessors or other types of controllers, can perform a series of instructions that manipulate data. The processor 1310 may be a well-known, commercially available processor such as an Intel Pentium, Intel Atom, ARM Processor, Motorola PowerPC, SGI MIPS, Sun UltraSPARC, or Hewlett-Packard PA-RISC processor, or may be any other type of processor or controller as many other processors and controllers are available. As shown, the processor 1310 is connected to other system placements, including a memory 1312, by the bus 1314.

The memory 1312 may be used for storing programs and data during operation of the computer system 1302. Thus, the memory 1312 may be a relatively high performance, volatile, random access memory such as a dynamic random access memory (DRAM) or static memory (SRAM). However, the memory 1312 may include any device for storing data, such as a disk drive or other non-volatile storage device, such as flash memory or phase-change memory (PCM). Various embodiments in accord with the present invention can organize the memory 1312 into particularized and, in some cases, unique structures to perform the aspects and functions disclosed herein.

Components of the computer system 1302 may be coupled by an interconnection element such as the bus 1314. The bus 1314 may include one or more physical busses (for example, busses between components that are integrated within a same machine), and may include any communication coupling between system placements including specialized or standard computing bus technologies such as IDE, SCSI, PCI and InfiniBand. Thus, the bus 1314 enables communications (for example, data and instructions) to be exchanged between system components of the computer system 1302.

Computer system 1302 also includes one or more interfaces 1316 such as input devices, output devices and combination input/output devices. The interface devices 1316 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface devices 1316 allow the computer system 1302 to exchange information and communicate with external entities, such as users and other systems.

Storage system 1318 may include a computer-readable and computer-writeable nonvolatile storage medium in which instructions are stored that define a program to be executed by the processor. The storage system 1318 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk or flash memory, among others. In operation, the processor 1310 or some other controller may cause data to be read from the non-volatile recording medium into another memory, such as the memory 1312, that allows for faster access to the information by the processor 1310 than does the storage medium included in the storage system 1318. The memory may be located in the storage system 1318 or in the memory 1312. The processor 1310 may manipulate the data within the memory 1312, and then copy the data to the medium associated with the storage system 1318 after processing is completed. A variety of components may manage data movement between the medium and the memory 1312, and the invention is not limited thereto.

Further, the invention is not limited to a particular memory system or storage system. Although the computer system 1302 is shown by way of example as one type of computer system upon which various aspects and functions in accord with the present invention may be practiced, aspects of the invention are not limited to being implemented on the computer system, shown in FIG. 13. Various aspects and functions in accord with the present invention may be practiced on one or more computers having different architectures or components than that shown in FIG. 13. For instance, the computer system 1302 may include specially-programmed, special-purpose hardware, such as for example, an application-specific integrated circuit (ASIC) tailored to perform a particular operation disclosed herein. Another embodiment may perform the same function using several general-purpose computing devices running MAC OS System X with Motorola PowerPC processors and several specialized computing devices running proprietary hardware and operating systems.

The computer system 1302 may include an operating system that manages at least a portion of the hardware placements included in computer system 1302. A processor or controller, such as processor 1310, may execute an operating system which may be, among others, a Windows-based operating system (for example, Windows NT, Windows 2000/ME, Windows XP, Windows 7, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

The processor and operating system together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, functions in accord with aspects of the present invention may be implemented using an object-oriented programming language, such as SmallTalk, JAVA, C++, Ada, or C# (C-Sharp). Other object-oriented programming languages may also be used. Alternatively, procedural, scripting, or logical programming languages may be used.

Additionally, various functions in accord with aspects of the present invention may be implemented in a non-programmed environment (for example, documents created in HTML, XML or other format that, when viewed in a window of a browser program, render aspects of a graphical-user interface or perform other functions). Further, various embodiments in accord with aspects of the present invention may be implemented as programmed or non-programmed placements, or any combination thereof. For example, a web page may be implemented using HTML while a data object called from within the web page may be written in C++. Thus, the invention is not limited to a specific programming language and any suitable programming language could also be used.

Example Implementation Architecture

The preceding system elements and components and operations discussed include implement of operations for an SDLC system. To provide further insight into the operations and functions executed by various embodiments and components of the SDLC system, additional architecture and implementation details are described. Accordingly, the implementation examples are discussed and described with respect to specific components, features, and/or operations that can be more generally implemented in the system components discussed above. In various embodiments, the features and operations discussed in the architecture implementation examples below are implemented by, for example, an SDLC system, an SDLC engine, and/or system components.

Example User Interface

One aspect of the invention includes a user interface provided to clients, users, and/or customer environments to facilitate user interaction and control of build and test validation. In one example, the user interface is implemented as a command line interface ("CLI"). The CLI can be a main point of contact between a software developer and the system. In one implementation the CLI, is developed and architected as a Ruby gem that installs a CLI tool accessed via management commands entered into the user interface. Ruby "gems" are implemented in the Ruby programming language, and more specifically as part of the Ruby on Rails architecture. The gem is the functional equivalent of a software package, including, for example, code to be executed. Other programming languages and respective software packages can also be used in other embodiments to install a CLI tool.

According to one embodiment, using this CLI, a developer or a test administrator can run a suite of tests in parallel against cloud resources, explore historical test results for multiple different application test suites, and configure usage of the system.

Management commands trigger functions (tagged #) when entered into the user interface (e.g., CLI) The commands include: tddium suite # Register the suite for this rails app, or manage its settings; tddium spec # Run the test suite; tddium status # Display information about this suite, and any open development # sessions; tddium login # Log a user account (e.g., unix user) in to a tddium account; tddium logout # Log out; tddium account # View/Manage account information; tddium dev # Enter "dev" mode, for single-test quick-turnaround debugging; tddium stopdev # Leave "dev" mode; tddium clean # Clean up test results—including, for example, large objects like videos.

According to one embodiment, the CLI can provide a number of functions and include any of the following behaviors. For example, a user of authorized to use a customer environment can install the CLI by downloading it from a software repository (e.g., from a web service). The user can run then run, for example, a tddium command or other management command from the shell provided by the CLI. In some embodiments, the CLI download can provide install messages, which can be configured to give setup instructions and (links to) integration instructions.

The SDLC system can be configured to accept environment selection and configuration input by a client. Responsive to user environment selection the SDLC can configure environment settings. In one example, the tddium command input in the CLI can be configured according to an "-environment" command line flag. Responsive to entering the command line flag the user interface is configured to let the user select a runtime environment. Example environments include: production (default); development; test; and staging. In one example, environment settings can be populated by the tddium login command, which can write a ".tddium [.environment]" config file.

In one example, environment selection can be targeted towards developers maintaining the system, who can need to change the API server used to control test execution. If no—environment is specified, execution of a tddium operation can be configured to first look for .tddium.development configurations (the development environment). If the system does not find a development configuration, the system is configured to look for additional configurations. In one example, the system searches from a .tddium configuration file (specifying configurations for the production environment). In some embodiments, environments other than development and production need to be specified explicitly on the command line. In further embodiments, the system can be configured to search for additional environment configurations.

One aspect includes the ability for the user to specify configuration that controls the way the system runs the user's tests. In one embodiment, the specified configuration is included as a text or executable file in the user's repository that can be delivered to the system along with tests and application code. The configuration file can be read by both the CLI and any test worker designated to run test cases for a test suite or session. The configuration file can also b read by other agent processes acting on the user's behalf. In some implementations, process isolation and/or access control may require that the other processes have the same access level as the user's establishing the test suite and/or privilege level. The configuration file may contain programmatic statements that can dynamically control the behavior of the system. Examples expressions include: a regular expression pattern to match test files to run in a particular test batch; a regular expression pattern to match test files to run serially on a test worker; a set of environment variables to set when the system runs a batch of tests; a generator function (written in a language supported by the system, including but not limited to Ruby, Java, Perl, Python, Lisp, etc.) that returns an ordered list of tests that can be used as the execution schedule for the test batch. In various examples, the user may specify through the user interface expression patterns to define test files to run; designations of order of execution of tests to perform; designation of tests to execution serially, and/or tests to run in parallel; etc.

In other examples, the user may specify one or more dependency versions to use for a test run, including versions of ancillary systems such as databases, lists of system or application packages to install (e.g., linux binary packages, Ruby gems, or Java jars), runtime versions and options (e.g., the version of the Ruby interpreter to use, or the options passed to a Java virtual machine for its memory configuration). In still further examples, the user may specify groupings of tests using patterns such as regular expressions or generator functions for which other above configuration applies. For example, the user may indicate that all test scripts whose first 5 lines match the regular expression /#!/bin/env/ruby/ can be run serially, and with ruby version "1.8.7", options "-r tempfile", and environment variables [USE_SELENIUM=false, ISABLE_GC=false] to further specify configurations for execution on of the set of test scripts.

According to one embodiments, various CLI subcommands share the same similar functional behavior when executed by the system: given the user has not logged in to her account (~/.tddium not found, incomplete, or wrong permission), the user can be prompted for an email address and password to "sign in". The CLI interface can then: POST (email, password) to /users/sign_in to retrieve an API key (e.g., from an account management); on success, the CLI is configured to write the API key to a "~/.tddium.<environment>" if a --<environment> command line option is set. If no --<environment> option is set, write to API keys to the default environment configuration file "~/.tddium". In one embodiment, in response to failure (login or write to a configuration file), instruct the user to use 'tddium account' to create an account and establish configuration files for running test sessions and/or test suites.

In one example, the CLI is configured to execute a setup command. The setup command is configure to cause the system to look for the current SCM repository. In one example, the system can be configured to look for a number of known SCMs systems. One example SCM includes GIT, and the system can be configured to look for a GIT repository. In another example, the system is configured to parse any file structures on the customer environment to identify the closest directory ancestor that contains a .git subdirectory. Once an SCM repository is identified, and a respective configuration file found, the system can examine the configuration to read a current code branch name According to one example, system behavior for new installations and set up interaction can be specified and presented through the user interface and/or CLI. In one example, when the user sets up for the first time, the user interface and management operations are configured to detect the user's environment and configuration with as little prompting as possible. For example, detection of the user's environment includes identifying versions of language runtimes, setup tools, operating system, and any other environment or software dependency.

The user interface can be configured upon interaction with the web service to determine if a test suite has already been registered, by executing, for example, the query:
GET /1/suites/?repo_name=<current_directory>&branch=<current_branch>
which when executed causes the system to match on any existing test suites and return, for example, a list of matching test suites. In one example, if a matching test suite exists, the system can prompt the user to select from matching suite display by the system. If the user doesn't want to use the existing suite, or no suite exists, the system is configured to create a new suite.

In one example, the user interface is configured to prompt for a repo name to create (which can default to the current directory name displayed in the user interface). The user interface can prompt for any one or more of: a branch name to use (with a default example to the current code branch); a pattern of test files to run ('**/*_spec.rb' by default in a ruby test suite); or find the current ruby version, using RVM (ruby version manager application) if possible; find the current rubygems version; find the current bundler version; POST (repo_name, branch, ruby_version, bundler_version, rubygems_version, test_pattern) to /suites/ (in other words save the configuration data for the new suite); the POST response, on success, can include a git_repo_uri (e.g., hosted on a web service) that can be used for pushing the current repo.

In another example, once the suite configuration data is set, the user's repo can be pushed (from the customer environment) to the test suite on the web service. Specific registration functions executed by the system can include: register a 'tddium' SCM remote for the tddium SCM_repo_uri (e.g., register a 'tddium' entry (e.g. a test suite entry) specifying a GIT remote for the git_repo_uri; push the user's repo to the test suite: which can include any one or more of: register a 'tddium' SCM remote (e.g., register a 'tddium' entry (e.g. a test suite entry) specifying a GIT remote for the git_repo_uri; GIT push tddium <current branch> to initialize the remote-copy the current code accessed or defined in the UI to the hosted SCM on the web service; wait for the command (e.g., the GIT push) to succeed; received any error messages from the web service; display instructions and/or error messages from the command execution (e.g., the GIT push); and write the current test suite info into local UI configuration file (e.g., .tddium).

If the test suite registration is successful the UI can display: "You've registered a test suite for <repo_name>/<branch>!" wherein <repo_name> is the variable for the name assigned for the block of code (e.g., "repo" in the test suite) and <branch> is the variable for the name assigned for any branch of the source code in the test suite. Once registered the UI is configured to allow any associated test in the suite to be run with input commands (e.g., "tddium spec" triggers execution of test cases).

According to one embodiment, if test suite is already registered, commands entered into the user interface can include additional behaviors. For example, if the user has already registered, the command can behave as follows: a configuration file (e.g., .tddium) contains a suite if the test suite has already been registered; execution of a registration command in that setting (e.g., the "tddium suite" command) can cause the system to query GET /1/suites/<id>/ and return the registered suite id.

Execution of the registration command will then prompt the user to change the following fields (if changes are desired): test pattern, code version, code branch, test case, etc. The UI is configured to communicate any entered changes in the test suite definition to, for example the web service. In one example, the UI executes an HTTP command PUT to communicate the changes (e.g, PUT /1/suites/<id>/ will update any changed test suite parameters on the web service).

According to anther embodiment, the management commands can be configured to enable batch execution of registered test suites. If the user has not set up a test suite for a current application (e.g., a current rails app), when she runs 'tddium spec' in the UI, the command can fail with instructions to run the registration command first (e.g., 'tddium suite'). If the user has already set up a test suite, when 'tddium spec' is entered in the UI, the command causes the UI to push tests to the cloud, execute them, and report on results.

In an example execution, one or more of the following functions are executed in response to 'tddium spec' command: GIT push tddium [branch]—which copies code and tests to the web service; wait for the git push to succeed—validation response received; execute a post command—"POST /sessions/" to get a session id from the web serve; if the test session can't be created (i.e., no session id) because billing must be setup, display the user's billing URL (e.g., billing and subscription services can be integrated with the SDLC system, which may include in one example the RECURLY web service); PUT test names to execute to /sessions/<id>/tests/register; POST to /sessions/<id>/tests/start; Poll GET /sessions/<id>/tests/ (or . . . /testskid>/) to check test status; display progress info as tests complete. When all tests have completed, the command can display in the UI any one or more of: aggregate results about total tests passed, failed, pending, errors, wall-clock time, usage time, and tests that took much longer to run than others (top-10 longest runtimes); and a URL (generated, for example, by the REST API of the web service) for a hosted results report.

Other function can also be implemented. Given the user has already set up a test suite, when one of the management commands is run (e.g., 'tddium spec') with execution options (e.g., "--user-data-file=<filename>" command line option), the management command can read the named file, record its basename, and include the basename and file data with the POST to /test_executions/start. In some examples, file data can be base64 encoded.

In another embodiment, given the user has already set up a suite, when the management command in is run with execution options (e.g., the "--max-parallelism=<n>" command line option), the command can add a max_parallelism parameter to the POST to /test_executions/start. The indication of max_parallelism causes the system to generate partitions of any build and testing operations to maximize parallel execution and distribute those operations accordingly.

According to another embodiment, when the management command completes successfully, it can record any of the values input using command options (e.g., --user-data-file and --max-parallelism options) to a file that that system can read on startup, for example, to save the user from having to retype those options in the future. In response to subsequent executions, the system can read such re-run values at startup, and print out a message to the UI indicating the option settings. In one example, the user can approve the re-run settings for a test execution.

According to another embodiment, other commands can be entered into the UI, and more specifically into a CLI. For example the user can see account and suite status with a status command (e.g., a "tddium status" command). In some embodiments, the management command can cause the system to execute a query on a listing file (e.g., /1/suites/) to get a list of suites for a current user. If the user has no test suites, the execution of the command can trigger the UI to display a message indicating no registered test suites and exit. If the user has test suites, the command cause the system to display their names, highlight the current suite, and display details for the current suite, which can include any one or more of: repo name; branch; test pattern; ruby version; bundler version; rubygems version; total test scripts; and total test executions.

In some embodiments, the management command can be configured to query a variety of configuration/status files, for example, a query on /1/sessions/?active=true returns a the list of sessions for the user that are still running; a query on /1/sessions/?active=false&order=date&limit=10 to get a list of the last 10 historical sessions. Other natural language or syntactic queries are capable of execution.

Execution of the management command can also be configured to cause the UI to display any one or more of: a list of sessions including: start time; end_time if session is finished; suite; total/passed/failed/pending/error test_executions; and a report URL. In other embodiments, different command syntax can be used to execute the same functions.

Other management commands can trigger different functions. In one example, a login command can enable security measures to be associated with a given test suite, updates and execution. A logout command can clear any account information. In some examples, execution of the logout command can caused the user interface to delete a ~/.tddium (current configuration file) if it exists.

Other command options can be configured to control account management of test suites, test sessions, executing processes, users, groups of users, etc. In one example, the user can use a subcommand to view and manage account information, described as follows: given the user is logged in to a cloud provider, and has enabled the a cloud provider add through the web service, the user can configure a web service account by capturing active logged in information. In one example, the user has an account with a known cloud provider platform "Heroku" and has set up their UI interface to include an integration application—by execution an account management command the user can configured a web service account and test suite.

According to one embodiment, given the user is not logged in to tddium or heroku, she can use "tddium account" to create a new account. The account command can execute any one or more of: prompt for a preview invitation token; display a license file (e.g., LICENSE.txt) and prompt for the user to type "I AGREE" to establish an account; prompt for (and confirm) the user's desired password; prompt for an SSH key (using ~/.ssh/id.rsa by default); POST (token, password, ssh_key) to /users/ to record configuration setups; if the token is not recognized, the command can print a message asking the user to sign up for the preview, for example, "Your invitation token wasn't recognized. If you have a token, make sure you enter it correctly."

If tokens are not recognized or not setup, the UI can prompt the user to request an invitation to register with the system: "If you want an invite, visit this URL to sign up: _ http_example_registration_website_address.

Once an account has been created successfully—the UI can be configured to: print a welcome message: "Congratulations <email>, your tddium account has been created!". Responsive to account creation—test suites can be registered, for example, using a registration commend to register a test suite. Registration and account creation can include establishing and linking a billing plan. In one example, the UI is configured to open a billing system URL in an associated your browser. In one example, the billing system is Recurly and the system automatically opens a <recurly registration URL>. With a created account, registered test suite, and a billing account, tests can be initiated, for example, using a management command: tddium spec. In further embodiments, execution of the account command can be configured to create and copy an API key to ~/.tddium file (test suite configuration file).

In another embodiment, given the user is logged in, she can use "tddium account" to display information about her account including any one or more of: email address, Recurly account registration/management URL, and account creation date.

Other embodiments of the SDLC system allow the user to reserve resources for low-latency interactive testing using the full environment furnished by the system. In one example, the UI provides options to create persistent test sessions. The persistent sessions can include development environments triggered by management commands (e.g., tddium dev to start and tddium stopdev to stop a persistent session).

In one example, the user interface provide a command line allows the user to clean up old test results. For example: DELETE /sessions/<id>/results deletes all results for a session and DELETE /sessions/<id>/results/<id> deletes results for a particular test.

In one embodiment of the invention, there are many possible clients of the web service API, including the CLI and the account management site. The account management site can be configured to provide authorization and privilege control for users, groups of users, tests, test suites, SCM, etc. Described are examples and functions of a shared client module that can be used by any client of the web service API.

In one example, the user interface application or the CLI logic can be separated from the network protocol used to communicate with the web service API into separate code modules that handle any one or more of: retry after http timeout, supporting stateful/non-idempotent requests with a sequence number; inserting the X-tddium-api-key API authentication header (controlling communication authentication); setting JSON Accept/Content-Type headers; processing HTTP response codes, and JSON status/explanation payloads; environment selection and configuration; client version negotiation. In one example, after installing the tddium gem (an example user interface application which can include a CLI), a developer can write a script, for example require 'tddium/client'

```
...
# Read config file for environment, load API key and hostname.
# Omit the environment parameter to use default environment.
client = TddiumClient::Client.new(environment=:development)
# execute an API call and handle response
params = {:suite => {
    # ... suite params ...
}}
begin
    tddium_result = client.call_api(:post, "/1/suites/", params)
    # handle response
    # tddium_result.http_code can be 2xx
    # tddium_result.success? can be true
    # tddium_result.response can be a Hash
    # tddium_result.response[:status] can be 0
rescue TddiumClient::TimeoutError
    # handle timeout
rescue TddiumClient::ServerError => e
    # handle fatal error, e.g., when server didn't return a response body
    # e.http_code can be set
rescue TddiumClient::APIError => e
    # handle tddium API error
    # e.tddium_result can contain the same fields as tddium_result
    above
    if e.tddium_result.http_code == 403 then
        # handle unauthorized
    else
        raise
    end
end
# ... or catch errors generically
begin
    result1 = client.call_api(:get, "/1/suites/")
    result2 = client.call_api(:get, "/1/suites/#{result1.response[0][:id]}")
rescue TddiumClient::Error => e
    STDERR.puts "API Error: #{e.inspect}"
end
# Read environment parameters
client.api_base_uri # => "https://api.tddium.com/"
client.config # => Config hash
```

The script can allow the user to implement automatic settings for controlling a test suite, to control environment parameters during execution, and in some examples to automatically execute tests.

In another embodiment, a client API can be configured to inherent configuration form other client modules. For example, a client object (e.g., TddiumClient::Client) inherits properties from an internal client (e.g., TddiumClient::InternalClient). The system can be configured to capture configurations based on an initialization wrapper that is configured to be executed in conjunction with the tddium gem (as discussed a gem is the functional equivalent of a software package, including, for example, code to be executed—and the tddium gem is a test system controller package) and any API callers running outside of the tddium environment.

In another embodiment, a client startup module can be implemented as a client initializer which can define client environment or capture environment settings from parent client modules. In one example, the command—definitialize (environment=nil) dictates that no environment is specified, and the initializer can execution a query for a config file associated with a test suite or test session. Returns generate by the initialized can include: a new TddiumClient::Client object which raises: a normal file and parser exceptions (e.g., YAML exception).

In one example, the "internal" object is configured to be used within the Tddium environment (e.g., specified execution environment within a test suite or test session), where more fine grained control over API calls can be executed. In some embodiments, the system uses the same client including result/error handling codes. In one example, the InternalClient initializer can be defined as: definitialize(host, port=nil, scheme='https', version=1) in configuration files read by the system upon start up. In some embodiments, the SDLC system executes initialize commands to start and configure the InternalClient instance with any supplied parameters specified in the command line.

In another example, the operation of a call_api method can be defined for API clients on the SDLC system. The call_api method can be defined as: client.call_api(method, api_path, params=nil, api_key=nil, retries=5)→TddiumClientResult. Execution of the command generates an API URL to query, issue the query with the specified method and params (with the specified methods and commands configurable, for example, by the user), and yield the response to the provided block (e.g., "TddiumClientResult"). If the API query times out, the call_api method can be configured to retry a fixed number of times (including e.g., default of 5). If retries still fails, various implementation of the call_api method can retry forever. In further examples, between retries, the call_api method can sleep for 2 seconds. If, after the specified retries are exhausted, the call_api method can raise an error (e.g., and error object can be generated called tdddiumClient::TimeoutError). Upon successful execution the call_api method can be configured to returns a client result data object (e.g., a TddiumClient::Result object). In some embodiments, the client result object is configured to raise a subclass of objects, including, for example, and client error object (e.g., TddiumClient::Error).

According to another embodiment, a client result object is generated on the SDLC system. In one example, the result object is generated with any one or more of the following attributes: a communication status code (e.g., http_code: (Integer) The HTTP status code represented in integer format) a response message (e.g., http_message: (string) The HTTP response message in string format); a hash encoded response object (e.g., response: (Hash) The full response object hash encoded); and success status of an API call made on the SDLC system (e.g., success?: (boolean) Whether the API call was a success in a Boolean value)

According to another embodiment, a client error object is generated on the SDLC system. In one example, a base exception class is returned as a client error object. The return based exception class is configured to inherit from a RuntimeError data object with the following specific subclasses for more specifically identifying types of error: TddiumClient::TimeoutError: After allowed retries are used up; TddiumClient::ServerError: If the server returned an unprocessable response; http_code: (Integer) Most likely 5xx; http_message: the http response message returned for the call.

According to one implementation, RuntimeError data objects can be generated if a website uses html code that is not compatible with the web browser functionality and/or cannot be properly executed.

According to one embodiment, additional error object can be returned responsive to system issues during, for example, a test suite attempted execution. In one example, a API error object (e.g., TddiumClient::APIError) is generated responsive to a system determination that: the API call has a failure error code—which can include one attribute (e.g., tddium_result), which can, in some examples be an instance of a client result object (e.g., TddiumClientResult).

An aspect of the invention coordinates actions by the user, test workers, and other agents using a central service (e.g., web service 204, 304, and 400). Embodiments of the invention use a web service that exposes a networked API, for example using an HTTP REST API (e.g., 402) for managing interaction with the web service. The web service may also serve test result reports and communicate the test worker software to the test VMs.

In one embodiment, The REST API can be configured to respond to HTTPS requests to maintain security. In one embodiment, the web service responds to these interface methods as described in Table 1 (showing the called Method, URL parameters directed to a result location, an access control implementation (e.g., specified by accessibility control), and a corresponding functions executed by the web service in response to the received method and appropriate access permissions):

TABLE 1

| Method | URL (params) => result | Access by | Function |
|---|---|---|---|
| GET | /1/users/ | user-key | Get info about user |
| GET | /1/accounts/repoman | repoman-key | Get account information for repoman |
| GET | /1/accounts/usage | user-key | Get usage information for this account |
| POST | /1/accounts/invite (email, role) | user-key | Invite user to this account |
| POST | /1/users/ (email, ssh_key, password) => key | any | Create a user |
| POST | /1/users/sign_in (email, password) => key | Any | Login as user |

TABLE 1-continued

| Method | URL (params) => result | Access by | Function |
|---|---|---|---|
| PUT | /1/users/<id>/ | user-key | Update password, activate Billing System account (e.g., Heroku) |
| POST | /1/suites/ (repo_name, branch, [versions], test_pattern) => suite | user-key | Register a new app test suite |
| GET | /1/suites/ | user, git | List suites for user |
| GET | /1/suites/<id>/ | user-key, emcee2-key | Get suite <id> |
| PUT | /1/suites/<id>/ | git-key | GIT post-receive sets gemfile_sha1 |
| POST | /1/suites/<id>/test_scripts/ | git-key | GIT pre-receive |
| POST | /1/sessions/ => session | user-key | Start a test session |
| GET | /1/sessions/ => sessions | user-key | List sessions for user |
| PUT | /1/sessions/<id>/ | user-key | Update session info (result files) |
| POST | /1/sessions/<id>/test_executions/register (tests) | user-key | Register test names to run |
| POST | /1/sessions/<id>/test_executions/start | user-key | Start registered tests |
| GET | /1/sessions/<id>/test_executions/ | user-key, emcee2-key | List test status |
| PUT | /1/sessions/<id>/test_executions/<id>/ (result) | emcee2-key | Update test status |
| POST | /1/sessions/<id>/test_executions/<id>/restart | emcee2-key | Restart test execution |
| GET | /1/sessions/<id>/test_executions/report | user-basicauth | Formatted test report |
| POST | /1/sessions/<id>/test_executions/setup_failed | emcee2-key | Emcee setup failed, kill the session |
| GET | /1/instances/<instance_id>/ | emcee1-key | Get instance info |
| GET | /1/instances/<instance_id>/configuration | emcee1-key | Get test instance config |
| POST | /1/instances/<instance_id>/claim | emcee2-key | Claim next test batch |
| POST | /1/instances/<instance_id>/done | emcee1-key | Report that this instance is done with its current assignment |
| POST | /1/bundles/ | emcee1-key | Add a pre-built bundle URL and sha1 |
| POST | /1/usages/storage | usage-key | Update account usage info for cloud storage |
| GET | /1/hooks/<ci_hook_key> | baroness | Get suite and account info for this hook |
| POST | /1/builds/ | ci-key | Create a build to record CI Activity |
| PUT | /1/builds/<id> | ci-key | Update a build to record CI Activity |

According to various embodiments, the web service (e.g., 204, 304, and 400) can be configured to accept requests according to the detailed mechanism descriptions provided described in the following sections.

For example, in one embodiment, the REST API returns JSON formatted responses in all cases of received requests, unless otherwise noted. In other embodiments, different response architectures can be implemented. In some implementations, requests to the REST API must contain a 'format' parameter with value 'json'. Requests missing the 'format' parameter can receive HTTP 406 Not Acceptable responses (including for example triggering error objects on the system indicating, for example, improper format). In some implementations, the 'format' parameter can be a GET parameter, in the URL, or a POST parameter, in the body of a command and/or message to the API.

In some embodiments, POSTs to the API can send parameters either in JSON, or multipart-form-encoded, as long as they are accompanied by the appropriate Content-Type header (e.g., specifying the configuration of the multipart-form). In some embodiments, JSON returns communicated, for example, the user and/or user interface can be processed by the system to be a hash value. All return hashes can contain at least the following keys: status: integer, with 0 indicating success; and an explanation: string or list, present when status !=0, explaining failure conditions.

In one embodiment, the web service authenticates requests. For example, the authentication mechanism can include the follow features: API requests can come with a custom header (e.g., X-tddium-api-key HTTP header), with the client's API-key as the value—to authenticate each API request. In some embodiments, some methods communicated to the API do not require authentication (e.g., a key header). For example, the following methods do not require a key header (they create or sign in users): POST /1/users/ and GET /1/users/sign_in.

Header keys implemented by the system can include a variety of formats. In one embodiment, there are 4 spaces of API keys that the API server can expect in the X-tddium-api-key header: end-user (used by the gem and/or user interface, operated under the control of the end-user); SCM-hook key (e.g., git-hook (used by the git-hook, under the control of tddium gem); execution controller keys, which can further include stage 1 keys (e.g., environment set-up stage) and stage 2 keys (e.g., worker instance keys); the execution controller keys can includes emcee-stage1 (used by the emcee-stage1 running as root on the test VM) and emcee-stage2 (used by the emcee-stage2, running as an unprivileged user on the test VM). In one example, the API server can also be configured to look up, based on the key, what type of user is making an API request.

In one embodiment, the web service includes a component configured to manage user accounts. The user account component can be configured to control access permission, group users, isolate test execution, isolate test suites, implement test suite containers (e.g., a container can be configured to control access, user groups, isolation of execution, etc.).

In some embodiments, the web service allows for test and/or user accounts to be accessed by multiple users, and to represent complex organizational structures (e.g., admin groups, user groups, a variety of access and/or authority levels, etc.). One example authorization configuration includes: a given User can be a member of 0 or 1 Accounts; to create a new Account; a User is invited to create an account; activating this User creates an Account owned by the User; in some implementation a User can have one of 4 account memberships providing different levels of access and/or control within the system: owner: the user owns the account and is responsible for billing; admin: the user has rights to add users to the account; member: the user can run tests and view other account users reports; and inactive: the user is no-longer a member of this account.

According to one example, the "owner" or "admin" User can add and invite new "member" or "admin" users.

In one embodiment, the system in configured to requires that the REST command paths are prefixed with an API version (/1/ . . . ). The configuration enables system handling and identification of future API versions. For example, when the API changes in the future, new clients can be coded to access /2/ . . . , and the system can be configured to deny/reroute clients who request /1/ . . . to a current API version.

Figure 14:
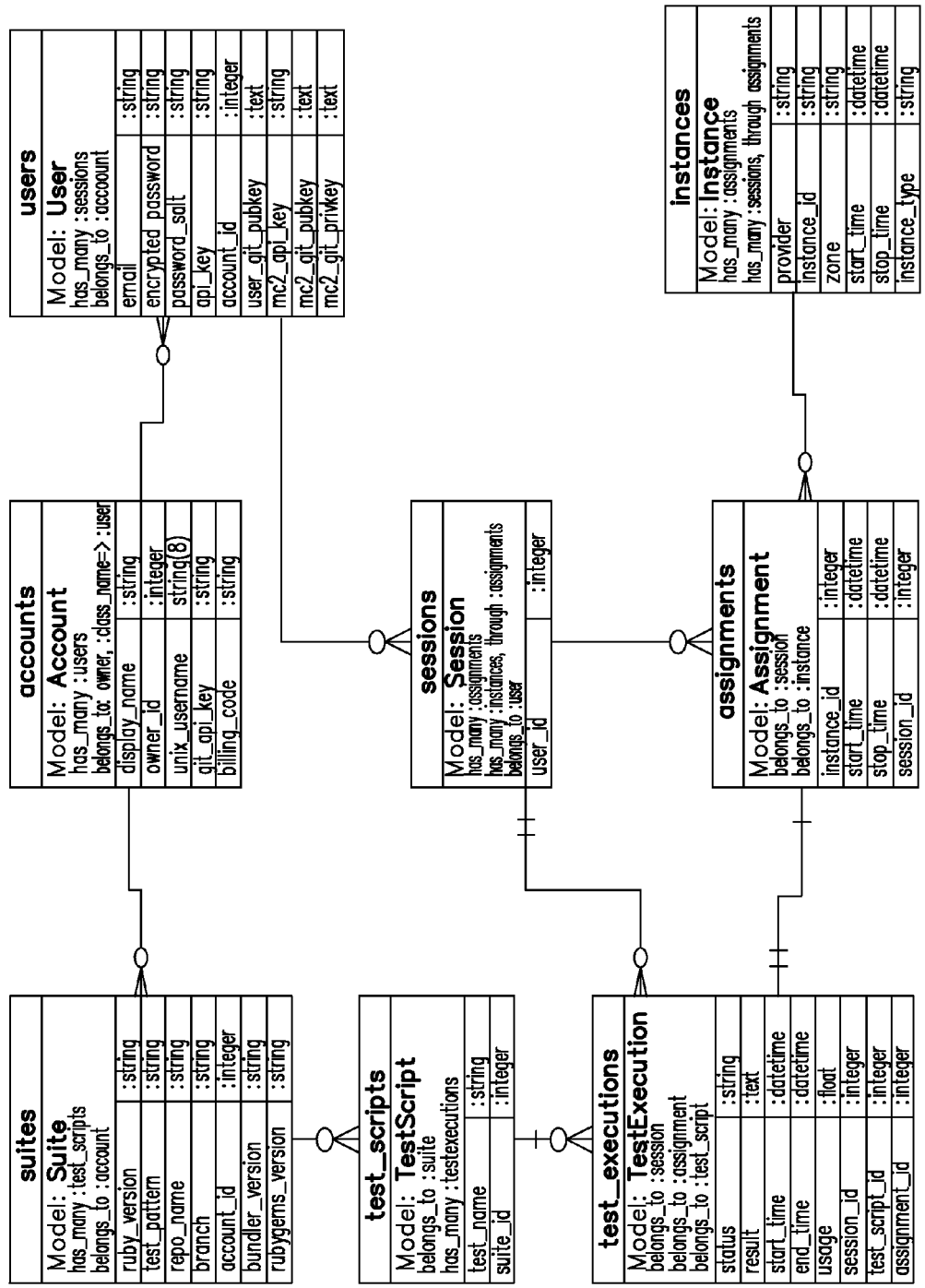
FIG. 14 is an example data model implemented according to one embodiment.

An example data model of one embodiment of the invention is illustrated in FIG. 14. The data model illustrates data objects, respective data fields, attribute values, and relationships between the data objects. In other embodiments, different data models can be implemented to manage and facilitate access to test suite information.

The following sections detail the interface endpoints (e.g., specifying command line to execution, return for the execution, and functionality provided by the execution of the command line) for embodiments of the invention. In one implementation "GET /users/" returns: status, explanation; and user: current user, and provides functionality: requires a user API key to be provided, returns User JSON output objects. In one example, a User JSON output object includes: when information is returned for a User, either by "GET /users/" or "POST /users/" commands—the JSON result can be modified from the standard Model data to include: a recurly_url entry (billing service entry) with either: the hosted payment page URL if the user hasn't subscribed with a service (e.g., Recurly): url=secure hyptertext address ://#{YOUR_SUBDOMAIN} securly.com/register/#{product_code}/#{account_id}; the billing service (e.g., recurly) account management URL if the user has an account and a subscription (even if the subscription is canceled): acct=Recurly::Account.find(account.id) url="://#{YOUR_SUBDOMAIN} securly.com/account/#{acct.hosted_login_token}"

In some embodiments, the User info JSON can exclude encrypted_password, password_salt, invitation, and emcee private key attributes. In some examples, the User info JSON includes the user's account display name and the role of the user within the account, under "account" and "account_role" keys.

Another example interface endpoint includes "GET /accounts/repoman." In one implementation "GET/accounts/repoman" returns status, explanation; accounts specified, for example by: [{"unix_username": "u123456", "unix_userid": 2001, "authorized_keys": ["key1", "key2"], "git_api_key": "asddggeradasdsdfsdf", "repos": [{"repo_name": "reponame1"}, {"repo_name": "reponame2"}]}, . . . ].

The functionality provided: includes API operation used by repoman (e.g., a repository manager component) to get the list of user accounts (e.g., unix user accounts) and for each, the code blocks (e.g., git repos) that need to exist and the set of access controls (e.g., authorized ssh public keys for the Users) associated with each account. Additional functionality provided can include an Account in the output, for example, if it contains a User who has accepted the preview invite.

Additional endpoints include: POST /users/ with parameters: invitation_token; password; user_git_pubkey; that returns: status, explanation; user specified as a JSON output: providing functionality on the system: which uses the invitation token to activate a beta account pre-created when the invite was sent; sets the user's password; initializes an account for the user: create an Account object with assigned username="u"+Account.id; generate a billing_code for integration with recurly; create and register a User: create a User object, with account set to (and owned by) the User, generate an API key for the user, generate an emcee-stage2 git ssh keypair, and generate an emcee-stage2 API key/

A "POST /sessions/" endpoint returns: status, explanation; session; providing functions: create a session to run tests—session creation may fail because the user needs to enter billing information, or is not subscribed to a plan that allows the session to be created; if the session can't be created for billing reasons, status can be 2 and explanation can be set with a detailed message regarding billing set-up.

A "GET /sessions/" can include parameters: active: (optional) true|false; limit: (optional) and return: sessions: list of sessions, ordered by start-time; and enable functions: list sessions for the current user, filtering by the specified parameters: active: sessions that have assigned instances; limit: return this many results; where no filter parameters are specified, the 100 latest sessions can be returned; each session entry in the JSON result can contain the following derived fields, for example: start_time: datetime; end_time: datetime; suite: id; test_execution_stats specified by object {'passed': int, 'failed': int, 'pending': int, 'total': int, 'error': int; additionally, in the session entry, if no tests have been added, the suite and test_execution_stats can be omitted (or null); if no instances have been started, start_time and end_time can be omitted (or null).

A "PUT /sessionskid>/" endpoint can include parameters: files: {<plain_filename>: <s3 hash filename>}; return: status, explanation; while execution functions: add a result file to a test session (e.g., selenium logs, or profile results).

A "POST /suites/" endpoint can accept parameters: repo_name: string; branch: string; ruby_version: string; bundler_version: string; rubygems_version: string; test_pattern: file pattern to use as default for this suite; to return: status, explanation; suite; and provide functions: create a new Suite object for the current user's Account, storing repo information, ruby/etc versions, and test_pattern; execute: secure communication operations ssh -i #{Configuration.repoman.private_key}-o 'StrictHostKeyChecking=no' #{Configuration.repoman.ssh_target} which wait for it to execute, and read JSON response as described below in Repository Manager to determine if there were errors for this suite; additional functionality can include a requirement that (repo_name, branch, account) must be unique.

A "GET /suites/" which can accept parameters: repo_name; branch; return: status, explanation; suites:

[suite, suite]; which executes the functionality: format each entry in suites as discussed with respect to GET /suites/<id>/; return a list of suites accessible by the current user; and filter by repo_name and/or branch.

A "Suite JSON Output" endpoint defines an output for each suite entry that includes the fields described in the data model shown in FIG. 14 for "suite" as well as the additional fields: json['git_repo_uri']=git_repo_uri; json['test_scripts']=test_scripts.count; json['test_executions']= test_executions.count; json['hook_uri']=ci_hook_uri if self.ci_pull_url; json['ci_ssh_pubkey']=self.account.users[0].ci_ssh_pubkey if self.ci_pull_url; and json['unix_username']=self.account.unix_username if self.ci_pull_url.

A "PUT /1/suites/<id>/" endpoint accepts parameters: gemfile_sha1: string; to return status, explanation; and provide functionality: run by the git-hook in post-receive mode; and update the content sha1 of the Gemfile.lock.

A "POST /bundles/" endpoint accepts parameters: bundle: {"bundle_url": url, "bundle_sha1": sha1(object at url)}; to return: status, explanation; and provide functionality: used by stage1 to record a pre-built homedir tarball bundle saved to S3 (cloud provider).

A "POST /suites/<id>/test_scripts/" endpoint accepts parameter: test_scripts: ['test1','test2', . . . ]; to return: added; deleted; errors; status, explanation; and provide functionality: to be called from the git pre-receive hook—if the update is inconsistent, the pre-receive hook can reject the push; update the database of test scripts in this suite with the list of files that can be committed when the push succeeds; and identify an empty list as invalid—it isn't meaningful to completely clear the list of test_scripts, and if the git-hook finds no tests, at the least the test_pattern is wrong, which can be reported as an error.

A "GET /suites/<id>/" endpoint returns: status, explanation; a suite with the following information: id: int; repo_name: string; branch: string; ruby_version: string; bundler_version: string; rubygems_version: string; test_pattern: string; git_repo_uri: string; test_scripts: int; test_executions: int; rspec_command: string; to provide functionality where: the git repo URI can be the same for all branches of the same repo; the rspec_command is optional and can be determined automatically by Emcee Stage 2 if not specified.

A "POST /sessions/<id>/test_executions/register" which accepts parameters: tests: [{'test_name': <name>, 'suite_id': <id>}, . . . ]; to return: added: integer; existing: integer; errors: integer; status, explanation; which provides functionality which creates TestExecution objects for each test to be run for this session.

A "POST /sessions/<id>/test_executions/start" accepts parameters: user_data_filename: string; user_data_text: text (base64); max_parallelism: (optional) integer; to return: started: integer, status, explanation; which provides functionality: "Start" tests running for this session by assign instances to it; optionally accept user_data_filename and user_data_text parameters to allow the "tddium spec" command to ship a file containing user data outside of the SCM to the tests as they run—text can be the base64-encoded version of the original file. The file can be written as $REPO_ROOT/<user_data_filename>; optionally accepts max_parallelism, an integer parameter that overrides the test_vms_per_session and test_vm_batch_size configuration to control the number of VMs to assign and the number of tests to run in parallel on each VM-session start may fail because the user needs to enter billing information, or is not subscribed to a plan that allows the session to start; if the session can't be started for billing reasons, status can be 2 and explanation can be set with a detailed message.

A "POST /sessions/<id>/test_executions/setup_failed" endpoint accepts parameters: failure_log; status; to return: status, explanation; and provide functionality: used by an emcee-stage2 to indicate that the setup phase of the execution failed, and that all tests can be marked finished and as errors.

A "GET /sessions/<id>/test_executions/" endpoint returns: status, explanation; report: url; and tests specified by: {<testname>: {id: int, status: string (notstarted|started-|passed|failed|pending|error), result: text, start_time: datetime, end_time: datetime, usage: hash of string→float}}.

A "PUT /sessions/<id>/test_executions/<id>/" endpoint accepts parameters: result including {'status': string (notstarted|started|passed|failed|pending|error), 'result': text, 'start_time': datetime, 'end_time': datetime, 'usage': hash of string→float 'files': {<example_id>: {<plain filename>, <s3 hash filename>}, . . . }}; to return: status, explanation; and provide functionality: used by emcee to update the result of a test execution; 'files' is an optional key in the result hash—which it can contain a hash of examples to files, keyed on example_id (unique ID of the example within the test_execution)—each example_id can point to a hash of <plain filename>=><s3 filename>: "plain" filename: as generated by stage2, e.g "12434-screencap.png" or "rc_log.txt"; and "s3" filename: hashed filename written to solano-labs/tddium-results/bucket.

A "POST /sessions/<id>/test_executions/<id>/restart" endpoint can accept parameters: reason: string; return: status, explanation; to provide functionality: restart a finished test execution, by clearing its times, setting its status to 'notstarted', and clearing its assignment; generate an error to call restart on a started/notstarted test execution.

A "GET /instances/<instance_id>/" endpoint returns: an instance object (e.g., instance: Instance.to_json); status, explanation; which provides functionality: for debugging and tools; return raw instance object.

A "GET /instances/<instance_id>/configuration/" endpoint returns: session: integer; suite: integer; git_key: text; git_server_hostkey: text; emcee_url: string; emcee_sha1: sha1(emcee); unix_username: string; unix_userid: integer; post_bundle: Boolean; homedir_tarball_url: string; homedir_tarball_sha1: sha1(homedir_tarball); emcee_api_key: string; resource_limits: hash; user_data: {"filename": string, "data": bdata}; tasks_allowed: {<task type>: <data>}; services_allowed: {<service>: <data>}; stage2_config: hash; and status, explanation; to provide functionality: if this instance does not have an active assignment, this call can HTTP 404 status 1; for use by emcee-stage1 at instance boot and passed to emcee stage2; tasks_allowed can be a Hash of <task_type>=><task-specific-data>—If non-existent or nil, all known task types are enabled; services_allowed can be a Hash of <service_name>=><service-specific-data>—emcee stage1 can pass service-specific data stage2 for configuration, and the keys in the services_allowed hash indicate the services that can be enabled at boot; resource_limits can be an optional hash of resource name to limit for stage2; post_bundle can be an optional parameter that tells the recipient to post the bundle to S3— in one example, it can be a true value only if the homedir_tarball_url is nil and can be true for only one assigned test VM—the elected bundle master; homedir tarball and gemset tarballs are created at suite creation time; stage2_config hash can be a mandatory hash of stage2 configuration parameters—stage2 configuration parameters can include: x11_display: an integer identifying the x11 display number to use; max_parallel: an integer specifying the target level of parallelism for tests run by stage 2; s3_aws_key: aws account key for s3 write; s3_aws_secret: aws secret for s3_aws_key; reporting_gem_url: URL for reporting gem; reporting_gem_sha1: sha1 (reporting_gem); s3_bucket: (optional defaults to solanolabs); s3_aws_region: (optional defaults to us-east1); suite: Full Suite JSON Output for the suite assigned to this instance—note that the 'ruby_version' key may have '-tddium' appended to indicate stage2 can use patched ruby.

A "POST /instances/<instance_id>/claim" endpoint accepts parameters: services_running: [<service1>, ... ]; to return: status, explanation; more; wait; tests: [{'test_name': string, 'exec_id': integer}, ... ]; and provides functionality: for use by emcee-stage2; ask the API server to assign a set of tests for this emcee stage2 to run next—the stage 2 emcee can run the batch before claiming more tests; accepts an optional parameter, services_running that identifies optional services running for this run of tests—the list of running services can be added to the set of services tracked for this Assignment; and values for HTTP response and status codes according to Table 2.

TABLE 2

| HTTP | 'status' | 'more' | 'wait' | Meaning |
|------|----------|--------|--------|---------|
| 200 | 0 | 0 | X | No more batches after this one. Run this batch, if it contains tests and don't call again. |
| 200 | 0 | 1 | 0 | Emcee continue! More tests available after this batch. Please call again immediately. |
| 200 | 0 | 1 | >0 | Emcee continue! Execute tests in current batch, if any. Then wait for 'wait' milliseconds. Then call again. |
| 5xx | 1 | x | x | Server error |
| 4xx | 1 | x | x | Client error |

A "POST /instances/<instance_id>/done" endpoint accepts parameters: stage2_log; sysusage; bundle_time; to return: status, explanation; and provide functionality: stage 1 posts with stage 2's API key to indicate instance has finished its assigned work and includes stage 2's setup log; call Assignment.stop; sysusage can be a hash with at least the key/value pairs shown below—a value of zero means uninitialized/unknown—stores sysusage as a YAML; bundle_time can be an optional argument—if present and non-nil, it indicates the amount of time spent by the instance on "bundle install"; NB: in some embodiments, it is not required that the system capture the number of bytes sent/received across availability zones. Table 3 describes key value pairs and the information the key tracks.

TABLE 3

| Key | Value |
|-----|-------|
| :wall_time | Time running on the instance |
| :disk_read | Bytes read from disk |
| :disk_write | Bytes written to disk |
| :net_read | Total bytes received |
| :net_write | Total bytes sent |
| :net_read_bill | Total billable bytes received |
| :net_write_bill | Total bytes sent |

A "POST /usages/storage" endpoint accepts parameters: results: {<url>: {'xfer': integer, 'ops': integer, 'size': integer}}; bundles: {<url>: {'xfer': integer, 'ops': integer, 'size': integer}}; to return: status, explanation; which provides functionality: update result and bundle usage, associating URLs with accounts by tracking back through Suite and TestExecution models.

A "GET /hooks/<hook_key>" endpoint accepts parameters: none; to return: suite: Suite JSON Ouput; status, explanation; which provides functionality: used by the baroness to find suite information for the CI hook.

A "POST /builds/" endpoint accepts parameters: build: +sha+start_time+pull_time+pull_url+branch; to return: build; status, explanation; which provides functionality: make a build. A "POST /builds/<id>/done" endpoint accepts parameters: build: +push_url+push_time+end_time+success: bool+log.

According one embodiment, the web service can host execution controller scripts. For example, the web service can include emcee script hosting. In one embodiment, the test worker controller can be downloaded by a boot script on a test VM from the web service (e.g. 204, 304, and 400) using the URL provided by execution of GET /instances/<instance_id>/configuration/. In one example, controller scripts can be hosted initially from the rails app, which can make scripts accessible from: "website address"//<apihost>/emcee/script.

According to one embodiment, an example test worker can be implemented on virtual machines executing on cloud providers. In one embodiment, the test worker runs on each test VM in the cloud provider. In some examples, the test worker includes a VM boot script and a second stage controller. In one example, the boot script: start when the instance boots; queries the cloud provide manager for instance metadata (e.g., the AMAZON cloud service includes AWS which can be queried for instance metadata); retrieve instance configuration from REST API using the cloud instance ID (e.g., AWS instance ID); clean up after test user (make sure previous instance is gone); download test user template if not already on VM; download test user gemsets; run chef to create and populate test user; install git ssh key and git server ssh host key; download emcee stage 2; exec emcee stage 2 as test user; after tests complete, emcee stage 2 can exit; emcee stage 1 can wait for new configuration to become available from the API.

According to another embodiment, a second stage worker controller in configured to: retrieve system configuration, including number of processors/cores; retrieve test repository—in one embodiment, this means a git clone—in other embodiments, the repository can be downloaded from other storage locations and in other formats—for example, from a cloud storage service furnished by the user; run bundle install or install cached bundle; run per-instance setup tasks—including an makefiles, buildfiles, rake db:setup, rake db:migrate if there's a Rakefile); wait for selenium to start; retrieve tests from the REST API and run them with limited parallelism; report completion to the REST API.

In one example, tests run by an execution controller (e.g., an emcee) can send JSON-formatted results to the web service by issuing a PUT request to /sessions/<id>/tests/<id>/results. The format of the returned JSON result object can include the format described herein with respect to GET /sessions/<id>/test_executions.

According to one embodiment, a cleaner component can be configured to perform garbage collection operations. Many embodiments of the invention can use a periodic or continuous task to reap stale cloud resources (and the tests running on them) that haven't completed. In one example, the cleaner component can run as the api user, for example, every 5 minutes, using a cron wrapper. The following sections describe in more detail the actions taken by a cleaner process in one example: instances with no active assignments can be terminated if (uptime-minutes % 60)>50, in other words, stop instances before they enter the next billing term; instances with active assignments can remain running; instance records can be synchronized with a cloud provider's status (e.g., Amazon's status)—one example is described herein with respect to instances:synchronize rake task.

In some implementations, any single assignment running for more than 6 hours can be stopped. Any currently running test executions can be marked with an error status. Any single session with more than 6 hours assigned time can have all of the session's not-started test executions marked with an error status.

One aspect of the system includes the management of worker resources, potentially distributed across a number of different physical or virtual computers. In one embodiment, resources are virtual machine instances, and instances are managed in pools. Each pool has a security group and an SSH keypair. There can be a pool of instances for each Account, or some other grouping, like a pool per cloud provider, or pricing plan or a global pool for the entire system. Instance management relies on two data model objects, the Assignment and the Instance: an Instance corresponds to a cloud provider server—each Instance has an instance_id that is populated with an could instance_id (e.g., i-1234567); an Assignment tracks the time spent by a session (and thereby a user) on an cloud server represented by an Instance. Both Instances and Assignments have three states: "new"→"started"→"stopped". The following sections describe an example of an object model for representing cloud instances for use in the system.

In one embodiment, the methods Instance.start and Instance.stop interact with the cloud provider. Instance.start launches a new VM with the configured image_id and type, and assigns the created instance_id to Instance.instance_id. Instance.stop first stops all active Assignments for this Instance (in some examples, there can only be one), and then terminates the cloud VM.

In one embodiment, the Assignment can be the coordination point for a Session, a TestExecution, and an Instance. Assignment.start starts any one of a session, a testexecution, and an instance. Assignment.stop configured to: "stops" the current assignment on this instance. Stopping the assignment has the following side-effects on test_executions with this assignment: status "started" can be changed to "error"; end_time set to DateTime.now; status "notstarted" can have its assignment set to nil; if there are no more active assignments for this session, and there are "not-started" test_executions, calling done can try to allocate instances to this session.

In one embodiment, the Assignment also tracks what optional services can be configured on a test VM before test are run. The optional services supported include: selenium+xvfb; postgres; and sqlite3. The list of optional services tests are allowed to use can be included in the GET /instances/<instance_id>/configuration/ response. In one example, the response may include other configuration data like a list of packages to install.

According to one embodiment, provided are a set of management tasks used in conjunction with build and test execution operations. The following sections describes example sets of the administrative tasks that are used in embodiments of the invention. One example command includes "instances:list" configured to lists (to stdout) all Instances known about by the system, with: ec2_instance_id, start_time, stop_time. Another example command, "instances:stopall" is configured to stops all Instances and then terminates every instance booted with a current image_id, (e.g., where image_id== Configuration.aws.test_image_id). Another example command includes "instances:synchronize" configured to: stops all Instances that do not have running EC2 resources; creates and starts an Instance for each running EC2 test VM without one; logs information about the instances it finds; and terminates a running EC2 server that corresponds to a stopped Instance.

Another aspect of the invention includes the ability to read application configurations separately from source code. In one example, configuration can be read from a set of YAML files, e.g.: config/tddium.yml. One of these config parameters can be a flat file to tell the system whether to communicate with the cloud provider in real or mock mode. In one example, when the system starts in test mode, it does not communicate live with the cloud provider.

Another aspect of the invention includes a source repository that many users can securely share. In one example of the system, a component is configured to host a git server, manages git users and repositories, and running an sshd (daemon) to respond to git SSH commands. In one example, there are two components configured to provide git functionality: the git-hook and repoman. The following sections continue the implementation example. In one example, a SCM integration component includes a "git-hook." The git-hook can be configured to: run as a pre-receive hook to handle git push from tddium users; reads its API key from $HOME/etc/tddium.cfg; and queries the API to update the database of test scripts in a suite.

In another embodiment, an SCM integration component includes a repository manager. The repository manager ("repoman") can be configured to: start from a ssh "forced-command" in root's authorized_keys; lock against itself (using /var/lock/repoman.lockfile); read its API key and environment from /root/etc/tddium.cfg; query the API for the set of system users (e.g., unix users) and their associated git repositories that must be created (e.g., using GET /accounts/repoman endpoint); generate chef-solo JSON recipes to populate the required users and repository directories, written to /root/repoman.json; populate a user, which includes, for example, creating a user account (e.g., unix user account), install the account's git_api_key as YAML ({:api_key=>"key . . . "}) written to $HOME/etc/tddium.cfg; write $HOME/.ssh/authorized_keys with list of keys authorized to access this account; create $HOME/repo/; for each repo_name owned by this account: create $HOME/repo/<repo_name>; cd $HOME/repo/repo_name && git init -bare; link ~git/bin/git-hook to run as pre-receive in each repository. In some embodiments, repoman can write a JSON status hash to stdout when its execution is complete. Repoman can list all users and repos created. In one example, repoman is configured to list all of the failed users and repos. If any error occurred, 'status' can be non-zero and explanation can be set. In the case of a system-wide error, 'created' or 'errors' may not be present: {'success': [{'user': 'u123456', 'repo': 'somerepo'}, . . . ], 'errors': [{'user': 'u123456', 'repo': 'somerepo'}, . . . ], 'status': int, 'explanation': string; where repoman can exit 0 on success, non-zero on failure.

According to another embodiment, the repoman component can be configured to enable testing. Testing repoman can depend on the ability to manipulate a space of users that are not used for "real" repo maintenance. In one example, "real" users are assigned user identifiers begin at uid 2000. The system is configured to reserve/assign "test" users to UIDs at 1900-1999. Thus, the test scripts can be free to destroy uids 1900-1999 before/after testing repoman.

According to one embodiment, installation behavior of repoman (and chef scripts) can be configured for installation as part of an SCM server initialization (e.g., git-server initialization). In one example, the root executable controller (e.g., unix root) needs a revision manager initialized according to a respective programming language. RVM is a revision manager for ruby that can be initialized. In one embodiment, RVM contains the tddium_client gem, and the lockfile gem. In some implementations, repoman can be installed into a file directory referenced by an operating systems root execution controller (e.g., in unix—/root/bin/repoman).

According to one example, when repoman is installed, an ssh keypair is generated by the system in "current directory" api/.ssh/id_rsa_repoman[.pub]. The public key from the key pair can be added to /root/.ssh/authorized_keys. For example, the system can add the public key with a forced-command of /root/bin/repoman. Additionally, the ~git user needs to be created, with an rvm initialized with dependencies for tddium_system installed. In some implementations, the system is configured to use ~git/bin/git-hook (and can check to insure the file and settings exist), which can be hardcoded to use ~git/.rvm/rubies/ruby-1.9.2-p180/bin/ruby. For example, the git-hook can be hard coded with #! execution line hardcoded to reference revision manager settings.

One aspect of the invention includes a flexible billing model to cater to different customers. The billing model allows for users to pre-pay, or pay on-demand as they use resources. A billing component can be configured to account for the fixed and variable components of usage. In one embodiment, the system uses a subscription billing model implemented by the billing component. In some examples, the billing component can be configured to communicate with a third party billing system furnished by a third party provider that manages billing model, manages user identity, and payment information. Additional billing models and pricing implementations managed by the billing component ad discussed further below.

One embodiment of the invention tracks the cloud resources each account has used for test execution, including for example: Compute time (instance-hours); Overhead time (setup, downloading data); wall time (elapsed duration); external bandwidth (MBs); and storage UI (MBs). One embodiment automatically computes charges and posts them to a billing provider. Another embodiment requires the administrator to manually compute charges and submit them.

In one example, the following administrative tasks can controlled by a billing component and/or executed by an administration system: account:usage: calculate account-activity and store it for review and editing; account:compute_charges: compute monthly charges based on aggregate usage tracking and/or files (e.g., specified by pricing.yml); account:activity: produce a combined report by running usage and compute; account:charge: submit charges to billing services (e.g., Recurly) for some/all of the accounts.

The following description provide additional details on pricing operations executed by the system. In one embodiment, the system executes a pricing management task "account:usage." Execution can include calculation of a usage report based on Assignment and Instance, which can record the following values for each Account: tests_completed: total TestExecutions completed; <instance_type>_hours: hours of time on each instance type; external_bandwidth_mbs: MB s of data transferred in/out of a cloud provider (e.g., EC2); storage_io_mbs: MBs of storage IO ("EBS"); and <optional_service>_hours: hours of time each optional services are enabled—some example Optional Services that can be implemented are discussed herein.

In another embodiment, the system executes operations to compute account charges. For example, task "account:compute_charges" is executed to read files container per-compute-unit pricing information (e.g., config/pricing.yml). Example pricing files can be html formatted objects: <item>: (:included: float) (:cost: float). Completed object example includes: t1-micro_hours: (:included: 30.0) (:cost: 0.03) and selenium_hours: (:included: 0.0) (:cost: 0.0). Task "account: compute_charges" can be executed to read CSV produced by task "account:usage" and use the pricing configuration to compute a monthly charge based on usage fields and the pricing configuration. An example output CSV can be generated by the system with Account id, display_name, monthly_charge, and the usage fields from above.

Another example task, includes task "account:activity." The system and/or billing component can be configured to chain execution of task account:usage and task account: compute_charges, to produce an activity report with monthly charge per account. Another example task includes, task "account:charge," when executed reads in the CSV format produced by execution of task account:activity. For each entry, the system and/or billing component is configured to post monthly_charge to the Account's billing service account (e.g. a recurly account).

As discussed, various embodiments of the invention may be hosted in a public cloud provider, or in dedicated or shared private hosting compute environment. Various embodiments disclosed, can operate using any type of compute resource (e.g., provided by cloud compute provider, provided on customer environment, available over a communication network, etc.).

One aspect of the invention includes the ability to notify users of test results or other events using email, SMS, or other messaging technology including instant messaging, chat, VoIP, or other telephony. Embodiments of the invention may use third-parties to deliver notifications. Another aspect of the invention includes the ability to allow the user to control the types and levels of notifications generated and delivered by the system at various levels of detail. In one embodiment, some examples of notification control include: disable all email notifications, or enable notifications for tests, which can specify tests from a particular repository, or disable SMS notifications after work hours.

Another aspect of the invention includes automatically configuring a test execution environment. In one embodiment, the test execution environment can be created dynamically by the system on behalf of the user, used to run tests, and then torn down when it is no longer needed. In one embodiment, the test execution environment isolates tests run for one user from tests run for another user by using access control and authentication functions. For example, unix user accounts and unix process management can be used to isolate test runs and in other examples, isolate execution of specific process by user, among other options.

According to one embodiment, a test execution environment is executed on the system, which includes a "Stage 1" boot controller, a "Stage 2" test worker controller, and an auto-configuration protocol and mechanism that requires zero or little user interaction. One embodiment of the test execution environment automatically optimizes test performance by pre-loading costly resources shared by some or all tests.

In another embodiment, setup/initialization of the test execution environment includes a stage 1 phase of initialization. In one example, the steps for installation and configuration of an execution controller (e.g., an "emcee") include: build of a customized AMI as discussed with respect to Test VM configuration herein. In one example, configuration of the test controller can include: installation of a version manager (e.g., RVM/ruby/rubygems) for a root process; generation and/or associate of a default gemset, tddium_emcee, which can include HTTParty, proc/wait3, etc; installation of chef recipes in /root/etc/chef (further examples of chef scripts and operations provided are discussed herein); run chef-solo on tddium_system/devops/chef/config/testvm.json, which is configured to: place pre-built tddium environment in /root/tddium.tgz, and install stage1.rb as /sbin/emcee-stage1.

In one example, the execution controller (e.g., emcee) operates in two pieces: the Machine and the Instance. The machine represents the Emcee Stage 1 state that can be preserved across multiple runs of Stage 2 of the test environment setup. In some embodiments, an instance corresponds 1-to-1 with Stage 2 instances. According to one embodiment, a machine executed on the system is configured to retrieve instance ID from a cloud provider (e.g., AWS); probe system configuration with an operating system interrogator (e.g., Ohai); collect system statistics (wall time, disk, and network); wait for API to indicate that emcee can proceed; run Instance; and return to waiting for API server.

According to one embodiment, the system executes instances, where each instance can be configured to: retrieve instance configuration from API; clean up any vestiges of non-system users (procs, files, etc.); download template for stage 2 user or use local copy; run chef to create and populate test user, which can be configured to: use /root/tddium.tgz for base install—includes RVM, install selenium distribution into src/selenium, install private key for GIT repo; install public host key for GIT repo, and download stage 2 and copy it to test user's home directory; install ssh keys for stage 2 user; initialize and start subsystems for stage 2 that require privilege; install/upgrade user's copy of stage 2 emcee gem; exec stage 2 emcee, passing args in JSON file in stage 2 user's home; wait for stage 2 to complete; post logs and usage data to API; and clean up after user (as in setup phase).

According to another embodiment, additional description of a stage 2 run executed by the system is described. For the purposes of illustration additional non-limiting environment description are provided: there is a user with: rvm, ruby, and rubygems; gemset tddium_devops with bundler and ohai installed; gemset tddium_testenv with bundler; GIT-core is installed; there is a $TDDIUM_HOME/src directory; there is a $TDDIUM_HOME/src/selenium with selenium installed; and Stage 1 has been run by the system. According to the details of the example environment, the system is configured to take the following actions.

In one example, a test worker controller executes the following procedure to automatically configure the environment and run tests for stage 2. The test worker controller is configured to: probe subsystems, check against authorized list, and startp; GIT clone; Bundle install; fetch tasks in batches—execute with limited parallelism; post results such as Selenium screenshots to S3 and report same to API; stage 1 can be responsible for posting logs and usage data to API—and the stage 2 test worker controller can report logs and usage data to the stage 1 processes.

One aspect of the invention includes configuration that enable the system to support automatic configuration of a test environment. An embodiment of an execution controller (e.g., an emcee) that supports automatic configuration can be configured to: examine software, library, and package dependencies of a project; dependencies may be explicitly declared; determine dependencies by examining the source or executables of a project; dynamically determine dependencies at runtime by receiving or monitoring requests directed either to emcee or to third party services; determine the set of supported, allowed, and paid for dependencies; determine the order in which to satisfy dependencies, which can include in one embodiment explicit or implicit declaration or monitoring of dependencies between components of the project, the system, and third party software and hardware components, or can be determined by topologically sorting the set of dependencies; install, start, and stop services in the system on the basis of required dependencies, allowed and paid for services, and events in the system, which can include in one embodiment events such as "start" which indicates to the system that all dependent subsystems or services can be started and "stop" which indicates that they can be halted and torn down.

In one embodiment, the web service API sends a configuration hash that maps optional subsystem names to a string argument. This argument can be intended to express policy (e.g. run at most 4 Selenium RCs), not mechanism (e.g., use display #2). If a subsystem takes multiple arguments, they can be delineate using comma separation.

In some implementations, an X11 display number defaults to 2 but may be set via /instances/<instance_id>/configuration by sending a non-nil value for the x11_display key. Table 4 described features of subsystem elements which can be implemented during test environment setup and execution and further describes the components with respect to the stages of environment setup/execution.

TABLE 4

| Subsystem | Stage | Requires | Arguments |
| --- | --- | --- | --- |
| Postgres | 1 | | |
| Postgres | 2 | | |
| Xvfb | 2 | | |
| Fvwm | 2 | Xvfb | |
| VncServer | 2 | Xvfb, Fvwm | |
| Selenium | 2 | Xvfb, VncServer | #rc |

According to one embodiment, the includes a subsystem module. The Subsystem module implements the auto-configuration mechanism in both stage 1 and stage 2. The core implementation can in one example be read from emcee/subsystem.rb provided from configuration files in $HOME/lib for stage 1 and stage 2 operations. In one example, emcee/subsystem.rb is required out of $HOME/lib during both stages of test environment setup and execution. In one embodiment, a copy of the configuration files is used by stage 1, and can be installed at stage 1 deploy time into the Test VM before it is rolled out. Execution of Stage 1 is configured to include a copy operation which copies the file into the test user's home directory for stage 2. In another embodiment, the subsystem module interface consists of a base class which can be access on the system using objects definitions: Subsystem::Subsystem. In one example, all implementations of the subsystem module objects inherit from the defined parent object subsystem::subsystem. The subsystem module can be configured to implements a number of functions: subsystem_list—compiles a list of all declared subsystems; subsystem(name, stage)—retrieves a subsystem by name and stage; order(subsys_list)—computes a partial ordering that respects requirement declarations; authorized(subsys_ok, subsys_list)—if any subsystem in subsys_list is not in the subsys_ok hash raises an error—otherwise returns true; prepare—takes a hash of authorized subsystem name→string args and the stage number and computes a list of enabled/required subsystem classes ordered by dependencies; configure—takes a list of prepared subsystem classes, a hash of subsystem name→arguments, and host_config, api_config, and aux hashes—which allocates an instance for each subsystem and configures them in order—and returns the list of allocated and configured subsystem instances.

In one embodiment, each subsystem class inherits from Subsystem::Subsystem and can be defined in the Subsystem module to be auto configure. In some examples, rspec tests can avoid declaring subsystems in the subsystem module to avoid module pollution, however other embodiments do not permit avoidance of declaring subsystems. In one embodiment, each declared subsystem class has: a name—a string that identifies the subsystem; used by the API; a stage—is this the stage 1 or stage 2 subsystem class?; a requires—a list of classes for subsystems required by this subsystem; an enable? method—called to determine if the subsystem can be enabled—a subsystem may be enabled by fiat, upon probing the system state in this method (e.g. checking the current bundle's gem list), or as the result of being required by an enabled subsystem; a configure method—called on an allocated subsystem object to configure the subsystem for use; a start method—called on an allocated subsystem to start it; a stop method—called on an allocated subsystem to stop it.

In one embodiment, subsystem enable methods may be called in any order. In another example, configure, start, and stop methods are called in dependency order. In one implementation, dependencies are computed on the system by topologically sorting the graph induced by subsystems and their "require lists." If there is a cycle, subsystem initialization can fail.

Another aspect of the invention includes a lightweight test executor that runs test programs in isolation, allows fine control of execution order, avoids test startup overhead, and falls back to a "safe" mode if it encounters problems, all without requiring the user to modify their tests or their application. Further, the invention allows the for the system operator to examine and improve the test executor quickly and easily, still with no user intervention required. For example, a common problem with test execution can be that a single test script and the application code it tests often has significant startup overhead, ranging from a few seconds to many minutes. This overhead can be exacerbated for applications with heavyweight runtime environments (like java, where it has to start a JVM) or with interpreted languages like Ruby or Python (which have to start an interpreter). This startup overhead drives unsophisticated test harnesses to combine a large number of tests into a single process that pays startup overhead once. The result is often that combined tests produce different results than tests run by themselves, or that the order of combination differs from run to run and therefore the test batch produces flickering results.

Some incomplete solutions exist for this problem, in particular for Ruby testing, for example an open source package called spork. Spork resolves the startup overhead issue, but suffers from complex configuration and high runtime overhead. Spork documentation reflects that any performance found by its implementation disappears with a large test suite. At least some aspects address startup overhead by pre-loading software components with expensive initialization, and places the configuration burden on the system administrator, rather than on the end user. At least some aspects address the runtime overhead that existing solutions wrestle with.

In one embodiment, the system implements a test executor component as an execution controller. In one example, the test executor comprises 4 logical components: a "server" that coordinates a set of "parent" processes to start and listens for control commands from the "client", which it forwards to appropriate "parent" processes—if no "parent" can process a test successfully, the server can fall back to a non-preloaded execution mode; and a "parent" that starts and pre-loads a configurable set of common software modules—the parent may choose a different set for different types of tests. For example, the parent may load the rails ruby module for tests that interface with a rails application. the parent may load a java web application framework for java tests. Once the parent has started, it waits for control commands. When the parent receives a control command to start a test program, the parent forks a copy of itself as a "worker" (e.g., using the unix fork(2) system call), cleans up its process environment for the forked child process. The test executor can also include a "worker" that can be forked from the "parent" and actually runs a test program within its preloaded context; and a "client", that can be the "Stage 2" controller that requests the "server" to run a particular test.

In one embodiment, the system can determine what to preload using dependency analysis, described elsewhere in this document. The system can also be configured to feed back dependency changes that must be injected to allow preloading to occur smoothly. In another embodiment, the "parent" component is configured to dynamically determine what it pre-loads based on a database of known-safe preload modules collected from multiple test runs, across the entire base of system users. For example, modules can be blacklisted if they always cause a pre-load failure.

In one embodiment, the controller process runs on each cloud compute resource used to run tests. In one example, it is referred to as the Hub or the Emcee Hub. The Emcee Hub runs as a separate process and coordinates the activity of the API server, Emcee Stage 1, and Emcee Stage 2 components. The hub allows the API server to determine if an instance is alive and to kick the Emcee Stage 1 process when it is sleeping waiting for new jobs. In one example, the hub component is configured to allow an unprivileged Emcee Stage 2 instance to request that services such as databases be started on its behalf. In another example, Hub web service URL paths have the form: /<version>/<service>/<method>, where version is the Hub API version (e.g., version 1), the service can be the service type (api, emcee, subsystem), and methods implemented can be the particular Hub API method. In one embodiment, the API can communicate using secure communication. For example, the API responds to HTTPS requests.

A summary of the interface methods used by one example in TABLE 5.

TABLE 5

| Method | URL (params) => result | Accessible by | Function |
| --- | --- | --- | --- |
| GET | /1/api/alive | Tddium API server | Response indicates that Hub is active |
| POST | /1/emcee/start | Tddium API server | Rendezvous point for Emcee and API |
| GET | /1/emcee/start | Emcee Stage 1 | Rendezvous point for Emcee and API |
| POST | /1/emcee/stop | Emcee Stage 1 | Indicate that Emcee run has completed |

TABLE 5-continued

| Method | URL (params) => result | Accessible by | Function |
|---|---|---|---|
| POST | /1/emcee/keygen | Emcee Stage 1 | Generate ephemeral Hub key for stage 2 |
| GET | /1/subsystem/enable | Emcee Stage 2 | Is specified subsystem enabled? |
| POST | /1/subsystem/start | Emcee Stage 2 | Request subsystem be started |
| POST | /1/subsystem/stop | Emcee Stage 2 | Request subsystem be stopped |
| POST | /1/subsystem/stop_all | Emcee Stage 2 | Stop all active subsystems |

In one example, requests and responses to the Hub API are configured to be formatted in JSON. In some examples, JSON returns values are hashes. The returned hash contains at least: status: zero on success; non-zero otherwise; and result: structured result or string; in the case of an error it can be the error message.

In one example, when a test VM instance is booted, the hub server can listen, for example, on port 443 for connections. In one example, the test VM can be configured so that only the API server is able to contact the Hub. Connections to the web administrator interface exposed by the Hub can be routed via a reverse proxy in the same security group. In one example, all Hub API requests must have an authentication key header (e.g., X-tddium-api-key HTTP header) with the client's API-key as the value. According to various embodiments, three key types are implemented for the API keys: Tddium API—used by the Tddium API server when contacting the Hub; Stage 1—used by the Stage 1 Emcee; and Stage 2—an ephemeral key generated for a Stage 2 instance by the Stage 1 Emcee—valid for only one session.

Additional details of the test environment setup and execution are further described, and include further specification of the methods and functions executed by the system. An example method includes "GET /1/api/alive" configured to returns ok/ok, the method upon execution enables the API server to determine if an instance is running. Another example method includes "POST /1/emcee/start" which accepts parameters: api_server: base URI (scheme, host, port) to use for Tddium API calls; and functions to causes the Stage 1 Emcee waiting for a job to wake up and contact the API server. Another example method includes "GET /1/emcee/start" configured to return: go: the string "ok" or "wait"; and api_server: base URI for Tddium API calls. In some embodiments, the start method is configured to block briefly (up to about 30 seconds), then returns either "ok", in which case the Stage 1 Emcee process can proceed, or returns "wait", in which case the Emcee can continue to poll—posts to this URL are ignored while the Emcee is active.

Another example method includes 'POST /1/emcee/stop" which takes no arguments. Upon execution the method causes the Hub to: transition back to the wait state; flush all ephemeral keys; and shutdown any subsystems started for Stage 2 that have not been explicitly shutdown. In another, "POST /1/emcee/keygen" is provided and configured to take a user name, and associate the user name with the generated key, and return a registered ephemeral key for the subsystem Hub API. More specifically the parameters can be defined: user: name of the user to associate with the generated key. In one example, "POST /1/subsystem/enable" executes and the user name passed to the subsystem receiving the start message is determined by the Hub API key used. The method can accept parameters: subsystem: name of the subsystem to query. "POST /1/subsystem/start" is another example method, where the user name passed to the subsystem receiving the start message can be determined by the Hub API key used. The method can accept parameters: subsystem: name of the subsystem to start.

Another example includes a "POST /1/subsystem/stop" method where a subsystem can be stopped upon execution identified by the user name passed to the subsystem receiving the stop message, and can be determined by the Hub API key used. The method can accept parameters: subsystem: name of the subsystem to stop.

"POST /1/subsystem/stop_all" is another example method, the stop_all method accepts no arguments. It sends the stop message to all active subsystems managed by the hub on behalf of the user.

Another aspect includes seamless integration of interactive test running via the user interface (e.g, CLI) and automatic test running triggered without user input, on a variety of conditions identified by the system. Once an automatic run completes, the user can be notified, and/or other actions are taken. One embodiment triggers tests using a continuous integration model, where an agent can be notified when the user's software changes, or proactively monitors the user's software for changes, and runs tests when new software is available.

Automatic test servers, e.g. CI servers, can be tricky to setup, and are usually regarded as a chore to care for. Just as the system provides for maintenance free parallelism, it can also free the developer from maintaining a CI server. In one embodiment, a continuous integration server automatically interfaces with the user's SCM service (e.g., a git server—github) and the system's test infrastructure to trigger test runs based on the user's configured instructions. When tests finish, the service can notify the user with test results, and optionally deploy changes to a target server.

Other embodiments may carry out additional automatic or user-defined tasks after tests finish, and those tasks may be conditioned on the results of test execution. For example user-defined task can be executed on the system including: executing a user-defined task from within the test environment; executing a user-defined task on an external server; posting to a web service API hosted by the user or a third party; monitoring the deployed server(s) for changes in error rates; monitoring the deployed server(s) for changed performance; monitoring the deployed server(s) for changed application metrics, like conversions; and rolling back or expanding the deployment based on the results of any other step.

In other embodiments, the system may automatically re-run tests periodically, after a certain number of failures, at certain times of the day, for example, only if resources are available below a certain price, using a different configuration, or a combination of these or other models. For example, if more than 10 tests fail using the standard configuration, the system is configured to re-run the tests/test suite in failsafe mode with reduced parallelism to avoid potential race conditions.

In one embodiment, the automatic test execution can be managed according to a continuous integration model by the following system components: management suite commands (e.g., tddium suite command); API Server; repoman: run to generate working directories and implant keys; baroness: CI manager server; and destro: CI worker triggered by baroness. In one embodiment, the user can configure CI operations and functions using the tddium suite command. The tddium suite command can take the following additional parameters: pull git URL; test pattern: CSV glob patterns of tests to run; (optional) notification email address; defaults to user email; and (optional) push URL—if set, tddium can push here on tests passing.

In one embodiment, when CI is enabled successfully, the tddium suite command can display info the user needs to configure his SCM and target server (e.g., git and target git server). For example the command can display: URL to be used by a post-receive hook (e.g. on github); ssh public key to authenticate pull/push requests; and notification email address.

As discussed, the web service API can support automatic test execution. Described in additional detail are non-limiting examples of system operations and functions implemented with the API. For example, the API can be used to establish a test suites and to create users associated with a test suite. In one embodiment, CI can be automatically "enabled" for a suite if a pull url is configured when tddium suite command POSTs to /1/suites/, or PUT /1/suites/<id> with URLs. Execution of "Suite#to_json" can include the hook URL and public_key. In one example, the User model is implemented with additional fields: ci_ssh_pubkey, ci_ssh_privkey to use to authenticate CI requests; and ci_api_key for use by destro to communicate with the API server on behalf of the user. The test suite model can also include new fields: ci_hook_key that can be published to the user to map a post-receive hook call back to a suite; test_pattern; ci_pull_url, ci_push_url; and notify_email.

When a CI test suite run starts, destro is configured to POST to /1/builds/ to create a record of the run. The build executed can include: commit sha; pull URL, branch, output, and time; tddium spec output; push URL, branch, output, and time; email notification address and time; and start and end times. As destro runs, it can update the build with PUT /1/builds/<id> calls. When the build is complete, destro can POST to /1/builds/<id>/done. When a build is marked done, the API server can send email to the suite owner's email or the configured notification address According to one embodiment, the system includes a repository manager. The repository manager can be configured to: populate each user directory with: a CI private ssh key (~/.ssh/id_rsa_ci), a ~/etc/tddium.cfg file with an entry:—---:ci_api_key: <CI_API_key>; authorized_keys file to include api server public key, with command='/usr/bin/destro $SSH_ORIGINAL_COMMAND'; and create ~/builds/ directory.

In one embodiment, The CI manager server can be a web app configured to: run as the api user; processes POST /builds/<hook_key>; look up hook key with the following API call: GET /1/hooks/<hook_key>; unknown hook_keys can be rejected with an error code "404"; a known hook_key can map to a unix_username and suite_id, which generate an ssh command to run destroy; trigger destro to run tests as the user via: ssh <unix_username>@localhost <suite_id>—the suite_id can be turned into a command to execute via the user's ssh config and the ssh forced-command mechanism; and return code "200" if destro_command returns zero.

According to one embodiment, the CI worker is configured to: read a suite_id as its only command line argument; sanitize the id as an integer, and query the API for suite info; add git private key to ssh IDs using ssh-add ~/.ssh/id_rsa_ci; if the working directory for project_name-branch doesn't exist—git clone <pull_url>-b<branch><directory>; Otherwise—cd <directory> && git remote set-url origin <pull_url> && git pull -f origin <branch>; record the latest checkin: cd <directory> && git rev-parse origin/<branch>; generate <directory>/.tddium from CI API key in ~/etc/tddium.cfg, suite_id and branch; create a build for this run by POST /1/builds/ (all API access can be done using the key in ~/etc/tddium.cfg). Include the suite ID and last-commit sha; start tests for suite: cd <directory> && tddium spec; if tests pass, and push URL can be configured Push to target: cd <directory> && git push <push URL><branch>; POST /1/buildskid>/done.

Another aspect includes secure, multi-tenant storage of user repositories. In one embodiment, SCM (e.g, git) repositories are stored in user home directories (e.g., specified as per-Unix user home directories). For example, each system account can correspond to a single Unix user. In one embodiment, the system implements a single EBS volume holding all home directories (e.g., Unix home directories). In one embodiment, the system provides support to multiple volumes for Unix home directories. The system provides this support to enable additional storage to be implemented incrementally. The system provides this support to enable facilitate sharding of git repositories. Multiple volume support entails several complications, including but not limited to: maintaining a consistent naming convention; bringing new storage online without disrupting operations; and load balancing consumption and I/O traffic across volumes. One embodiment brings storage online manually. Others automate the process of adding capacity. Similarly, some embodiments handle load balancing of storage consumption by hand, and others automate the load balancing process.

One embodiment involves the following behaviors: add/change mount points for user home directories; create a consistent naming convention for home directories that is independent of the backing volume; updates to the repository manager to support new layout; and updates to the backup system to support the new layout. In one embodiment, the system's storage (databases, deployed API server, etc.) can reside on its own volume separate from user storage. This volume can be mounted at '/home' on the API server. In one embodiment, user volumes can be named sequentially with the name [SCMname] [volume] [integer] (e.g., gitvolN) where N can be an integer. New user volumes can also be created administratively instead of automatically. The size of a volume can be selected and configured to balance the length of the backup window against the total number of user storage volumes.

In one embodiment, the user volume named gitvolN can be mounted at /tddium/gitvolN on the API server. A user named uM for some integer M and residing on volume gitvolN for some integer N can appear at /tddium/gitvolN/uM. Additionally, there can be symbolic link at /home/user/uM pointing to /tddium/gitvolN/uM. For Unix implementations, the Unix home directory on the API server for user uM can be /home/user/uM. This allows the system to update a symlink if and when the user is moved from one volume to another.

In one embodiment, the repository manager is configured with a mapping from user to SCM storage volume (e.g., git storage volume). The repository manager can be responsible for creating home directories on the appropriate volume and creating a symlink from /home/user/uM to /tddium/gitvolN/uM. In one embodiment, the repository manager's basic algorithm can run the following chef recipes for each user/repo that needs to be updated:{"users": <%=user.to_json %>, "run_list": ["recipe[mkuser]", "recipe[ssh_keys]", "recipe[repoman]"]}. In one embodiment, the repository manager is configured to first create an empty homedirectory in the gitvolN underlying storage, symlink to it from /home/user, in order to provide a new layout. The repository manager then applies changes as needed by the above existing recipes. This can be accomplished by inserting a new chef recipe to be run before mkuser: mkuser::homedir: {"users": <%=user.to_json %>, "run_list": ["recipe[mkuser::homedir]", "recipe[mkuser]", "recipe[ssh_keys]", "recipe[repoman]"]}

In some embodiments, the mkuser::homedir command is executed with the following additional keys in each user hash: gitvol_homedir: the directory within the gitvol mount to create; gitvol_symlink: the name of the homedir symlink. In one embodiment, the repository manager can read homedir_volume and symlink_dir from its configuration file (/root/etc/repoman.cfg) on start. Any new parameters can be required to be specified in the .cfg file, in some examples.

Another aspect of the invention includes an automated backup process. In one embodiment, the automated backup scripts can limit blocking on the database when accessing the volumes that contain database clusters, for example, freeze the database only when backing up volumes that contain database clusters. The automated backup scripts can configured to backup multiple volumes, ideally in parallel.

One aspect of the system includes the caching strategy for source code, tests, data and test inputs, software source code and library dependencies, build artifacts, logs, and results. Efficient operation of the system can be configured to include a selective multi-tier caching algorithm that handles at least some of the data and objects generated during build and test operations. The system is configured to implement one or more of the following strategies: install software source code, libraries, executables, data, and other objects in every test worker VM environment. In some embodiments, the system selects this strategy for objects that are required by most users—which may include common data sets such as geolocation datasets, popular software tools, etc. Another strategy for caching includes maintaining a mirror of common software tools, source code, libraries, executables, data, and other objects. In one embodiment, the original repository can be copied to a new location known to the system and that copy can be periodically updated. In another embodiment, a caching system such as an HTTP proxy cache transparently caches common objects fetched from the network.

Another caching implementation is configured to maintain a per-worker instance cache. The per-worker cache can be implemented locally on a test worker. The per-worker cache can be configured to operate as an independent cache, a first level cache backed by a global, and in some examples distributed, second level cache, or in other embodiments, the per-worker cache cooperates with other nodes in the system as part of a distributed cache. The per-worker cache can be pre-populated at installation time, at boot time, or opportunistically.

Within each caching implementation, embodiments of the system are configured to apply one of several strategies to determine what objects to cache: select cache objects that are external dependencies to avoid service interruption in the event of network failure or partition; cache large objects (e.g., large objects that are time consuming or expensive to transfer into the system); cache source code so that the system need only transfer the differences between existing and new user-submitted versions; cache libraries, executables, intermediate object files, compiled resources, and other artifacts of the build, execution or test execution process for subsequent use; and identify re-used objects within a test suite and caching on same.

The system can also be configured to: allow build and execution scheduling algorithms to take into account cache locality to improve performance and reduce data transfer times and volumes; use system throughput, latency, cost of goods, contractual obligations or other criteria to govern cache placement, replacement, size, and other cache policy decisions; use a consistent hashing naming convention for objects, for example: in one embodiment, build artifacts are archived and stored using a consistent hashing naming convention that incorporates metadata including but not limited to build or source version, target machine architecture, user identity, and system version; in another embodiment, data objects, libraries, executables, configuration data, test inputs, and other objects may be named using a consistent hash; and in another embodiment the consistent hash naming an object can be generated over summary metadata as well as the content of the object.

In one embodiment, the caching architecture and internal API may be exposed to users. For example, users may take advantage of the caching architecture to accelerate tests, avoid moving large test datasets and inputs, or for other application-specific purposes. In another embodiment, the caching architecture can be a private interface of the system and users have no explicit access. In some embodiments, the system is configured to support a finer (or coarser) grained access control policy and optimize cache utilization based on a variety of criteria such as a user's contract or plan, system utilization, cost of goods, individual user performance, or overall system performance.

Figure 15:
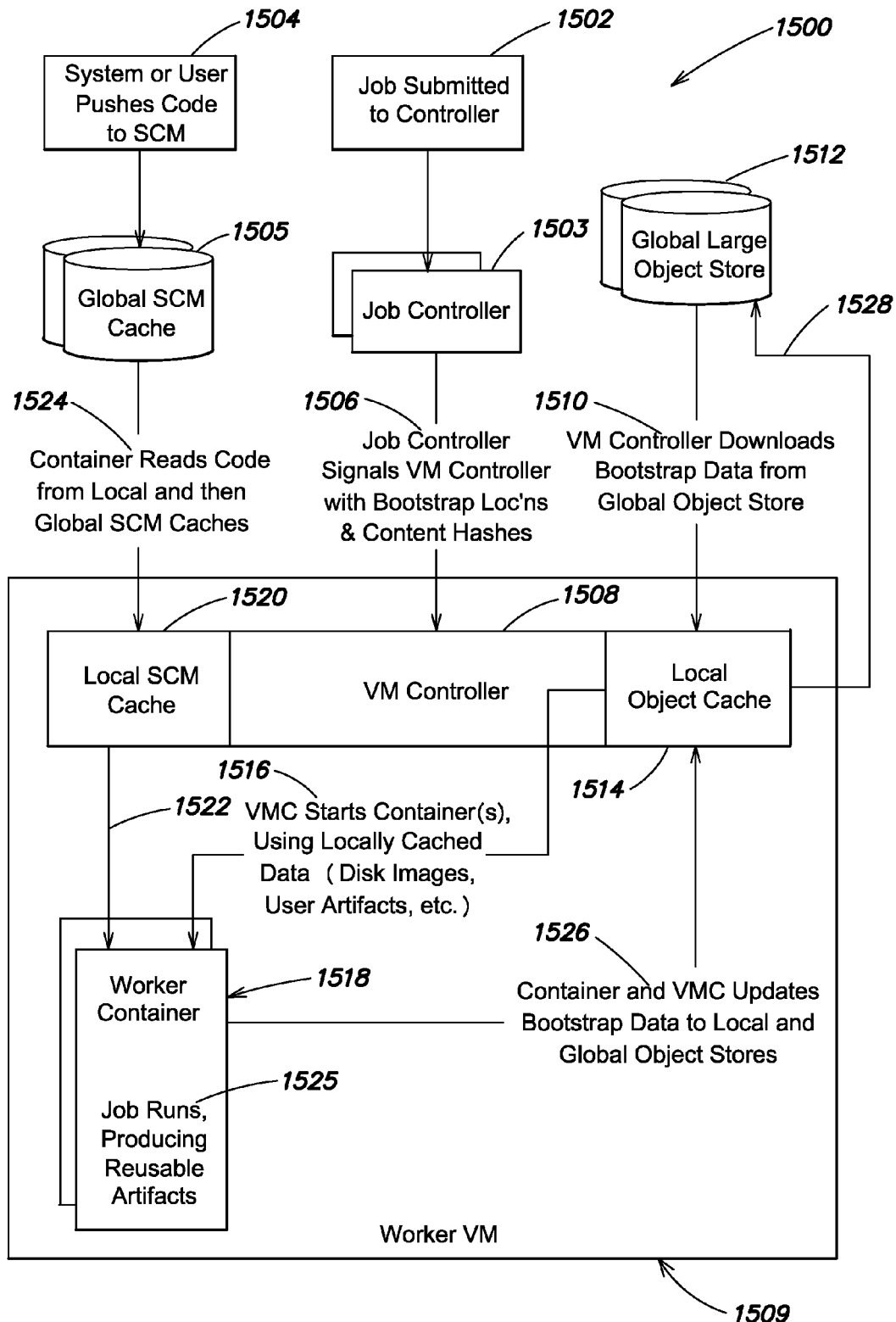
FIG. 15 is an example process for caching data on an SDLC system, according to one embodiment.

FIG. 15 illustrates an example process flow for caching data on an SDLC system. Process 1500 begins at 1502 with a compute job being submitted to a job controller 1503. The job submitted at 1502 can be the result of a system operation or a user initiated operation (e.g., at 1504 a user or system operation pushes code to an SCM). The system can analyze the code pushed at 1504 to determine if caching is requiring or will improve performance. In one example, the pushed code can be caches in a global SCM cache 1505. At 1506, the job controller signals a VM controller 1508 of a virtual machine 1509 regarding the compute tasks to be performed. In one example, the message from the job controller 1503 to the VM controller 1508 includes bootstrap locations and content hashes for cached data. At 1510, the VM controller 1508 downloads bootstrap data from a global large object store 1512. The down load can be to a local object cache 1514 or the download can be copied to a local object cache 1514.

At 1516, the VM controller starts one or more execution containers 1518, where the compute tasks and/or associated data to be executed can be copied from local cache 1514, or local SCM cache 1520, at 1522. In some examples, the one or more execution containers are configured to read code from local SCM cache 1520 (e.g., at 1522) and from global SCM cache at 1524. The compute tasks are run on the one or more execution containers at 1525. The one or more execution containers 1518 and/or the VM controller 1508 then updates bootstrap data to local and global object stores at 1526 and/or 1528.

Another aspect of the system includes automatic dependency analysis of the set of software tools, libraries, and systems required by the application under test. In some example, analysis can be performed on compilers, interpreters, linkers, loads, third party software packages and libraries, testing tools, databases systems, windowing environments, and any other software need to run the application under test and to run its automated test suite. In one embodiment, the system gleans dependency information from a set of configuration files provided by the user.

In another embodiment, the system determines dependency information using static analysis of source code, libraries, executables, binaries, and configuration files. For example, the system can be configured to analyze the system dynamic linker to determine library dependencies. The system can also be configured to parse the source code to determine which modules are imported. The system can examine configuration files to determine what external binaries, software tools, or other software or hardware systems are required to run the system under test or its automated test suite.

In another embodiment, the system determines dependency information by using dynamic analysis techniques. For example, the system can modify the runtime system, compiled or interpreted code, program execution mechanisms, the operating system, libraries, or installed executables to trap events that indicate a dependency relationship. For instance, the system can replace system binaries with scripts that interpose event collection and monitoring between the application under test and its environment. The system can be configured to provide alternate execution environments (e.g. compilers, linkers, libraries, interpreters) that trap events such as module loading or unloading, library function calls, remote procedure calls, and the like which indicate dependencies.

In another embodiment, the system determines dependency information through a combination of the forgoing methods. In another embodiment, the system uses any of the forgoing methods to determine dependency information and applies those techniques recursively to each new dependency.

In other embodiments, the system is configured to use dependency information to determine some or all of the following: what software and/or hardware must be installed; what resources are necessary—number of processors, amount of virtual or physical memory, how much storage, and what sort of performance can be required from each; the system may build a profile of the usage patterns of various dependencies such as databases to predict resource consumption; when the set of installed dependencies is out of date; when to warn the user that dependencies, including installed dependencies, have known defects, performance problems, or are often associated with correctness or performance problems; when the set of dependencies can not be satisfied, for instance because the dependency is no longer available for installation; how common this set of dependencies is for benefit of user; a set of best practices for given tasks or problem domains and to make automated suggestions to improve user software engineering practices; what set of dependencies to install based on system configuration, current task, execution phase, or the like; what set of dependencies to load into the environment base on system configuration, the current task, execution phase, or the like; and what software and/or hardware must be installed.

Another aspect of the invention includes the ability to isolate storage and execution environments from each other. Isolation provide by the system includes isolation between different users and different instances of the same user. This isolation may be primarily for security, for performance isolation, or to ensure repeatable test execution results, or any combination of the forgoing. In one embodiment, users are trusted and the test execution environment can be shared across users and/or executions. In another embodiment, isolation can be achieved using virtual memory and operating system user and process isolation and security mechanisms.

In one embodiment, isolation can be achieved using whole system emulation. One example of this technique includes execution an emulator such as bochs to construct a test environment. In one embodiment, isolation can be achieved using virtualization or paravirtualization. One example of this technique includes using a virtual machine such as VMWare or VirtualBox or a paravirtualization system such as Xen. In one embodiment, isolation can be achieved using operating system or container virtualization. One example of this technique is implemented as a container using Linux LXC. In one example, the system generates an LXC container for each user in the system, installs the system's controller processes to set up a test environment in the container, and have the container interface with the system's web service. In one embodiment, isolation can be achieved using separate physical hardware to construct an environment.

In one embodiment, any combination of the forgoing techniques may be used. For instance, each user might be given separate physical hardware for execution but shared storage or networking.

Another aspect includes the ability to save isolation containers for future use or to oversubscribe them to allow many users to share the same resources to run tests. In one embodiment, the system saves isolation containers in order to avoid the need to have to construct a test environment from scratch. The system may pre-populate the environment with common tools, libraries, executables, configurations, etc. or it may predict the needs of a user or project, or it may capture an actual execution environment and save it for future use.

In one embodiment, the system runs a virtualization container on top of either physical or virtual hardware to multiplex multiple test environments for the same or different users. This allows the system to achieve higher utilization by oversubscription. In one embodiment, the system runs a user-provided virtual machine image that boots and runs tests, which can be integrated by the user with the system's APIs. In another embodiment, the system runs a user-provided virtual machine image setup program, such as a Chef or Vagrant script, to prepare a virtual machine to host the user's tests running on the system's physical or virtual hardware. The VM setup program may be included along with the user's application and test code in their repository. In another embodiment, the system automatically installs its controller processes into the user-provided virtual machine, or a virtual machine generated by the user's setup program to free the user from having to manually integrate.

Another aspect includes a security model that isolates user code from the control logic of the system and from other user code. In one embodiment, the invention runs as a hosted service on Tier 1 cloud providers. Unless otherwise directed by the user, the system can run users tests in any one of a number of different data centers administered by one of its hosting providers. The system can be configured to limit transfer of user code to or run user tests in a different cloud hosting provider by requiring prior notice and the opportunity to direct the system to use a particular supported hosting providers. One embodiment implements per-user ACLs to restrict the usable resources.

In one embodiment, these practices are followed to provide a security method: use a patched Linux distribution and apply regular software updates to provide continuing protection from security exploits; use firewalls to restrict access to both centralized infrastructure and individual worker instances; use modern cryptographic techniques to authenticate and encrypt internal network traffic; do not run user-provided code on any core, shared system-user code runs can be configured to run in individually siloed environments on work instances.

In one embodiment, sensitive data can be transferred over SSL or SSH encrypted connections. User source code can be transmitted over SSH connections authenticated with SSH keys and not passwords. In one embodiment, SSH login credentials used to transfer user source code to the system cannot be used to gain access to a shell or to gain unfettered access to the file system on any central, shared server. In some embodiments, file system access on central servers can be executed on the system via git and SSH login credentials cannot be used to log in directly to a worker instance running user tests. In one example, worker instances do run user code but are not shared by multiple users.

In one embodiment, users are issued passwords and API keys by the system to mediate access to the service. User passwords are sensitive data that can be treated with care. For example, API keys are transmitted over SSL, are readily revocable, and are limited in scope. In one embodiment, these password and key guidelines apply: the password issued to an account administrator user can be used to add or remove other users and to update key material such as API keys and authorized SSH keys—it can be the responsibility of the end user to protect his password with care; the password issued to a non-administrative user can be used to update key material such as API keys and authorized SSH keys for that user only; the primary API key issued to any user can be a password equivalent and can be handled with commensurate care; the API keys issued to a user to authorize a git hook such as a post-commit hook on GITHub cannot be used to gain access to source code, to take any administrative action, or to view test reports or other account data; the API keys issued to worker instances on behalf of a user cannot be used to gain access to source code or to take any administrative action such as adding or removing users in an account or altering authorized SSH keys for the account—it allows the worker instance to receive commands and to report results—in some embodiments, the system can limit worker instance to only receiving commands and reporting results.

In one embodiment, the system replicates its own source code both inside and outside the data center to facilitate disaster recovery. The system is configure to maintains the ability to bring up backup infrastructure in the case of a disaster such as a wide-spread hardware failure.

In one embodiment, the system prevents its maintainers from directly accessing user source code using, for example, public key encryption and access control measures (e.g., unix access control measures).

One aspect of the invention includes a flexible, fine-grained security and key management model. In one embodiment, system processes and software are isolated from user processes, and the following security domains are implemented by the system: user code execution; API server; server manager; CI manager; account management site; maintenance tasks; and user code handling. In one embodiment, each security domain has a different, revocable API key.

In one embodiment, the system generates and tracks a set of SSH keys on behalf of each user, in order to ensure that communication is secure and parties are suitably identified. The system generates and tracks keys including: multiple public keys supplied by the user to authenticate the user's git pushes; 1 keypair per user generated by the system to authenticate a test worker's git pulls; 1 keypair per repo generated by the system to authenticate the system's CI git pulls; 1 keypair per organization/account generated by the system to authenticate communication with other third parties. The user can be given the public key to authorize among the third parties.

In one embodiment, the system generates and tracks keys to support these use cases: provide the user an interface to manage a list of authorized public keys; generate an additional RSA keypair per account for the user to authorize in third-party services (for example, in a github account). The private key availability can be limited to the users' code running in a test worker. This keypair is configured to be distinct from the CI pull keypair, as it may be exposed to arbitrary user-provided code, and are independently revocable by the system.

In another embodiment, the system's web service needs to store user-provided public keys, but the user interface (e.g., CLI command) needs to help the user manage private keys and key entities. For example, there can be a tddium keys command to list registered SSH keys, a tddium keys:add, and tddium keys:remove to edit the list. Further details of an example CLI interface are provided to illustrate additional functions and methods executed by the system.

The tddium keys command can list the currently registered identities. Given the user has created an account and authorized a public key, when the user run tddium keys, the output can be: you have authorized the following SSH public keys: Fingerprint—default 2048 f0:9d:04:d5:11:32:aa:f2:52:6e:44:3f:88:70:50:ec /home/moorthi/.ssh/keys_rsa.pub (RSA); use 'tddium keys:remove <name>' to de-authorize a key; use 'tddium keys:add <name>' to authorize a new key.

Given that the user has created an account and authorized a public key and the user authorizes another key, when the user runs tddium keys the output can be: you have authorized the following SSH public keys: Fingerprint—default 2048 f0:9d:04:d5:11:32:aa:f2:52:6e:44:3f:88:70:50:ec /home/userL.ssh/keys_rsa.pub (RSA) another 2048 e3:2d:85:d1:17:41:25:ee:11:4d:ca:3b:b2:7b:46:40 /Users/user/.ssh/keys_rsa.pub (RSA); use 'tddium keys:remove <name>' to de-authorize a key; use 'tddium keys:add <name>' to authorize a new key.

Examples of a basic user activation flow currently prompt the user to enter an ssh public key path. This functionality can be provided in a prompt_ssh_key method. The system is configured to perform basic sanity checks on the key. The system can be configured to, additionally: fingerprint the key; record the hostname where the key was read; construct a key info hash as described in POST /1/keys; instead of including a user_git_pubkey POST parameter in creating the user, the can include a new user_ssh_key parameter containing the above hash, missing the :priv key, to avoid colliding with old gem versions during transitions.

According to one embodiment, the system executes a "tddium keys:add" method. The tddium keys:add <name> command when execute can: check that the user does not already have a key named <name>; generate an RSA keypair with filenames ~/.ssh/identity.tddium.<name>[.pub]; add the public key to the user's Tddium account by sending a POST request to /1/users/<keys>/keys/ with a similar hash as above; generate an SSH config block that the user can paste into her .ssh/config file to direct SSH to use the private key when communicating with the Tddium git server for the selected environment: Hostname git.tddium.com IdentityFile /home/user/.ssh/keysentity.tddium.<name> IdentitiesOnly yes. The hostname may be stage-git.tddium.com, for example: display the SSH public key fingerprint.

Another command executed by the system includes "tddium keys:remove." The tddium keys:remove <name> command can send a DELETE request to /1/users/<keys>/keys/<name> and display the response. The tddium account command can display the generated public key that Tddium workers can use to communicate with third parties on behalf of the user. In one embodiment, in order to support the preceding CLI, the following example APIs are implemented. For example schema operations include an add to Account operation: third_party_keypair; an add to User operation: user_ssh_keys, Hash—which migrates user_git_pubkey into to user_ssh_keys, defaulting name to 'default', and nil fingerprint. Further API operations are provided. In one example, "POST /1/users" adds user_ssh_key parameter and supports handling old user_git_pubkey. "POST /1/keys" provides functionality: add an ssh (public) key to the user's account and accepts parameters: {:keys=>[{:name'=> <keyname>, :fingerprint=><fingerprint>, :hostname=><current hostname>, :pub=><public key data>, :priv=><private key data>}]}. In some examples, keyname cannot include spaces, fingerprint may be blank, and only one of pub/priv is required.

"DELETE /1/keys/<name>" provides functionality to delete the named key, and accepts parameters: none. "GET /1/keys" includes functionality: list keys for this user, and returns: status, explanation, keys: hash of keys, to match input hash format from POST /1/keys. "GET /1/users" is configured, upon execution to add third_party_pubkey to JSON, for example, by display by tddium account. "GET /1/instances/<id>/configuration" provides for the instance configuration can be changed to include a new key under :stage2_config: {:stage2_config=>{:third_party_privkey=>" . . . SSH private key . . . "}}.

Other embodiment are configured to support multiple login identities and/or to allow a single human to control multiple accounts (e.g., Tddium accounts). For example, this scenario is common among large consulting shops, where an individual can switch between projects owned by different accounts.

An aspect includes a flexible pricing and billing model. In one embodiment, the system's pricing model has to achieve a number of internal and customer-facing goals. Example Customer-facing Goals: easy to understand and predict; cater to what users care about: elapsed time and cost; offer a price/performance tradeoff; avoid comparison between tddium CPU performance and laptop CPU performance; instead focus on aggregate throughput; support capped usage from non-metered billing sources like Heroku; support repo limits for Heroku apps. Example Internal Goals can include any one or more of: detach customer-visible pricing from COGS—system is free to link them, but in some embodiments, shouldn't communicate that they're linked; price for industry-competitive gross margin; naturally group customers into offered tiers; allow for handling outlier customers as one-off deals; allow handling common, different resource requirements with pricing plans; allow for future suite-specific pricing; allow for burst-pricing specific sessions (the turbo button); allow for burst pricing all sessions for a time window (the turbo Tuesday). A sample pricing model is configured to: bill for elapsed time: bundle install time+test execution elapsed time; metered rate is a function of the number of "test workers" allocated to a session (e.g. $0.50/worker-hr); and offer 3 default price plans and allow customization for specific customers.

In one embodiment, the system implements metered billing. Following is an example metered pricing table (Table 6):

TABLE 6

| Fixed Fee | $15 | $50 | $100 | Contact Us |
|---|---|---|---|---|
| Included Build Time | 5 hrs | 10 hrs | 25 hrs | Bulk Pricing Available |
| Performance (workers) | 2 | 4 | 8 | |
| Concurrent Builds | 1 | 2 | 10 | |

After users exceed included time, an example on-demand time costs $0.75/worker-hr, with, for example, unlimited repos, and unlimited branches. According to another embodiment, the system provides fixed-price (capped) billing options. In one embodiment, some billing partners that integrate into the system do not support metered billing, like Heroku. Here's an example capped billing table:

TABLE 7

| Price | Workers | Time |
|---|---|---|
| $7 | 2 | 2 hours |
| $20 | 2 | 8 hours |
| $50 | 4 | 10 hours |
| $80 | 4 | 20 hours |
| $150 | 8 | 32 hours |
| $300 | 8 | 60 hours |

Once users reach their included time, the system is configured to indicate that builds fail. In one embodiment, Table 7, pricing includes one repo and unlimited branches. In one embodiment, the following pricing designs can be used.

In one embodiment, the system computes billable time for a session as:

billable_time=bundle_time+SUM(assignment.workers)*max(test_executions.end_time)−min(test_executions.start_time).

In another embodiment, the system tracks session variables to generate pricing. In one embodiment, the system can allocate resources based on the following variables scoped to a test session: vms: maximum VMs to allocate; vm_type: minimum VM type to allocate; and vm_workers.

In another embodiment, the system tracks account variables to generate pricing. In one embodiment, accounts can be limited and billed with the following variables: included_time; metered_rate (for usage beyond included); overage_allowed (boolean), defaults to true; concurrent_sessions; and repos: limit on the number of repos, defaults to unlimited.

In one embodiment, when overage is not allowed for an account, a new session can be allowed to start as long as the total pre-run usage for the current month does not exceed the included time.

In one embodiment, the per-session vm_type configuration maps into a configuration of platform and image (and potentially provider, region, etc.) instance-type=> platform, image, cores. In one embodiment, instance types can be in stored in an ordered list, from low to high capacity in order to allow VM types to refer to classes of instances.

In one embodiment, pricing plans can specify session variables and account variables. In one embodiment, pricing plans are stored in a YAML config file, e.g., config/pricing.yml. In other embodiments, this configuration can be stored in a database. An example high level configuration structure is as follows: ---<provider>: <plan>: :vms: integer :vm_type: string :vm_workers: integer :included:

integer :rate: float :overage_allowed: boolean :concurrent_sessions: integer :repos: integer :account: <id>: . . . keys from above . . . .

In one example, plans are defined per-provider. This allows, for example, capped pricing plans for Heroku accounts. Variables can also be specified per account in the .config file. The following sections outline an example set of characteristics in one embodiment of the invention. The account model can expose account variables.

In one embodiment, the system is configured to fail a request to create a suite for a new repo if the max number of repos has been reached. In one embodiment, pricing can be associated with Assignment. For example, bundle_time can be split from phase_times into a real database column, so that it can be included in a database query to sum session times, and there can be an index on session_id. In another embodiment, pricing can be associated with Session information. For example, creating a new session can fail for a capped account if the included usage has been consumed. The Session model can expose session variables. Session#billable_time can be renamed to Session#exec_time. A new Session#billable_time can be written to compute billable time. Session#bundle_time can read the new Assignment#bundle_time field.

In another embodiment, pricing can be liked to Test Execution. For example, the system can defined and use an index on (session_id, start_time) and (session_id, stop_time). Pricing can also be tracked based on VM allocation. For example, the instance allocator can read configuration parameters from the session to be allocated; there can be an instance pool for each configured instance type; each instance pool can manage its contents using Redis atomic operations, instead of PG transaction—PG updates can happen after assignment has happened in Redis to lock an instance to a session—in some examples, PG updates are limited to happen after assignment; logic in Instance.tddium_servers to find all servers can be aware of different instance types; and logic in Instance.stop_all to stop all servers can also walk the list of active servers, in addition to killing all servers that match the vm type.

In some embodiments, the system is configured to track usage through an HTML report. For example, the system can include a pricing component configured to calculate elapsed time to match billable time; display total test exec time after test results, as a summary; and display the number of workers.

In another embodiment, the system generate billing calculations based on testExecution.accounts_summary, instance_breakdown, and compute_charges can move to the Account model; and the billed usage displayed from Account#usage_in_month needs to be performance tested against real customer data.

In another embodiment, the system and/or pricing component includes an Admin Dashboard. For example, the Admin account CSV export currently runs exec time calculations, which are fast. Assignment elapsed-time calculations can be delayed in order to handle a large number of accounts.

One aspect of the invention includes the ability to provide insight into the application being tested, beyond simply providing the results of the test. One embodiment provides access and analysis based on aggregated statistics across users and can further be configured to monitor test executions, and collect profiling data across users, test suites, and build operations.

According to one embodiment, the system is configured to generate test analytics—identifying frequently/intermittently failing tests, surprise (in an information theoretic sense), coverage and quality metrics, identify slow tests, etc. One embodiment uses historical test result data and statistical techniques to identify test runs that can be classified as outliers based on: individual test failures, overall coverage and quality trends, individual test performance, overall test batch performance. The system can be further configured to generate performance analytics—one embodiment of the system mines CPU, memory, I/O, database query volume and latency, and network bandwidth (the last largely for browser simulation tests). One embodiment tracks these quantities using unix system profiling tools, like netstat, iostat, and the proc filesystem to collect information for each test that runs, and for the entire duration of the test batch. The resulting metrics can be used to identify bottlenecks and performance regressions early in the development cycle. In another example, the system is executed processes to encourage performance tests—one embodiment of the system encourages and help users to write explicit performance tests by providing examples, and identifying tests that are good candidates for use as benchmarks, either automatically or with user input. Performance microbenchmark tests are implemented in some example, which help prevent performance regressions and ease the transition from one version of the software stack to another. Performance tests can be monetized in the same way that correctness tests are. They are likely to be more resource intensive.

Another aspect includes presenting the user with results of tests, including but not limited to historical aggregations of results, comparisons across the users different projects, debugging aids to help the user zero-in on test failures or false passes without operator intervention, and collaboration tools to involve other users in solving problems with tests or the application being tested. One embodiment includes system component configured to inject code into the user's application and test suite to instrument it without the user's intervention. The injected code interfaces with common test frameworks to trigger after certain events, such as test failures. The injected code may include special handling of certain (common) tools that offer advanced debugging capabilities, such as capturing system screenshots, saving the internal state of a test tool or database, or annotating a log file for later indexed display as part of a more complete test result report.

Another embodiment includes components configured to identify a test as unnecessary, and offers the user an option to abort a running test if it's known to be unnecessary. One embodiment collapses or hides test results in a particular run if there have been no changes from previous runs. In one embodiment, when test results are shown, results can be sorted in order of importance to the user: failures first, then errors, then passed tests.

One embodiment is configured to link individual test results to relevant test artifacts or source code, such as the results of injected trigger code, system logs, code listings for changes made between one test run and another, links to external references, bug reports. One embodiment exports a batch of test results in a machine readable format, such as CSV or YAML. Another embodiment allows the owner of a resource (test, test run, repo, branch, account, etc.) to control the visibility of results for that resource, including but not limited to: only the owner, only the account/organization, a specific list, the public; and to control what can be displayed to different groups of people. For example, the user may want to display a condensed set of results for public consumption. In the case of public display, an embodiment of the system caches a static copy of dynamic results for display to maintain system performance.

One embodiment allows the user to comment on, and share comments with other users, particular test runs, particular test results, projects, branches, etc. In one example, the owner of a given resource may restrict commenting to other users who have access to the resource, or to a specific list of users, or to all users. One embodiment offers a dashboard view generated by the system where the user can see a combined listing of all of their relevant test results, for all of their projects. The user can optionally view projects that have not been configured to be tested by the system, and enable testing for them on the fly. In one example, testing can also be controlled by user-supplied rules, such as "any repo on branch master". In another example, the user can control parameters on the granularity of a project/repository and/or branch, or even down to a single test batch, such as: number of workers, VM type, priority, deadline.

Another aspect includes a resource allocator to run tests on the appropriate compute resources. In one example, the allocator assigns cloud virtual machines to test sessions. In one example, the VM allocator can be responsible for distributing a group of tests (a "Session") across VM instances in batches. Continuing the example, "Allocation" can include two phases: Session start: the first set of VMs are assigned to a session; and Test claim: VMs carry out the assignment by claiming a batch of tests to be run. The system can measure allocation efficiency can be measured by a few high-level metrics, including: Total operating cost; per-user operating cost; session run time; where better allocation reduces these metrics.

In one embodiment, the allocator is configured to accept specification of static limits globally and per-session. In another embodiment, the user can specify, for example, a per-session maximum parallelism, in order to limit the load on a target server or when the test consumes a limited resource. Table 8 illustrates example limits and example functions executed on the system to set them. In some embodiments, the allocator and the functions discussed can be implemented as part of a provisioning subsystem (e.g., provisioning subsystem 408).

TABLE 8

| | |
|---|---|
| test_vms_per_session: | Maximum number of VMs to allocate to a session. This limit allows us to ensure that any one session can't consume the entire pool of VMs and starve other/new sessions. |
| test_vm_total: | Maximum number of VMs allocatable (in our cloud service account). For example, in EC2, we are currently limited to 20 VMs. |
| max_parallelism: | Per-session user-specified limit on number of tests to run in parallel, across all VMs. |

According to another embodiment, a cache of recently allocated VMs can be maintained by the system. In some embodiments, the cache of recently allocated VMs provides for: reduction in VM startup time (30-60 s) can be a significant compared to test execution time; and stated broadly it doesn't make sense to use a VM for only 2 minutes if the provider bills hourly. In one embodiment, VMs can be first allocated by taking from the recent-VM cache, and then by requesting new VMs from the cloud provider, enabling re-use of provisioned resource.

In another embodiment, the allocation algorithm takes inputs including: a test session, containing a list of tests to run; the configuration variables above; historical runtime and resource usage of the test scripts to be run; tuned limits per instance-type for batching and resource capacity. In one example, the allocator is configured to generate a plurality of outputs, including: an initial_vm_assignment that can start running tests for this session; the first batch partition of tests across the initial VM set; ongoing changes to the VMs assigned to the session; and ongoing changes to the partition of tests across assigned VMs.

According to one embodiment, the resource allocator can generate a rough allocation of compute tasks. The rough allocation can be configured to favor simplicity. For example, styled a "one-size fits all is described according to the settings of Table 9.

TABLE 9

| | |
|---|---|
| Session Start: | calculate the fixed assignment of VMs. |
| Test Claim: | compute a batch size, limited by max_parallelism and a configured max_vm_batch_size. |

This example mechanism generates a rough allocation, because, for example, the mechanism is configured to ignore how many tests need to be run, and require static configuration of the max batch size per VM. Ultimately, rough allocation can result in the system generating the same number of VMs for a very small test suite as the number of VMs assigned as a very large one. Accordingly, this example can lead to waste on the low end and sub-optimal parallelism on the high end.

According to another embodiment, the allocator is configured to execute session based VM allocations. In order to solve the basic sizing mismatch issue discussed in the rough allocation, the allocator can be configured to account for the number of tests being run. For example, the resource allocator can accept a fixed configured max_vm_batch_size; and calculate allocations based on the approach described in Table 10.

TABLE 10

| | |
|---|---|
| Session Start: | Compute the number of instances to start from the number of tests to run, test_vms_per_session as a max, and max_vm_batch_size:<br>    maxpar = min(max_parallelism, tests_to_run)<br>    hard_limit = min(test_vms_per_session, test_vms_left)<br>    vms = min(hard_limit, ceil(maxpar / max_vm_batch_size))<br>    sess_batch_size = min(max_vm_batch_size, ceil(maxpar / vms)) |
| Test Claim: | Compute the size of the next batch to return to the test VM:<br>    test_potential = max(0, maxpar − running)<br>    next_batch_size = min(test_potential, sess_batch_size) |

According to another embodiment, Table 11 describes allocations generated by the system dependent on analysis of the number of tests to runs and configuration settings for batch size and virtual machines per session. Table 11 assumes settings of max_vm_batch_size=2 (suitable for an amazon c1.medium) and test_vms_per_session=5.

TABLE 11

| Inputs | | Outputs | |
| --- | --- | --- | --- |
| tests_to_run | max_parallelism | vms | sess_batch_size |
| 1 | • | 1 | 1 |
| 2 | • | 1 | 2 |
| 5 | • | 3 | 2 |
| 10 | • | 5 | 2 |
| 50 | • | 5 | 2 |
| 50 | 1 | 1 | 1 |
| 6 | 4 | 2 | 2 |
| 30 | 50 | 5 | 2 |

Another aspect includes the ability to reserve resources for a user or session. Compute resources can be reserved or "pinned," so the resources does not terminate until explicitly directed. In one embodiment, the API server maintains a set of active VMs and assigns VMs to test runs dynamically. In some embodiments, the system is configured to allow VMs to be pinned to a single user. Pinning virtual machines to a user can be advantageous especial where: a user has a large volume of tests to run and requests guaranteed resources, including local caching of objects; a user specify some tests to run locally on the client side, for example, against a remote instance (e.g. Selenium) and therefore need to ensure that the test VM isn't reclaimed out from under him. One embodiment, is configured to support local test implementations, for example, including local compile-test-debug cycles, by implementing tools configured to support and manage interaction between local and remote compute resources.

Another embodiment separates the pinning of instances from running tests on the client side against a pinned instance. For example, the system can be configured to enable client-side testing against a remote service using pinned instances, while providing the pinning as a separate feature from test execution on the system.

In some embodiments, a pining component can be configured to provide the functions discussed with respect to pinning instances. The following sections describe additional detail and functions provides with respect to additional examples. In one example, a pinned test VM can be allocated by the user interface execution on a customer environment (e.g., as specified in a user gem executed by the UI). When executed, the user gem can make a request to the API server to allocate and pin a VM (e.g., by executing operations within a provisioning subsystem). The request indicates whether the pinned VM is to be used to run ordinary tests or to be used to host a test environment and/or application to test (e.g., a Selenium) for client-side tests.

In one embodiment, a pinned VM can be billable for the entire period it is pinned, not just when test are running on the VM. The billable period can be rounded up to the next whole quantum for billing used by the underlying cloud provider. In another embodiment, a pinned VM may be unpinned and released by the user interface and/or client gem. When a pinned VM is released, it may be recycled and used for other jobs in the system or it may be terminated. The system can be configured to forcibly unpinned a VM, e.g., by the API server. When a VM is forcibly unpinned it can be terminated. Forcible unpinning can be executed, for example, when the VM is administratively terminated by an administrator user (e.g., Tddium administrator) or when the VM has remained idle for an extended period of time.

In some embodiments, a pinned VM remains pinned until it is forcibly terminated, explicitly released by the client or there has been no activity on the VM for a pre-defined period and the current cloud provider quantum for the VM is about to expire. The default inactivity period can be at least twice the expected time it takes to terminate the VM to prevent incurring a charge for a new quantum. The inactivity period may in fact be 30 min or more if the user is responsible for shutdown and automatic termination is merely intended to prevent runaway VMs. (In)activity on a pinned test VM can be determined by a heart-beat mechanism executed by the system. For example, both pinned and ordinary test VMs send a regular heart-beat message to the API server to confirm liveness. The API server can be configured to terminate test VMs that have failed. In addition, test VMs pinned for client-side testing can be configured to send an additional heartbeat in the form of client-side test execution requests. Examples and embodiments implementing these requests are described in greater detail below.

According to one embodiment, a pinned test VM runs the same Stage 1 Emcee as an ordinary Test VM. In some examples, the test VM image for pinned test VMs can be identical to the one used for ordinary test VMs—and no change is required to the AMI. When a test VM is pinned to run conventional tests for a single user/account, the test VM can be provided with the same Stage 2 Emcee as is used by ordinary test VMs (discussed above). In other examples, a difference between an unpinned and a pinned test VM includes the allocation and assignment of resources by the API server to individual user accounts and the billing for those resources.

In some embodiments, when a test VM is pinned for use by client-side tests, an alternate version of the Stage 2 Emcee can be run. The alternate version of stage 2 sets up, for example, only those services that are relevant for client-side testing. In one embodiment, initially set up can include executing controllers and communication protocols (e.g., Xvfb, Fvwm, vncserver, and Selenium—a test environment and/or application).

The tddium local command can be used to execute client-side tests. This command when executed by the system, is configured to communicate with the execution controller (e.g., emcee web server) on the test VM instance to confirm that the necessary services are up and running. Execution can be configured to poll for the service and determined if services need to be (re)started. The controller (e.g., emcee) reports to the API server that a new test execution has begun, for example, as part of a heart beat process. After the controller (e.g., emcee web server) acknowledges the poll/liveness request from user interface (e.g., the gem), the user interface (e.g., the gem) can execute the pipeline given to it. For example, the gem can establish an SSH tunnel to the test VM, set appropriate environment variables, and execute the pipeline. In other examples, the gem can be configured to also establish the SSH tunnel before it receives the acknowledgement from the controller (e.g., emcee) in order to improve latency.

Another aspect of the system includes the ability to provide the user an interactive testing and debug environment. In one embodiment, this can be considered "Testing on Demand". One embodiment provides a managed and hosted environment for running software testing jobs in parallel. The system can be responsible for determining what services, such as databases and test frameworks, to start, populating any test data sources, and running the tests in parallel. The system can be also responsible for monitoring and logging events and output in the system and returning the results to the end user for inspection. If the build and test execution is successful, the on-demand approach is fast and efficient. When tests fail, however, it can be difficult to determine what has gone wrong if a critical piece of logging is missing or failing. Furthermore, it is often the case that a user is actively developing a new piece of functionality and would like to run the same tests repeatedly until they pass while simultaneously updating the application and/or implementation under test. Interactive Debug Mode facilitates this work-flow by avoiding the cost of repeated environment setup and tear-down.

According to one embodiment, a debug mode of execution is provided by the system. In debug mode, the system allocates a debug mode environment on demand: either at the explicit behest of the user or when the system has determined that an error in the hosted test environment warrants it. For instance, if the system determines: that a test is failing frequently, that a catastrophic error has occurred, that it was unable to capture the output or other state of test, or for another suitable reason, the system is configured to automatically start a debug mode session for a user. In one embodiment, the system may terminate a debug mode session at the explicit request of the user, when the session has been idle for an extended period of time, when other higher priority or more lucrative jobs enter the system, when the session requires too many resources to continue, or for any other reason. When a debug mode session is terminated, the session may store the complete state of the session including any hardware or software systems, any associated state for either, any user-supplied data or test inputs, source code, executables, or test and data collection scripts, or only some subset of the state information available for the debug environment and state of execution. In one embodiment, a user may be charged a fixed fee, for actual resources consumed, for the stored state, for analytics, and/or for more detailed event collection, reporting, and analysis.

In one embodiment, the system uses pinned instances as described in this document to provide for debug mode and/or other modes of operation. In a debug mode, the system can be configured to allocate hardware resources from the same pool as the hosted test environment. In another embodiment, the system is configured to allow a user to run the debug mode on his local workstation, on his own computing hardware, in a cloud or other hosting environment he operates or leases from a third party, or on virtual machines provided by the service but running on his own hardware, in a cloud he operates, or on hardware he leases from a third party.

According to another embodiment, debug mode hardware may be allocated by a number of means, including, but not limited to, on demand for a specified period, in advance for a specified period, or either on-demand or in advance based upon user activity. The system may start a debug mode session at the explicit request of the user or upon detecting a test failure or other anomalous behavior. If debug mode is entered upon a test failure or anomalous behavior, the system may choose to stop tests and enter debug mode immediately, enable debug mode and allow tests to continue, or enter debug mode when the entire test suite has completed.

According to some embodiments, the system includes a debug component configured to generate a debug mode environment. In some examples, the system and/or debug component can be responsible for either automatically or at the user's discretion constructing an environment suitable for running the user's tests. In one example, the system and/or debug component is configured to: set up the test environment as described for the hosted test environment; retrieve the user's source code; retrieve any machine executables; retrieve any data or test inputs required to run the software; retrieve any tests, including source, executables, or test inputs; determine what tests, source, executables, data and test inputs have changed; and determine on the basis of recent changes in the environment which tests might produce different results from those previously recorded and offering to re-run those tests.

The system may also provide a mechanism such as a source code control system (e.g., SCM and/or git) to allow a user to retrieve updates to his program, executables, data inputs, and tests. In debug mode the system may report the state of the system and result of test in real time or wait for completion of one or more tests before producing a report.

The system may provide a programmatic interface (API), command line interface (shell), or graphical interface (GUI, e.g. a web page) for querying the state of the environment. This state includes but is not limited to the output of any programs in the environment, the log files of any software in the environment, the machine and operating system state, and the configuration of hardware and software in the environment. The system may also allow a user to start or stop individual software subsystems, query their configuration state, attach a debugger to examine their program state, and retrieve performance data including but not limited to the number of transactions, database queries, page faults, context switches, I/O transactions, and network events. The system may collate and store historical records of program state and other monitoring data. Further, it may apply a variety of statistical and machine learning techniques to this data to find anomalous behavior in either future debug mode or normal hosted test sessions. For example, the system can be configured to analyze these data and algorithms to identify frequently failing tests, intermittently failing tests, or changes to tests, source code, binaries, or input data that cause changes in system performance or correctness.

The system may use these data and its determination of frequently, intermittently, or recently failing tests or performance changes to suggest that a user in debug mode re-run these "high risk" tests. In one embodiment, the system is configured to enable a user to start network services that respond to inputs from other machines maintained and operated either by the system, the user, or a third party. Such services include, but are not limited to, remote display managers to examine graphical state, web servers, database servers, and clients for accessing the same either manually or programmatically.

Another aspect includes an automated and continuously improving help system. In one embodiment, the system includes a learning help component. The help system reduces the burden of support on the operator of the system. The help system also makes the overall system more self-service and easier to use, and can make users more productive.

In one embodiment, the help system classifies common errors in the test environment, in source code, in executables, and in tests. The help system can be configured to apply a set of heuristic, approximate algorithms, and precise analysis algorithms. In one example, the help system can also incorporate expert, administrator, and end-user feedback.

Various embodiments of the system implement some known program analysis techniques to provide help information through the help system. For example, there can be a wide array of static and dynamic program analysis techniques and a rich literature on how to apply them to finding program errors. Some of these techniques are language dependent; others are generic. Some techniques are merely simple text pattern matching, others require parsing the source code to extract semantics, still others require sophisticated and expensive theorem proving and logic analysis algorithms. Dynamic analysis techniques may monitor program execution, memory and other resource usage, network and I/O traffic, and other system events such as databases, web browsers, search servers, etc. for anomalous behavior. These techniques may identify true errors or may identify a class of proposed errors that include correct programs. They may also identify language constructs, program behaviors, etc. that are considered poor form by the software development and/or test community.

According to one embodiment, the system can apply any number of these analysis techniques to the user's source code. In some example, the system can incorporate historical analysis results, the results of previous test executions, and human annotations to provide help information, for example, through the help system. The system can also incorporate knowledge of third party software packages and libraries.

One embodiment of the system then produces a sequence of warnings, errors, other notices and trace data for correctness and performance monitoring algorithms (collectively data), possibly in real time as the program under test executes and as the environment runs. The system is configured to process these data by classifying and prioritizing: for display based on estimated importance or severity; by how common they are: very common problems help new users, and surprising/unexpected problems are likely to be of high interest to all; on the basis of user or expert voting or other inputs; and by using machine learning and reputation algorithms to filter results and user and expert annotations.

Some embodiments of the invention are configured to perform any one or more of the following functions: map anomalous data back to program or test locations; map common failure patterns back to program or test locations; map frequent/intermittent failures for this user back to program locations; allow a user or expert to mark a notice as a non-error; allow a user to mark data items, failure, annotation, or notice as unexpected; allow a user to ask for help at the site of a notice; and automatically link any warning, error, or other message, notice, or data or test to documentation entries, public or private fora, or other examples.

According to another embodiment, the system is configured to: automatically search internal documentation as well as external sources such as the world wide web, mailing lists, and user fora for: software package names, warnings, errors, and notices generated by the system and by tools used by the system, log messages produced by the system or components of the system, and user programs and test generated output; automatically link notices generated by the system and output and logs generated by the system or user programs and tests to manually and automatically generated and curated help articles and external sources; automatically predict, annotate, or otherwise bring to the user's attention tests that fail frequently or intermittently; automatically annotate or otherwise bring to the user's attention code that is not or is inadequately covered by tests; and automatically annotate or otherwise bring to the user's attention tests or other code that experience significant changes in compile or runtime performance.

Another aspect includes the ability to automatically or manually fall back to a "safe" mode of operation that sacrifices performance for reliability or debuggability. One embodiment allows the user to control the total parallelism for a test batch, for example, to safely test against a shared resource that can handle a certain amount of traffic. Another embodiment, of the safe mode allows the user to serialize specific tests run in parallel in the test environment, in order to isolate against tests that fail when run in parallel with other tests. Another embodiment of safe mode allows the user, in the test result display, to re-run a session in "safe mode" with all tests serialized on a VM, for example, to effectively eliminate contention issues.

In another embodiment, execution of safe mode by the system allows the user to indicate that the next test run(s) can serialize tests on a VM. Another embodiment of safe mode, automatically sets the next run to serialize tests that failed in the previous run(s).

Another aspect includes a cost estimation mechanism to offer users insight into how much their usage of the system can cost, at varying feature, price, and performance points. In one embodiment, the system gathers data sufficient to provide an estimate, and can be configured to run the user's test suite if necessary. In one embodiment, the estimator is configured to generation and display a matrix of price vs. performance (test batch completion time) vs. feature combinations, with certain combinations highlighted or hidden to achieve maximum conversion of evaluation users into paying customers. The focusing can be done using a "web analytics" tool that measures user behavior and empirically comparing the user conversion ratio of different options.

In some embodiments, the system is configured to determine an estimate based on a number of factors, including any one or more of: test or application source dependencies, for example if static analysis shows that tests depend on a heavyweight tool, the performance estimator may hide low-performance options, or de-emphasize cheaper tiers that can not provide a suitable user experience; runtime dependencies, for example if static analysis doesn't indicate anything, but the test suite starts more processes than expected—in another example, the if the test suite requires very little memory when it runs, the estimator can emphasize a cheaper option; number and type of tests, for example if there are more than 1000 tests, emphasize a high-performance option and present a guess at completion time based on a pre-computed average time for the given type of test; similar tests, dependencies in other users/suites to predict resource requirements; number and geo-location of developer working on the test suite or the application to estimate usage pattern. In another example, take time-dependent cost of resources into account ("chasing the sun"); expected number of builds, querying the user if necessary—automatic analysis can be implemented with git commit history and for example, if the git repository averages 15 commits per day, the estimator can predict the trend can continue—more sophisticated trend and/or curve-fitting techniques can be used to produce a more accurate estimate; user development model (contractor, startup, established player), for example determined by asking the user; and any other model to estimate future usage.

Various component of the system can be configured to execute the functions discussed herein. Some embodiments of the system include general component configured to execute any one or more of the following functions: ML mining of failure patterns—frequent failures?—performance regressions?; automated git bisect; test failure collaboration tools (annotate failures; map back to bug reports, etc.); aggregated quality statistics as sales tool; stack trace mining to find commonly failing code paths, loci; combine with coverage data; virtual on virtual hosting so users can supply a chef script to build an image; and proactively monitoring libraries to detect problem libraries (e.g. pulled gems) and notifying customers when their libraries have been deprecated or retracted.

The system component can be configured to determine a relative level of experience of the user. For example, the system can identify a first user experience and provide any one or more of the following functions: autodetecting user static and runtime dependencies and tools; autodetecting app and test characteristics from customer code contents; automatically adjusting test hosting environment characteristics based on app characteristics; safe mode; and background first bundle install (i.e. prep repo and environment).

According to another embodiment, the system is configured to construct and manage an execution environment by executing: intelligent pre-loading of costly resources; pre-forking test runner, with automatic fallback to new process mode; automatic bring up of ancillary services such as databases, interpreters, test tools, etc.; and concurrency control for non-parallel-safe tests.

In one embodiment, a help component is configured to: feed back code analysis results to suggest improvements to customer code; automatically assist based on analysis of code, current and historic test results; mine external fora to produce help articles; and automatically provide links to relevant help articles based on common patterns, static analysis, dynamic behavior.

In another embodiment, an analysis component is configured to perform analysis on test results, including at least one of: predicting test results; identifying tests that fail frequently; identifying tests that fail intermittently; identifying (un)covered code that leads to frequent failures; flag tests with significant changes in runtime or other performance metrics; and stack trace mining and code coverage to discover undercovered code.

According to one embodiment, the system includes a cost estimator component configured to execution any one or more of: analyze source dependencies; analyze runtime dependencies; analyze number and type of tests; analyze similar tests, dependencies in other users/suites to predict resource requirements; run suite for free to collect usage, performance data; use number and geo-location of developers to estimate usage pattern+Take time-dependent cost of resources into account (chasing the sun); query user for expected number of builds; determine user development model (contractor, startup, established player); and build model to estimate future usage (may be willing to accept lower margins up front).

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:

1. A system for continuous integration of source code revisions, the system comprising:
   at least one processor operatively connected to a memory, the at least one processor when executing is configured to:
       register a test suite for distributed execution, wherein the test suite defines source code associated with an application to be tested and at least one test to be executed for the application, wherein registering includes identifying a code repository that stores the source code associated with the application to be tested;
       analyze the source code and the at least one test in the test suite;
       generate, automatically, configuration requirements required to execute the test suite based on the analysis of the source code and the at least one test in the test suite, wherein generating, automatically, configuration requirements includes dynamically determining, based on the analysis:
           execution dependencies of the application for the at least one test,
           an execution environment required for the application for the at least one test, and
           at least a portion of the source code required for executing the at least one test responsive to the analysis of the source code and the at least one test in the test suite;
       generate instructions for executing a plurality of execution instances, wherein at least some of the plurality of execution instances are configured to:
           define the execution environment based on the configuration requirements generated automatically from analysis of the source code and the at least one test,
           execute the at least a portion of the source code, and
           execute the at least one test;
       communicate, the instructions for executing the plurality of execution instances to at least one compute resource; and
       receive results from execution of the plurality of execution instances.

2. The system according to claim 1, wherein the at least one processor is configured to provision the at least one compute resource from a plurality of cloud compute providers.

3. The system according to claim 2, wherein the at least one processor is configured to:
   determine a cost for a plurality of compute resources available at the plurality of cloud compute providers; and
   select the at least one compute resource responsive to a price constraint.

4. The system according to claim 3, wherein the at least one processor is configured to select the at least one compute resource responsive to completion criteria.

5. The system according to claim 2, wherein the at least one processor is configured to:
   determine a cost for a plurality of compute resources;
   determine a volume of compute resources based on completion criteria; and
   wherein the provisioning of the at least one compute resource includes provisioning the volume of compute resources required to meet the completion criteria against a price constraint.

6. The system according to claim 1, wherein the at least one processor is configured to analyze, automatically, the test suite to determine compute tasks necessary to define the execution environment, execute the at least the portion of the source code, and execute the at least one test.

7. The system according to claim 6, wherein the at least one processor is configured to determine requirements for serial execution for the compute tasks; and wherein generating the instructions for executing the plurality of execution instances includes grouping the plurality of execution instances responsive to the requirements for serial execution.

8. The system according to claim 6, wherein the at least one processor is configured to determine capability for parallel execution for the compute tasks, and wherein generating the instructions for executing the plurality of execution instances is responsive to the determined capability for parallel execution.

9. The system according to claim 7, wherein the at least one processor is configured to determine the capability for parallel execution for the compute tasks within any grouping based on prior serial execution of the plurality of execution instances.

10. The system according to claim 1, wherein the at least one processor is configured to:
generate a coarse schedule for the execution of the plurality of execution instances responsive to the determination of execution dependencies.

11. The system according to claim 10, wherein the at least one processor is configured to establish completion criteria for at least one of the plurality of execution instances.

12. The system according to claim 10, wherein communicating the plurality of execution instances, includes generating, automatically, a distribution of the plurality of execution instances between a plurality of compute resources.

13. The system according to claim 12, wherein the plurality of compute resources includes a plurality of networked virtual machines.

14. The system according to claim 10, wherein the coarse schedule defines at least a plurality of compute tasks having dependencies that require serial execution.

15. The system according to claim 14, wherein the at least one processor is configured to generate a fine schedule within the plurality of compute tasks requiring serial execution.

16. The system according to claim 15, wherein communicating the plurality of execution instances, includes generating, automatically, a distribution of the plurality of execution instances between a plurality of compute resources according to the fine schedule.

17. The system according to claim 1, wherein the at least one processor is configured to isolate execution of at least some of the execution instances.

18. The system according to claim 17, wherein the at least one processor is configured to limit access to the at least some of the execution instances based on access privileges defined for the test suite.

19. The system according to claim 1, wherein the at least one processor is configured to identify configuration files within the code repository to determine the configuration requirements.

20. The system according to claim 1, wherein the at least one processor is further configured to:
identify patterns within the code repository including file structure, naming conventions, and organization of source code files;
map the patterns to configuration information embedded in the code repository; and
determine, based on the configuration information, at least some of the configuration requirements that define the execution environment.

21. The system according to claim 1, wherein the at least one processor is configured to:
trigger generation of the instructions for executing the plurality of execution instances responsive to user submission of source code changes; and
automatically, allow or prevent the source changes responsive to the results received from the execution of the plurality of execution instances.

22. The system of claim 1, wherein the at least one processor is further configured to:

automatically execute a code build;
identify further issues responsive to the code build and automatic test execution; and
modify execution dependencies, the execution environment, or the at least a portion of the source code required to execute the at least one test based on the identified issues.

23. The system of claim 1, wherein the at least one processor is further configured to distribute test case execution to already instantiated environments matching the determined execution dependencies, the execution environment, and the at least a portion of the source code required to execute the test.

24. The system of claim 1, wherein the processor is further configured to identify patterns within the code repository responsive to registration of the test suite or source code.

25. A computer implemented method for continuous integration of source code revisions, the method comprising:
registering, by a computer system, a test suite for distributed execution, wherein the test suite defines source code associated with an application to be tested and at least one test to be executed for the application, wherein registering includes identifying a code repository that stores the source code associated with the application to be tested;
analyzing, by the computer system, the source code and the at least one test in the test suite;
determining, automatically, by the computer system, configuration requirements required to execute the test suite based on the analysis of the source code and the at least one test in the test suite, wherein determining, automatically, configuration requirements includes dynamically determining based on the analysis:
execution dependencies of the application for the at least one test,
an execution environment required for the application for the at least one test, and
at least a portion of the source code required for executing the at least one test responsive to the analysis of the source code and the at least one test in the test suite;
generating, by the computer system, instructions for executing a plurality of execution instances, wherein at least some of the plurality of execution instances are configured to: define the execution environment based on the configuration requirements determined automatically from analysis of the source code and the at least one test, execute the at least a portion of the source code, and execute the at least one test;
communicating, by the computer system, the instructions for executing the plurality of execution instances to at least one compute resource; and
receiving, by the computer system, results from execution of the plurality of execution instances.

26. The method according to claim 25, further comprising an act of provisioning the at least one compute resource from a plurality of cloud compute providers.

27. The method according to claim 26, further comprising:
determining a cost for a plurality of compute resources available at the plurality of cloud compute providers; and
selecting the at least one compute resource responsive to a price constraint.

28. The method according to claim 27, further comprising selecting the at least one compute resource responsive to a completion criteria.

29. The method according to claim 26, further comprising;
determining a cost for a plurality of compute resources;
determining a volume of compute resources based on a completion criteria; and
wherein the act of provisioning of the at least one compute resource includes provisioning the volume of compute resources required to meet the completion criteria against a price constraint.

30. The method according to claim 25, further comprising analyzing, automatically, the test suite to determine compute tasks necessary to define the execution environment, execute the at least the portion of the source code, and execute the at least one test.

31. The method according to claim 30, further comprising determining requirements for serial execution for the compute tasks; and wherein the act of generating the instructions for executing the plurality of execution instances includes grouping the plurality of execution instances responsive to the requirements for serial execution.

32. The method according to claim 30, further comprising determining a capability for parallel execution for the compute tasks, and wherein the act of generating the instructions for executing the plurality of execution instances is responsive to the determined capability for parallel execution.

33. The method according to claim 31, further comprising determining the capability for parallel execution for the compute tasks within any grouping of the plurality of execution instances responsive to the requirements for serial execution.

34. The method according to claim 25, further comprising generating a coarse schedule for the execution of the plurality of execution instances responsive to the determination of execution dependencies.

35. The method according to claim 34, further comprising establishing completion criteria for at least one of the plurality of execution instances.

36. The method according to claim 34, wherein the act of communicating the plurality of execution instances, includes generating, automatically, a distribution of the plurality of execution instances between a plurality of compute resources.

37. The method according to claim 36, wherein the plurality of compute resources includes a plurality of networked virtual machines.

38. The method according to claim 34, wherein the coarse schedule defines at least a plurality of compute tasks having dependencies that require serial execution.

39. The method according to claim 38, further comprising generating a fine schedule within the plurality of tasks requiring serial execution.

40. The method according to claim 39, wherein the act of communicating the plurality of execution instances, includes generating, automatically, a distribution of the plurality of execution instances between a plurality of compute resources according to the fine schedule.

41. The method according to claim 25, further comprising isolating execution of at least some of the execution instances.

42. The method according to claim 41, further comprising limiting access to the at least some of the execution instances based on access privileges defined for the test suite.

43. The method according to claim 25, further comprising identifying configuration files within the code repository to determine the configuration requirements.

44. The method according to claim 25, further comprising:
identifying patterns within the code repository including file structure, naming conventions, and organization of source code files;
mapping the patterns to configuration information embedded in the code repository or known configurations associated with the patterns; and
determining, using the configuration information, at least some of the configuration requirements that define the execution environment.

45. The method according to claim 25, where in the at least one test includes a test configured to pass upon execution.

* * * * *